US008493386B2

(12) United States Patent
Burch et al.

(10) Patent No.: US 8,493,386 B2
(45) Date of Patent: Jul. 23, 2013

(54) SYSTEMS AND METHODS OF MANAGED SCRIPT EXECUTION

(76) Inventors: Aaron Burch, Vancouver (CA); Ian Neufeld, Burnaby (CA); Dirk Herling, Vancouver (CA); Gary Shuster, Vancouver (CA)

( * ) Notice: Subject to any disclaimer, the term of this patent is extended or adjusted under 35 U.S.C. 154(b) by 0 days.

(21) Appl. No.: 13/590,176

(22) Filed: Aug. 20, 2012

(65) Prior Publication Data
US 2013/0044107 A1   Feb. 21, 2013

Related U.S. Application Data

(60) Provisional application No. 61/524,956, filed on Aug. 18, 2011.

(51) Int. Cl.
*G06T 15/00*      (2011.01)

(52) U.S. Cl.
USPC .......................................................... 345/419

(58) Field of Classification Search
None
See application file for complete search history.

(56) References Cited

U.S. PATENT DOCUMENTS

| | | | |
|---|---|---|---|
| 5,461,710 A | | 10/1995 | Bloomfield et al. |
| 5,802,296 A | * | 9/1998 | Morse et al. ................... 709/208 |
| 5,872,575 A | | 2/1999 | Segal |
| 5,880,731 A | * | 3/1999 | Liles et al. ..................... 715/758 |
| 6,031,549 A | * | 2/2000 | Hayes-Roth .................. 345/474 |
| 6,285,380 B1 | * | 9/2001 | Perlin et al. ................... 345/473 |
| 6,389,458 B2 | | 5/2002 | Shuster |
| 6,687,746 B1 | | 2/2004 | Shuster et al. |
| 6,756,879 B2 | | 6/2004 | Shuster |
| 6,763,379 B1 | | 7/2004 | Shuster |
| 6,801,930 B1 | | 10/2004 | Dionne et al. |
| 6,826,546 B1 | | 11/2004 | Shuster |
| 6,862,610 B2 | | 3/2005 | Shuster |
| 6,895,236 B2 | | 5/2005 | Shuster |
| 6,904,453 B2 | | 6/2005 | Shuster |
| 6,912,565 B1 | | 6/2005 | Powers et al. |
| 6,922,781 B1 | | 7/2005 | Shuster |
| 6,978,252 B2 | | 12/2005 | Shuster |
| 7,051,362 B2 | | 5/2006 | Shuster |
| 7,089,278 B1 | | 8/2006 | Churchill et al. |
| 7,099,956 B2 | | 8/2006 | Shuster et al. |
| 7,200,863 B2 | | 4/2007 | Shuster |
| 7,218,914 B2 | | 5/2007 | Shuster |
| 7,228,327 B2 | | 6/2007 | Shuster |
| 7,272,631 B2 | | 9/2007 | Shuster |
| 7,370,110 B2 | | 5/2008 | Shuster |
| 7,406,708 B2 | | 7/2008 | Shuster |
| 7,412,514 B2 | | 8/2008 | Shuster |

(Continued)

OTHER PUBLICATIONS

International Search Report for International Application No. PCT/US2012/051503 dated Feb. 15, 2013.

*Primary Examiner* — Edward Martello
(74) *Attorney, Agent, or Firm* — Knobbe, Martens, Olson & Bear LLP

(57) ABSTRACT

Systems and methods of virtual world interaction, operation, implementation, instantiation, creation, and other functions related to virtual worlds (note that where the term "virtual world" is used herein, it is to be understood as referring to virtual world systems, virtual environments reflecting real, simulated, fantasy, or other structures, and includes information systems that utilize interaction within a 3D environment). Various embodiments facilitate interoperation between and within virtual worlds, and may provide consistent structures for operating virtual worlds. The disclosed embodiments may further enable individuals to build new virtual worlds within a framework, and allow third party users to better interact with those worlds.

7 Claims, 29 Drawing Sheets

U.S. PATENT DOCUMENTS

| | | |
|---|---|---|
| 7,428,576 B2 | 9/2008 | Shuster |
| 7,454,498 B2 | 11/2008 | Shuster |
| 7,460,737 B2 | 12/2008 | Shuster |
| 7,465,229 B2 | 12/2008 | Shuster |
| 7,493,660 B2 | 2/2009 | Shuster |
| 7,518,485 B2 | 4/2009 | Shuster |
| 7,539,736 B2 | 5/2009 | Shuster |
| 7,546,530 B1 | 6/2009 | Shuster et al. |
| 7,593,864 B2 | 9/2009 | Shuster |
| 7,734,504 B2 | 6/2010 | Shuster |
| 7,734,807 B2 | 6/2010 | Shuster |
| 7,744,464 B2 | 6/2010 | Shuster |
| 7,752,251 B1 | 7/2010 | Shuster et al. |
| 7,752,656 B2 | 7/2010 | Shuster |
| 7,757,298 B2 | 7/2010 | Shuster |
| 7,769,895 B1 | 8/2010 | Williams et al. |
| 7,779,280 B2 | 8/2010 | Shuster |
| 7,783,753 B2 | 8/2010 | Shuster |
| 7,797,408 B2 | 9/2010 | Shuster |
| 7,801,944 B2 | 9/2010 | Shuster |
| 7,803,042 B2 | 9/2010 | Shuster |
| 7,804,744 B2 | 9/2010 | Shuster |
| 7,809,789 B2 | 10/2010 | Shuster |
| 7,813,917 B2 | 10/2010 | Shuster |
| 7,835,294 B2 | 11/2010 | Shuster |
| 7,844,141 B2 | 11/2010 | Shuster |
| 7,874,521 B2 | 1/2011 | Shuster |
| 7,899,703 B2 | 3/2011 | Shuster |
| 7,914,144 B2 | 3/2011 | Shuster |
| 7,916,581 B2 | 3/2011 | Shuster |
| 7,916,619 B2 | 3/2011 | Shuster |
| 7,929,810 B2 | 4/2011 | Shuster |
| 7,937,320 B2 | 5/2011 | Shuster |
| 7,945,052 B2 | 5/2011 | Shuster |
| 7,958,303 B2 | 6/2011 | Shuster |
| 7,966,416 B2 | 6/2011 | Shuster |
| 7,970,378 B2 | 6/2011 | Shuster |
| 7,970,937 B2 | 6/2011 | Shuster et al. |
| 7,980,934 B2 | 7/2011 | Shuster et al. |
| 7,984,987 B1 | 7/2011 | Shuster |
| 7,996,491 B2 | 8/2011 | Shuster |
| 8,014,261 B2 | 9/2011 | Shuster |
| 8,015,285 B2 | 9/2011 | Shuster |
| 8,015,317 B2 | 9/2011 | Shuster et al. |
| 8,018,455 B2 | 9/2011 | Shuster |
| 8,049,756 B2 | 11/2011 | Shuster |
| 8,087,616 B2 | 1/2012 | Shuster |
| 8,108,774 B2 | 1/2012 | Finn et al. |
| 8,113,959 B2 | 2/2012 | de Judicibus |
| 8,117,068 B2 | 2/2012 | Shuster et al. |
| 8,117,258 B2 | 2/2012 | Shuster |
| 8,126,971 B2 | 2/2012 | Shuster |
| 8,150,680 B2 | 4/2012 | Shuster |
| 8,167,724 B2 | 5/2012 | Shuster |
| 8,171,113 B2 | 5/2012 | Shuster |
| 8,194,564 B2 | 6/2012 | Shuster |
| 8,206,222 B2 | 6/2012 | Shuster |
| 8,212,661 B2 | 7/2012 | Shuster |
| 8,223,598 B2 | 7/2012 | Shuster |
| 8,245,283 B2 | 8/2012 | Dawson et al. |
| 8,253,735 B2 | 8/2012 | Shuster |
| 8,259,117 B2 | 9/2012 | Shuster et al. |
| 8,261,366 B2 | 9/2012 | Shuster |
| 8,276,071 B2 | 9/2012 | Shuster et al. |
| 8,290,948 B2 | 10/2012 | Shuster et al. |
| 8,291,340 B1 | 10/2012 | Shuster |
| 8,292,234 B2 | 10/2012 | Shuster |
| 8,311,940 B2 | 11/2012 | Shuster |
| 8,315,483 B2 | 11/2012 | Shuster |
| 8,316,452 B2 | 11/2012 | Shuster |
| 8,321,202 B2 | 11/2012 | Shuster |
| 8,321,531 B2 | 11/2012 | Shuster |
| 8,363,568 B2 | 1/2013 | Shuster |
| 8,364,773 B2 | 1/2013 | Shuster |
| 2001/0001863 A1 | 5/2001 | Shuster |
| 2001/0019337 A1 | 9/2001 | Kim |
| 2001/0034657 A1 | 10/2001 | Shuster et al. |
| 2001/0056371 A1 | 12/2001 | Shuster |
| 2001/0056383 A1 | 12/2001 | Shuster |
| 2002/0019771 A1 | 2/2002 | Shuster |
| 2002/0019800 A1 | 2/2002 | Shuster |
| 2002/0022999 A1 | 2/2002 | Shuster et al. |
| 2002/0023135 A1 | 2/2002 | Shuster |
| 2002/0059370 A1 | 5/2002 | Shuster |
| 2002/0073335 A1 | 6/2002 | Shuster |
| 2002/0082926 A1 | 6/2002 | Shuster |
| 2002/0083070 A1 | 6/2002 | Shuster |
| 2002/0087429 A1 | 7/2002 | Shuster |
| 2002/0089960 A1 | 7/2002 | Shuster |
| 2002/0091825 A1 | 7/2002 | Shuster |
| 2002/0095482 A1 | 7/2002 | Shuster |
| 2002/0103915 A1 | 8/2002 | Shuster |
| 2002/0140698 A1 | 10/2002 | Robertson et al. |
| 2002/0169829 A1 | 11/2002 | Shuster |
| 2003/0009533 A1 | 1/2003 | Shuster |
| 2003/0177187 A1 | 9/2003 | Levine et al. |
| 2003/0197737 A1 | 10/2003 | Kim |
| 2004/0072603 A1 | 4/2004 | Shuster |
| 2004/0073439 A1 | 4/2004 | Shuster |
| 2004/0162131 A1 | 8/2004 | Shuster |
| 2004/0172465 A1 | 9/2004 | Shuster et al. |
| 2004/0210560 A1 | 10/2004 | Shuster |
| 2004/0252018 A1 | 12/2004 | Shuster |
| 2005/0021612 A1 | 1/2005 | Shuster |
| 2005/0097059 A1 | 5/2005 | Shuster |
| 2005/0120042 A1 | 6/2005 | Shuster et al. |
| 2005/0120249 A1 | 6/2005 | Shuster |
| 2005/0169274 A1 | 8/2005 | Shuster |
| 2005/0203996 A1 | 9/2005 | Shuster |
| 2005/0215270 A1 | 9/2005 | Shuster |
| 2005/0228795 A1 | 10/2005 | Shuster |
| 2006/0015366 A1 | 1/2006 | Shuster |
| 2006/0018542 A1 | 1/2006 | Shuster |
| 2006/0080084 A1 | 4/2006 | Shuster |
| 2006/0140405 A1 | 6/2006 | Thommana et al. |
| 2006/0143364 A1 | 6/2006 | Shuster |
| 2006/0189373 A1 | 8/2006 | Shuster |
| 2006/0234795 A1 | 10/2006 | Dhunjishaw et al. |
| 2006/0293973 A1 | 12/2006 | Shuster et al. |
| 2007/0013691 A1 | 1/2007 | Jung et al. |
| 2007/0067655 A1 | 3/2007 | Shuster |
| 2007/0076711 A1 | 4/2007 | Shuster |
| 2007/0093232 A1 | 4/2007 | Shuster |
| 2007/0094679 A1 | 4/2007 | Shuster |
| 2007/0108275 A1 | 5/2007 | Shuster |
| 2007/0111772 A1 | 5/2007 | Shuster et al. |
| 2007/0138345 A1 | 6/2007 | Shuster |
| 2007/0157293 A1 | 7/2007 | Shuster |
| 2007/0168214 A1 | 7/2007 | Jung et al. |
| 2007/0213032 A1 | 9/2007 | Shuster |
| 2007/0255810 A1 | 11/2007 | Shuster |
| 2007/0271162 A1 | 11/2007 | Shuster |
| 2007/0294064 A1 | 12/2007 | Shuster |
| 2008/0015964 A1 | 1/2008 | Shuster |
| 2008/0055306 A1 | 3/2008 | Kwok et al. |
| 2008/0070664 A1 | 3/2008 | Shuster |
| 2008/0081701 A1 | 4/2008 | Shuster |
| 2008/0092065 A1 | 4/2008 | Jung et al. |
| 2008/0120558 A1* | 5/2008 | Nathan et al. ................. 715/764 |
| 2008/0133392 A1 | 6/2008 | Jung et al. |
| 2008/0134056 A1 | 6/2008 | Shuster |
| 2008/0158232 A1 | 7/2008 | Shuster |
| 2008/0169605 A1 | 7/2008 | Shuster et al. |
| 2008/0171591 A1 | 7/2008 | Shuster |
| 2008/0209017 A1 | 8/2008 | Shuster |
| 2008/0240444 A1 | 10/2008 | Shuster |
| 2008/0263460 A1 | 10/2008 | Altberg et al. |
| 2008/0272928 A1 | 11/2008 | Shuster |
| 2008/0273164 A1 | 11/2008 | Shuster |
| 2008/0273451 A1 | 11/2008 | Shuster |
| 2008/0274395 A1 | 11/2008 | Shuster |
| 2008/0275888 A1 | 11/2008 | Shuster |
| 2008/0275928 A1 | 11/2008 | Shuster |
| 2008/0276315 A1 | 11/2008 | Shuster |
| 2008/0282329 A1 | 11/2008 | Shuster |
| 2008/0282344 A1 | 11/2008 | Shuster |
| 2008/0301107 A1 | 12/2008 | Shuster |

| | | | | | | |
|---|---|---|---|---|---|---|
| 2008/0309671 A1 | 12/2008 | Shuster et al. | | 2011/0055267 A1 | 3/2011 | Bolger et al. |
| 2009/0037905 A1 | 2/2009 | Hamilton et al. | | 2011/0074108 A1 | 3/2011 | Shuster |
| 2009/0043604 A1 | 2/2009 | Jung et al. | | 2011/0082754 A1 | 4/2011 | Shuster |
| 2009/0063551 A1 | 3/2009 | Shuster | | 2011/0118912 A1 | 5/2011 | Shuster |
| 2009/0073817 A1 | 3/2009 | Shuster | | 2011/0119342 A1 | 5/2011 | Shuster |
| 2009/0076919 A1 | 3/2009 | Shuster | | 2011/0126272 A1 | 5/2011 | Betzler et al. |
| 2009/0083236 A1 | 3/2009 | Shuster | | 2011/0131509 A1 | 6/2011 | Brillhart et al. |
| 2009/0094327 A1 | 4/2009 | Shuster et al. | | 2011/0170047 A1 | 7/2011 | Shuster |
| 2009/0094535 A1 | 4/2009 | Bromenshenkel et al. | | 2011/0170401 A1 | 7/2011 | Shuster |
| 2009/0098931 A1 | 4/2009 | Shuster | | 2011/0176404 A1 | 7/2011 | Shuster |
| 2009/0109228 A1 | 4/2009 | Shuster | | 2011/0208654 A1 | 8/2011 | Shuster |
| 2009/0112906 A1 | 4/2009 | Shuster | | 2011/0238577 A1 | 9/2011 | Shuster |
| 2009/0113066 A1 | 4/2009 | Van Wie et al. | | 2011/0238662 A1 | 9/2011 | Shuster et al. |
| 2009/0128567 A1 | 5/2009 | Shuster et al. | | 2011/0238912 A1 | 9/2011 | Shuster |
| 2009/0141023 A1 | 6/2009 | Shuster | | 2011/0246026 A1 | 10/2011 | Shuster |
| 2009/0150229 A1 | 6/2009 | Shuster | | 2011/0246625 A1 | 10/2011 | Shuster |
| 2009/0150418 A1 | 6/2009 | Shuster | | 2011/0249912 A1 | 10/2011 | Shuster |
| 2009/0158150 A1 | 6/2009 | Lyle et al. | | 2011/0250974 A1 | 10/2011 | Shuster |
| 2009/0164597 A1 | 6/2009 | Shuster | | 2011/0252159 A1 | 10/2011 | Shuster et al. |
| 2009/0171981 A1 | 7/2009 | Shuster | | 2011/0256845 A1 | 10/2011 | Shuster |
| 2009/0197685 A1 | 8/2009 | Shuster | | 2011/0269519 A1 | 11/2011 | Shuster et al. |
| 2009/0210504 A1 | 8/2009 | Shuster | | 2011/0269532 A1 | 11/2011 | Shuster et al. |
| 2009/0225074 A1 | 9/2009 | Bates et al. | | 2011/0276477 A1 | 11/2011 | Shuster |
| 2009/0235183 A1 | 9/2009 | Hamilton et al. | | 2011/0279768 A1 | 11/2011 | Shuster |
| 2009/0249449 A1 | 10/2009 | Shuster | | 2011/0282971 A1 | 11/2011 | Shuster |
| 2009/0254968 A1 | 10/2009 | Bussani et al. | | 2011/0283105 A1 | 11/2011 | Shuster |
| 2009/0265342 A1 | 10/2009 | Shuster | | 2011/0301760 A1 | 12/2011 | Shuster et al. |
| 2009/0265639 A1 | 10/2009 | Shuster | | 2011/0313876 A1 | 12/2011 | Shuster et al. |
| 2009/0265661 A1 | 10/2009 | Shuster | | 2011/0316852 A1 | 12/2011 | Shuster |
| 2009/0265667 A1 | 10/2009 | Reisinger | | 2012/0030289 A1 | 2/2012 | Buford et al. |
| 2009/0276718 A1 | 11/2009 | Dawson et al. | | 2012/0042276 A1 | 2/2012 | Shuster |
| 2009/0287569 A1 | 11/2009 | Shuster et al. | | 2012/0044365 A1 | 2/2012 | Shuster |
| 2009/0287614 A1 | 11/2009 | Amsterdam et al. | | 2012/0050005 A1 | 3/2012 | Shuster |
| 2009/0292696 A1 | 11/2009 | Shuster | | 2012/0059886 A1 | 3/2012 | Shuster |
| 2009/0295562 A1 | 12/2009 | Shuster | | 2012/0105457 A1 | 5/2012 | Shuster |
| 2009/0307196 A1 | 12/2009 | Shuster | | 2012/0106805 A1 | 5/2012 | Shuster |
| 2009/0312080 A1 | 12/2009 | Hamilton et al. | | 2012/0115603 A1 | 5/2012 | Shuster |
| 2009/0319609 A1 | 12/2009 | Ferraro | | 2012/0116889 A1 | 5/2012 | Shuster et al. |
| 2009/0319690 A1 | 12/2009 | Shuster et al. | | 2012/0123669 A1 | 5/2012 | Shuster |
| 2009/0325138 A1 | 12/2009 | Shuster | | 2012/0150677 A1 | 6/2012 | Shuster |
| 2009/0328175 A1 | 12/2009 | Shuster | | 2012/0155720 A1 | 6/2012 | Shuster |
| 2010/0001993 A1* | 1/2010 | Finn et al. .................... 345/419 | | 2012/0158877 A1 | 6/2012 | Shuster |
| 2010/0005028 A1 | 1/2010 | Hartley et al. | | 2012/0163269 A1 | 6/2012 | Shuster et al. |
| 2010/0011359 A1 | 1/2010 | Shuster | | 2012/0170922 A1 | 7/2012 | Shuster |
| 2010/0050004 A1 | 2/2010 | Hamilton et al. | | 2012/0173605 A1 | 7/2012 | Shuster |
| 2010/0070859 A1 | 3/2010 | Shuster et al. | | 2012/0177248 A1 | 7/2012 | Shuster |
| 2010/0077313 A1 | 3/2010 | Draese et al. | | 2012/0185251 A1 | 7/2012 | Shuster |
| 2010/0121729 A1 | 5/2010 | Betzler et al. | | 2012/0188233 A1 | 7/2012 | Shuster et al. |
| 2010/0138455 A1 | 6/2010 | Alewine et al. | | 2012/0215886 A1 | 8/2012 | Shuster |
| 2010/0138755 A1 | 6/2010 | Kulkarni et al. | | 2012/0220369 A1 | 8/2012 | Shuster |
| 2010/0185739 A1 | 7/2010 | Shuster | | 2012/0223940 A1 | 9/2012 | Dunstan et al. |
| 2010/0205053 A1 | 8/2010 | Shuster | | 2012/0231891 A1 | 9/2012 | Watkins et al. |
| 2010/0207781 A1 | 8/2010 | Shuster | | 2012/0233279 A1 | 9/2012 | Shuster |
| 2010/0217842 A1 | 8/2010 | Shuster | | 2012/0242867 A1 | 9/2012 | Shuster |
| 2010/0229235 A1 | 9/2010 | Dawson et al. | | 2012/0259999 A1 | 10/2012 | Shuster et al. |
| 2010/0235234 A1 | 9/2010 | Shuster | | 2012/0270530 A1 | 10/2012 | Shuster |
| 2010/0245062 A1 | 9/2010 | Shuster | | 2012/0271918 A1 | 10/2012 | Shuster et al. |
| 2010/0245617 A1 | 9/2010 | Shuster | | 2012/0271919 A1 | 10/2012 | Shuster et al. |
| 2010/0250546 A1 | 9/2010 | Shuster | | 2012/0275284 A1 | 11/2012 | Shuster |
| 2010/0251337 A1 | 9/2010 | Amsterdam et al. | | 2012/0327085 A1 | 12/2012 | Shuster et al. |
| 2010/0251344 A1 | 9/2010 | Shuster | | 2012/0330445 A1 | 12/2012 | Shuster |
| 2010/0275136 A1 | 10/2010 | Gower | | 2012/0331572 A1 | 12/2012 | Shuster |
| 2010/0287368 A1 | 11/2010 | Shuster et al. | | 2013/0006799 A1 | 1/2013 | Shuster et al. |
| 2010/0293621 A1 | 11/2010 | Shuster | | 2013/0021338 A1 | 1/2013 | Shuster et al. |
| 2010/0311486 A1 | 12/2010 | Shuster | | 2013/0036163 A1 | 2/2013 | Shuster |
| 2010/0313042 A1 | 12/2010 | Shuster | | 2013/0036371 A1 | 2/2013 | Cohen |
| 2010/0318603 A1 | 12/2010 | Shuster | | 2013/0041907 A1 | 2/2013 | Shuster et al. |
| 2010/0329519 A1 | 12/2010 | Shuster | | 2013/0044106 A1 | 2/2013 | Shuster et al. |
| 2011/0010462 A1 | 1/2011 | Shuster | | 2013/0044107 A1 | 2/2013 | Burch et al. |
| 2011/0010675 A1 | 1/2011 | Hamilton et al. | | 2013/0046853 A1 | 2/2013 | Shuster et al. |
| 2011/0013503 A1 | 1/2011 | Shuster | | 2013/0046854 A1 | 2/2013 | Shuster et al. |
| 2011/0018870 A1 | 1/2011 | Shuster | | 2013/0047098 A1 | 2/2013 | Shuster et al. |
| 2011/0029302 A1 | 2/2011 | Shuster | | 2013/0047208 A1 | 2/2013 | Shuster et al. |
| 2011/0047205 A1 | 2/2011 | Shuster | | 2013/0047217 A1 | 2/2013 | Shuster et al. |
| 2011/0047828 A1 | 3/2011 | Shuster | | | | |
| 2011/0054918 A1 | 3/2011 | Hamilton et al. | | * cited by examiner | | |
| 2011/0055136 A1 | 3/2011 | Hamilton et al. | | | | |

SYSTEMS AND METHODS OF MANAGED SCRIPT EXECUTION

CROSS-REFERENCE TO RELATED APPLICATIONS

This specification claims priority as a non-provisional application to U.S. Prov. Pat. App. No. 61/524,956, filed Aug. 18, 2011. The aforementioned application is hereby incorporated by reference in its entireties as if set forth herein.

BACKGROUND

Information, graphical and other content on the Internet today is primarily presented in two-dimensional form, such as web pages (the "Flat Web"). Efforts have been made to introduce three-dimensional worlds to existing technology, but those have treated the three dimensional environment as a game or limited application utility, such as a three dimensional rending of a car based on user inputs made to a car manufacturer's website. Furthermore, extent three-dimensional world systems are monolithic and typically controlled, operated, and managed by a single entity and limited to a scope far smaller than the Flat Web. Accordingly, development of a widely scoped three dimensional information system, whether denominated as a virtual world system or the "3D Web", has been precluded by the narrow scope of those systems, the often idiosyncratic policies and interfaces implemented by the managers of those systems, and the lack of innovative technological solutions necessary to overcome extent technological barriers to implementation.

SUMMARY

Accordingly, disclosed herein are systems and methods of virtual world interaction, operation, implementation, instantiation, creation, and other functions related to virtual worlds (note that where the term "virtual world" is used herein, it is to be understood as referring to virtual world systems, virtual environments reflecting real, simulated, fantasy, or other structures, and includes information systems that utilize interaction within a 3D environment). Various embodiments facilitate interoperation between and within virtual worlds, and may provide consistent structures for operating virtual worlds. The disclosed embodiments may further enable individuals to build new virtual worlds within a framework, and allow third party users to better interact with those worlds.

An embodiment is a method of communicating user data between virtual worlds systems. The method is performed on a virtual worlds server. The virtual worlds server, which includes one or more processors, receives a request for a transfer of an avatar from an external virtual worlds server. The virtual worlds server determines authorization rights of the avatar to access the virtual worlds server. The virtual worlds server completes a transfer protocol with the external virtual worlds server. The virtual worlds server converts characteristics associated with the avatar based on one or more conversion rules associated with the virtual worlds server. The virtual worlds server engages the avatar for interaction with one or more worlds on the virtual worlds server.

Optionally in any of the aforementioned embodiments, completing the transfer protocol comprises performing a cryptographically secure transfer configured to inhibit the avatar from appearing in multiple virtual worlds simultaneously.

Optionally in any of the aforementioned embodiments, converting the characteristics comprises matching the characteristics with comparable characteristics permitted by the virtual worlds server.

Optionally in any of the aforementioned embodiments, converting the characteristics further comprises determining a difference in value between the characteristics and the comparable characteristics, and providing a credit accounting for the difference in value.

Optionally in any of the aforementioned embodiments, matching the characteristics comprises analyzing one or more attributes of the characteristics and one or more attributes of the comparable characteristics.

Optionally in any of the aforementioned embodiments, matching the characteristics comprises processing one or more local-to-local conversion agreement rules associated with the virtual worlds server and the external virtual worlds server.

Optionally in any of the aforementioned embodiments, the external virtual worlds server is housed on the same computing device as the virtual worlds server.

Optionally in any of the aforementioned embodiments, converting the characteristics comprises modifying a global avatar state associated with the avatar to reflect the conversion of the characteristics.

Optionally in any of the aforementioned embodiments, converting the characteristics comprises storing a local avatar state associated with the avatar to reflect the conversion of the characteristics. A global avatar state associated with the avatar need not be modified.

Optionally in any of the aforementioned embodiments, converting the characteristics comprises modifying one or more of the characteristics based on a previously stored local avatar state associated with the avatar. Effects of previous activities of the avatar on the virtual worlds server may be restored to the avatar.

An embodiment is a computer system configured to communicate user data between virtual worlds systems. The computer system includes computer-readable storage having stored thereon a plurality of modules implemented as executable instructions. The computer system includes one or more computer processors configured to execute the plurality of modules. The computer system includes a transfer receipt module configured to receive a request for a transfer of an avatar from an external virtual worlds server. The computer system includes an authorization module configured to determine authorization rights of the avatar to access the virtual worlds server. The computer system includes a transfer module configured to complete a transfer protocol with the external virtual worlds server. The computer system includes a conversion module configured to convert characteristics associated with the avatar based on one or more conversion rules associated with the virtual worlds server. The computer system includes an interaction module configured to engage the avatar for interaction with one or more worlds on the virtual worlds server.

An embodiment is a method of determining permissibility of actions within a virtual world. The service provider identifies, by a service provider comprising computing hardware, an attempt by a virtual world entity to take an action upon an object within a virtual world. The service provider selects one or more gatekeeper objects having permission rules configured to determine permissibility of the action to be taken by the virtual world entity on the object. The permission rules includes one or more of an avatar matching component, an action matching component, and an object matching component. The service provider iterates through one or more of the gatekeeper objects to identify one or more applicable permission rules based on the virtual world entity, the action to be taken, and the object to be acted upon. The service provider determines whether the action is permitted based on the one or more applicable permission rules. The service provider automatically permits or disallows the action based on the determination of whether the action is permitted.

Optionally in any of the aforementioned embodiments, the gatekeeper objects comprise a service provider, a virtual world, and a scene within the virtual world.

Optionally in any of the aforementioned embodiments, the gatekeeper objects include the object being acted upon.

Optionally in any of the aforementioned embodiments, the permission rules further include an indication of whether to inherit permissibility from a parent gatekeeper object.

Optionally in any of the aforementioned embodiments, the permission rules further indicate whether each permission rule may be overridden by a subsequent permission rule.

Optionally in any of the aforementioned embodiments, identifying the attempt comprises receiving, from a user computer, a request to perform the action on the object.

Optionally in any of the aforementioned embodiments, the request identifies a script to be executed. The script is associated with the object.

Optionally in any of the aforementioned embodiments, the request identifies a modification to an element of a document structure associated with the object.

An embodiment is a computer system configured to determine permissibility of actions within a virtual world. The computer system includes computer-readable storage having stored thereon a plurality of modules implemented as executable instructions. The computer system includes one or more computer processors configured to execute the plurality of modules. The computer system includes an action identification module configured to identify an attempt by a virtual world entity to take an action upon an object within a virtual world. The computer system includes a gatekeeper selection module configured to select one or more gatekeeper objects having permission rules configured to determine permissibility of the action to be taken by the virtual world entity on the object. The permission rules includes one or more of an avatar matching component, an action matching component, and an object matching component. The computer system includes a rule application module configured to iterate through one or more of the gatekeeper objects to identify one or more applicable permission rules based on the virtual world entity, the action to be taken, and the object to be acted upon. The computer system includes a permission determination module configured to determine whether the action is permitted based on the one or more applicable permission rules. The computer system includes a rule execution module configured to automatically permit or disallow the action based on the determination of whether the action is permitted.

An embodiment is a method of operating executable scripts on a virtual worlds system to enable automation of actions on a virtual worlds system. The virtual worlds system maintains, on computer-readable media, a data representation of a virtual space. The data representation includes a hierarchical representation of objects within the virtual space. The hierarchical representation includes an executable script associated with a first object within the hierarchical representation. The virtual worlds system executes the executable script on one or more computer processors in communication with the computer-readable media. The virtual worlds system enables the executable script to modify a second object within the hierarchical representation, based on a determination that the second object is the same as or a descendant of the first object with which the executable script is associated. The virtual worlds system prevents the executable script from modifying a third object within the hierarchical representation, based on a determination that the third object is not the same as or a descendant of the first object with which the executable script is associated.

Optionally in any of the aforementioned embodiments, the hierarchical representation of objects is associated with a document object model.

Optionally in any of the aforementioned embodiments, the script is maintained as a subelement of the first object in the hierarchical representation.

Optionally in any of the aforementioned embodiments, the method also includes enabling the executable script to invoke a second executable script associated with the third object. The executable script may indirectly modify the third object through invocation of the second executable script.

Optionally in any of the aforementioned embodiments, the executable script invokes the second executable script by executing a function naming an action identifier associated with the second executable script.

An embodiment is a computer system configured to operate executable scripts on a virtual worlds system to enable automation of actions on the virtual worlds system. The computer system includes computer-readable storage having stored thereon a plurality of modules implemented as executable instructions. The computer system includes one or more computer processors configured to execute the plurality of modules. The computer system includes stored computer data comprising a data representation of a virtual space. The data representation includes a hierarchical representation of objects within the virtual space. The hierarchical representation includes an executable script associated with a first object within the hierarchical representation. The computer system includes a script execution module configured to execute the executable script on one or more computer processors in communication with the computer-readable media. The computer system includes an object modification module configured to enable the executable script to modify a second object within the hierarchical representation, based on a determination that the second object is the same as or a descendant of the first object with which the executable script is associated. The object modification module is further configured to prevent the executable script from modifying a third object within the hierarchical representation, based on a determination that the third object is not the same as or a descendant of the first object with which the executable script is associated.

An embodiment is a method of representing a three-dimensional space via a computer network. A virtual worlds service provider configured to operate a three-dimensional virtual world receives a request for access to the three-dimensional virtual world. The virtual worlds service provider determines whether the request should be served with three-dimensional virtual world data or a two-dimensional representation of the three-dimensional virtual world data. The determination is based on the content of the request for access. The virtual worlds service provider, in response to determining that the request should be served with three-dimensional virtual world data, transmits the three dimensional virtual world data. The virtual worlds service provider, in response to determining that the request should be served with a two-dimensional representation of the three-dimensional virtual world data, generates a two-dimensional representation based on the existing state of the three-dimensional virtual world, and transmits user interface data including the two-dimensional representation. The user interface data includes executable code configured to enable a user to interact with the three-dimensional virtual world using a two-dimensional interface.

Optionally in any of the aforementioned embodiments, determining whether the request should be served with three-dimensional virtual world data or a two-dimensional representation of the three-dimensional virtual world data comprises determining a protocol associated with the request.

Optionally in any of the aforementioned embodiments, determining whether the request should be served with three-dimensional virtual world data or a two-dimensional representation of the three-dimensional virtual world data comprises determining a user agent associated with the request.

Optionally in any of the aforementioned embodiments, generating the two-dimensional representation comprises identifying a vantage point within the three-dimensional virtual world and transmitting a two-dimensional rendering of the virtual world based on the identified vantage point.

Optionally in any of the aforementioned embodiments, the vantage point is identified based on an identifier in the request.

Optionally in any of the aforementioned embodiments, the executable code is configured to present a chat interface enabling the user to send and receive messages within the three-dimensional virtual world.

Optionally in any of the aforementioned embodiments, the method also includes inserting an avatar representation into the three-dimensional virtual world in response to determining that the request should be served with a two-dimensional representation. The avatar representation is configured to indicate that the user associated with the avatar is accessing the two-dimensional representation.

Optionally in any of the aforementioned embodiments, the user interface data is configured to be indexable by a search engine.

An embodiment is a computer system configured to represent a three-dimensional space via a computer network. The computer system includes computer-readable storage having stored thereon a plurality of modules implemented as executable instructions. The computer system includes one or more computer processors configured to execute the plurality of modules. The computer system includes a request processing module configured to receive a request for access to the three-dimensional virtual world. The computer system includes a dimensionality assessment module configured to determine whether the request should be served with three-dimensional virtual world data or a two-dimensional representation of the three-dimensional virtual world data. The determination is based on the content of the request for access. The computer system includes a three-dimensional content module configured to respond to a determination that the request should be served with three-dimensional virtual world data, by transmitting the three dimensional virtual world data. The computer system includes a two-dimensional content module configured to respond to a determination that the request should be served with a two-dimensional representation of the three-dimensional virtual world data, by generating a two-dimensional representation based on the existing state of the three-dimensional virtual world, and transmitting user interface data including the two-dimensional representation. The user interface data includes executable code configured to enable a user to interact with the three-dimensional virtual world using a two-dimensional interface.

An embodiment is a method of arranging objects within a three-dimensional virtual space. The method is performed on a virtual worlds service provider. The virtual worlds service provider maintains, on a service provider comprising one or more computer processors, an instance of a virtual world scene comprising a plurality of objects in a first spatial arrangement. The virtual worlds service provider identifies a first object of the plurality of objects. The first object has a first spatial position. The virtual worlds service provider compares the first spatial position of the first object to an original spatial position associated with the first object. The virtual worlds service provider computes a transition path for replacing the first object from the first spatial position to the original spatial position, based on the comparison of the first spatial position of the first object and the original spatial position. The virtual worlds service provider automatically transitions the first object based on the computed transition path.

Optionally in any of the aforementioned embodiments, automatically transitioning the first object comprises causing the first object to autonomously transport along the computed transition path.

Optionally in any of the aforementioned embodiments, automatically transitioning the first object comprises introducing a non-player character to transition the first object based on the computed transition path.

Optionally in any of the aforementioned embodiments, the non-player character is configurable by an operator of the three-dimensional virtual space.

Optionally in any of the aforementioned embodiments, the original spatial position is associated with the virtual world scene.

Optionally in any of the aforementioned embodiments, automatically transitioning the first object comprises determining a speed for transitioning the first object and transitioning the first object based on the determined speed.

Optionally in any of the aforementioned embodiments, the speed is determined at least in part based on the number of avatars present in the instance of the virtual world scene.

An embodiment is a computer system configured to arrange objects within a three-dimensional virtual space. The computer system includes computer-readable storage having stored thereon a plurality of modules implemented as executable instructions. The computer system includes one or more computer processors configured to execute the plurality of modules. The computer system includes stored data representing an instance of a virtual world scene comprising a plurality of objects in a first spatial arrangement. The computer system includes an object identification module configured to identify a first object of the plurality of objects. The first object has a first spatial position. The computer system includes a position comparison module configured to compare the first spatial position of the first object to an original spatial position associated with the first object. The computer system includes a path computation module configured to compute a transition path for replacing the first object from the first spatial position to the original spatial position, based on the comparison of the first spatial position of the first object and the original spatial position. The computer system includes a path execution module configured to automatically transition the first object based on the computed transition path.

An embodiment is a method of interoperating between two-dimensional and three-dimensional representations of a virtual world. The system receives, from a client computer, a request for access to a virtual world. The request indicates a location in the virtual world to be accessed. The system determines that a two-dimensional representation of the virtual world should be served to the client computer, based on content of the received request for access. The system transmits, to the client computer, two-dimensional content representing the virtual world. The two-dimensional content comprises an indicator configured to cause the client computer to invoke a virtual world browser configured to process three-dimensional content. The indicator is further configured to cause the virtual world browser to access a location in the virtual world corresponding to the location in the virtual world indicated in the received request for access.

Optionally in any of the aforementioned embodiments, the indicator comprises a tag within HTML content transmitted to the client computer.

Optionally in any of the aforementioned embodiments, the tag includes a URL identifying a protocol associated with the virtual world browser.

Optionally in any of the aforementioned embodiments, the indicator is configured to cause the virtual world browser to display the three-dimensional content in a flippable interface enabling a user of the client computer to switch between the two-dimensional representation and the three-dimensional content.

Optionally in any of the aforementioned embodiments, determining that the two-dimensional representation of the virtual world should be served comprises determining a user agent associated with the request for access.

Optionally in any of the aforementioned embodiments, determining that the two-dimensional representation of the virtual world should be served comprises determining a protocol associated with the request for access.

An embodiment is a computer system configured to interoperate between two-dimensional and three-dimensional representations of a virtual world. The computer system includes computer-readable storage having stored thereon a plurality of modules implemented as executable instructions. The computer system includes one or more computer processors configured to execute the plurality of modules. The computer system includes a request processing module configured to receive, from a client computer, a request for access to a virtual world. The request indicates a location in the virtual world to be accessed. The computer system includes a dimensionality assessment module configured to determine that a two-dimensional representation of the virtual world should be served to the client computer, based on content of the received request for access. The computer system includes a two-dimensional content module configured to transmit, to the client computer, two-dimensional content representing the virtual world. The two-dimensional content comprises an indicator configured to cause the client computer to invoke a virtual world browser configured to process three-dimensional content. The indicator is further configured to cause the virtual world browser to access a location in the virtual world corresponding to the location in the virtual world indicated in the received request for access.

An embodiment is a method, which may be performed by a computer system for example. The system instantiates, in one or more computer memories, an instance of a three-dimensional scene defined by a collection of document objects. The document objects are encoded in a descriptive language and define respective three dimensional modeled objects or spaces. The system controls contents of the collection of document objects in response to signals received by a processor from one or more client devices. The system records, in the one or more computer memories, a sequence of three-dimensional scene states based on respective states of the scene at successive times of a time sequence, including at least position and orientation of three-dimensional objects modeled in the scene. The system provides data representing the sequence of three-dimensional scene states to the one or more clients.

Optionally in any of the aforementioned embodiments, the method also includes instantiating the instance of the scene at least in part by instantiating ones of the document objects in the collection.

Optionally in any of the aforementioned embodiments, the method also includes instantiating at least one of the document objects at least in part by creating, from a document template received by the processor, a copy of the at least one of the document objects in the collection of document objects.

Optionally in any of the aforementioned embodiments, the method also includes organizing the collection of document objects in a hierarchical tree based on document object properties.

Optionally in any of the aforementioned embodiments, the method also includes installing one or more components in the one or more computer memories adapted for supporting the instance of the scene, in response to receiving an instruction from a server.

Optionally in any of the aforementioned embodiments, the method also includes controlling the collection of document objects at least in part by detecting, using the one or more components executing by the processor, ones of the signals signifying events corresponding to ones of the document objects.

Optionally in any of the aforementioned embodiments, the method also includes generating an information signal in response to the detecting the ones of the signals signifying events, and transmitting the information signal to the server.

Optionally in any of the aforementioned embodiments, the method also includes communicating with the server using the one of more components executing by the processor to determine respective outcomes of the events.

Optionally in any of the aforementioned embodiments, the method also includes updating states of one or more of the document objects in the collection, according to the respective outcomes.

Optionally in any of the aforementioned embodiments, the method also includes formatting the data into a format enabling a three-dimensional animated display of the scene for a user interface of the one or more clients.

Optionally in any of the aforementioned embodiments, the method also includes interpreting the document objects according to the markup language selected from the group consisting of: a Hypertext Markup Language (HTML) object, an Extensible Hypertext Markup Language (XHTML) or Extensible Markup Language (XML).

An embodiment is an apparatus comprising a processor coupled to a memory. The memory holds instructions that when executed by the processor, cause the apparatus to perform operations. The apparatus instantiates an instance of a three-dimensional scene defined by a collection of document objects. The document objects are encoded in a markup language and define respective three-dimensional modeled objects or spaces. The apparatus controls contents of the collection of document objects in response to signals from one or more client devices. The apparatus records a sequence of three-dimensional scene states based on respective states of the scene at successive times of a time sequence, including at least position and orientation of three-dimensional objects modeled in the scene. The apparatus provides data representing the sequence of three-dimensional scene states to the one or more clients.

Optionally in any of the aforementioned embodiments, the memory holds further instructions for instantiating the instance of the scene at least in part by instantiating ones of the document objects in the collection.

Optionally in any of the aforementioned embodiments, the memory holds further instructions for instantiating at least one of the document objects at least in part by creating, from a document template received by the processor, a copy of the at least one of the document objects in the collection of document objects.

Optionally in any of the aforementioned embodiments, the memory holds further instructions for organizing the collection of document objects in a hierarchical tree based on document object properties.

Optionally in any of the aforementioned embodiments, the memory holds further instructions for installing one or more components in the one or more computer memories adapted for supporting the instance of the scene, in response to receiving an instruction from a server.

Optionally in any of the aforementioned embodiments, the memory holds further instructions for controlling the collection of document objects at least in part by detecting, using the one or more components executing by the processor, ones of the signals signifying events corresponding to ones of the document objects.

Optionally in any of the aforementioned embodiments, the memory holds further instructions for generating an information signal in response to the detecting the ones of the signals signifying events, and transmitting the information signal to the server.

Optionally in any of the aforementioned embodiments, the memory holds further instructions for communicating with the server using the one or more components executing by the processor to determine respective outcomes of the events.

Optionally in any of the aforementioned embodiments, the memory holds further instructions for updating states of one or more of the document objects in the collection, according to the respective outcomes.

Optionally in any of the aforementioned embodiments, the memory holds further instructions for formatting the data into a format enabling a three-dimensional animated display of the scene for a user interface of the one or more clients.

Optionally in any of the aforementioned embodiments, the memory holds further instructions for interpreting the document objects according to the markup language selected from the group consisting of: a Hypertext Markup Language (HTML) object, an Extensible Hypertext Markup Language (XHTML) or Extensible Markup Language (XML).

An embodiment is a system. The system includes one or more objects defined according to a protocol for a virtual environment. The system includes one or more scenes within the virtual environment. The system includes one or more virtual environments, a subset of which are defined as part of at least one of the virtual environments not in the subset. The system includes a database containing information defining permissions each of the objects, scenes, and virtual environments is permitted to grant to, or exercise against, one or more of the other objects, scenes, or virtual environments.

Optionally in any of the aforementioned embodiments, the system also includes means for realizing the permissions data in an instance of the one or more scenes by limiting the ability of objects, scenes, and virtual environments to interact to interactions compatible with the extent permissions. Virtual environments are permitted to require, permit, preclude, or a combination thereof, permissions of scenes below it in a hierarchy, and scenes are permitted to require, permit, preclude, or a combination thereof, permissions of objects below it in a hierarchy.

Optionally in any of the aforementioned embodiments, database comprises data encoded into objects themselves and not centrally stored.

An embodiment is a computer system. The system includes an object or layer contained within a virtual environment holding templates for generation of one or more other objects or layers within a virtual environment. The system includes means for generating said one or more objects or layers. The system includes means for interacting with said one or more objects or layers by one or more users resulting in at least one alteration to the said objects or layers. The system includes means for determining, by reference to permissions data, whether one or more such alterations should be made persistent with regard to one or more other objects, other layers, or users.

Optionally in any of the aforementioned embodiments, the system also includes means for recording of the extent state of the objects or layers.

Optionally in any of the aforementioned embodiments, the system also includes means for determining whether a object, layer or user making changes in the recorded state had permission to change the instantiation of such object or layer with regard to a second user, object or layer. The second user, object, or layer attempts to instantiate an instance of the object or layer based stored on said template but also stored in said recorded state.

Optionally in any of the aforementioned embodiments, the system also includes means for instantiating the template version where such permissions are insufficient, or the recorded version when such permissions are sufficient.

Optionally in any of the aforementioned embodiments, persistence of the alteration may be time-limited or terminated by an event.

An embodiment is a system. The system includes computer-readable storage having stored thereon a plurality of modules implemented as executable instructions. The system includes one or more computer processors configured to execute the plurality of modules. The computer-readable storage has stored thereon data representing one or more virtual environments, configured to enable one of the virtual environments to be part of another virtual environment. It also has data representing one or more objects for use within the virtual environments. It also has data representing one or more scenes within the virtual environments. The system includes a database, including information indicating a grant of permissions from one of grantor objects, scenes, and virtual environments to one or more of actor objects, scenes, or virtual environments. The system includes an enforcement module configured to enforce the grant of permissions by limiting interactions performed by the actor objects, scenes, and virtual environments to interactions compatible with the granted permissions. The grant of permissions is configured to enable virtual environments to require, permit, preclude, or a combination thereof, permissions of scenes below it in a hierarchy. The grant of permissions is further configured to enable scenes to require, permit, preclude, or a combination thereof, permissions of objects below it in a hierarchy.

An embodiment is a system. The system includes computer-readable storage having stored thereon a plurality of modules implemented as executable instructions. The system includes one or more computer processors configured to execute the plurality of modules. The system includes a computer storage medium having stored thereon data representing an object or layer within a virtual environment that stores templates for generation of one or more other objects or layers within a virtual environment. The system includes a generation module configured to generate the one or more objects or layers. The system includes an interaction module configured to enable an altering user to interact with said one or more objects or layers resulting in at least one alteration to the one or more objects or layers. The system includes a determination module configured to determine, by reference to permissions data, whether one or more such alterations should be made persistent with regard to one or more other objects, other layers, or users. The system includes a recordation module configured to record of a state of such objects or layers. The system includes an instantiation module configured to determine, upon a second user, object, or layer attempting to instatiate an instance of an object or layer based on one of the templates and on recorded state, whether the altering user had permissions to act in a manner that changes the instantiation of such object or layer with regard to said second user. The instantiation module is configured to instantiate the template version where such permissions were insufficient, or the recorded version when such permissions were sufficient.

DETAILED DESCRIPTION OF SPECIFIC EMBODIMENTS

An aspect of the present disclosure concerns improvements and modifications to client applications and devices for participating in a hosted virtual reality process. The existing World Wide Web (also referred to as "web", "flat web", or "www" herein) is designed to display information and interact with users in two dimensions. Existing web clients can display quasi-three dimensional objects (such as graphics that appear rendered in 3D, or even objects such as images that actually display in three dimensions when viewed with appropriate hardware, such as red/blue glasses, polarized glasses, LCD shutter glasses or similar technology), but the user cannot navigate through a three dimensional array of data, objects, and other users. Disclosed herein are details regarding a client application that may be an end-user executable (or rendered display delivery mechanism such as a deliverable program), and that may, with regard to a three dimensional information and interaction space, be analogous to web browsers such as Internet Explorer or Google Chrome with regard to two dimensional data and interaction. It may be implemented as a browser plugin, an extension to existing software, a standalone application, web application (through Javascript or Flash, for example), mobile device application, and so on (collectively sometimes referenced herein as "new client").

Just as the existing HTTP protocol infrastructure includes the ability to engage in complex interlinking arrangements, the new client discussed herein enables the user to navigate a complex web of three dimensional spaces. This interlinked system of three dimensional spaces may be referred to herein as the "Virtual World Web," or "VWW."

Figure 1:
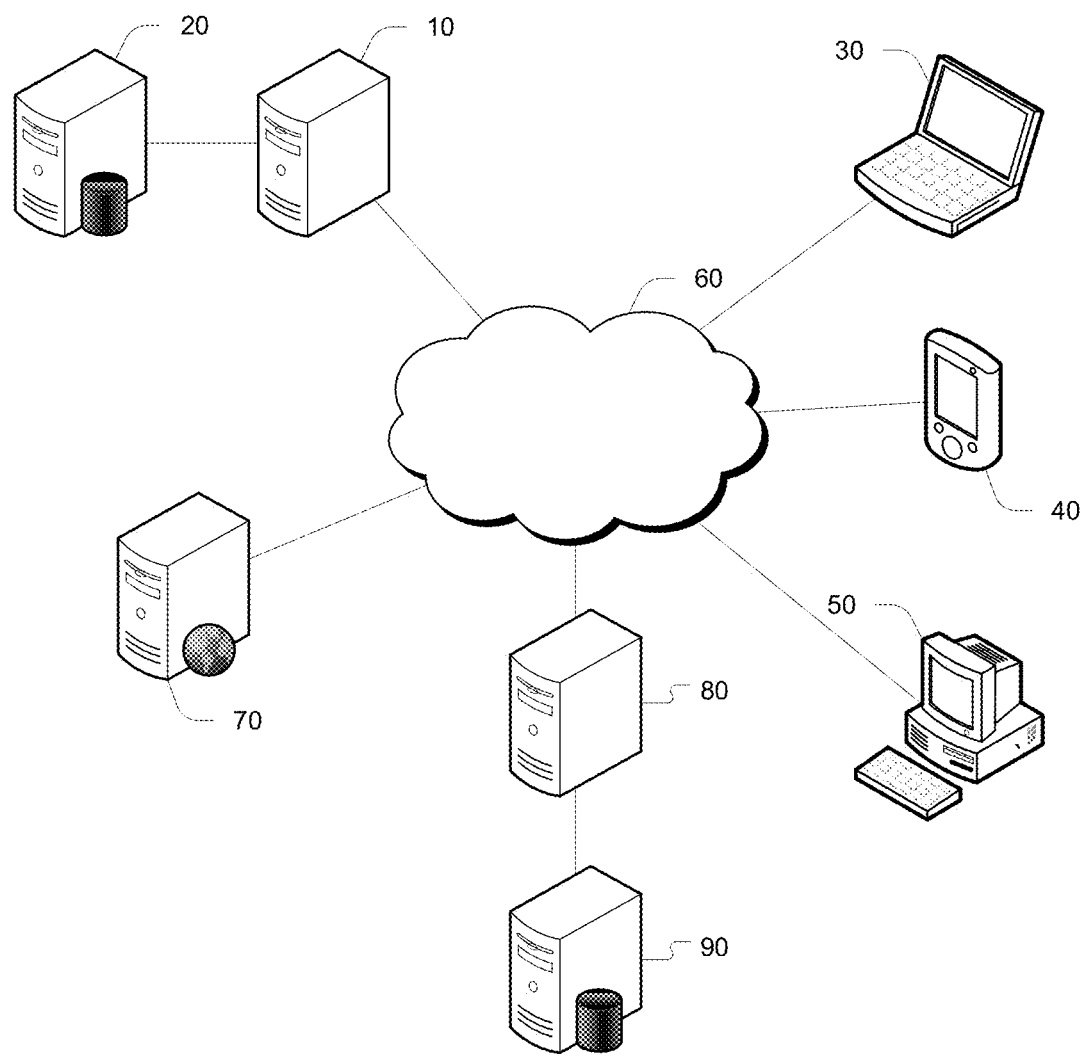
FIG. 1 is a block diagram of network components connected within the VWW, as used in an embodiment.

FIG. 1 is a block diagram of network components connected within the VWW, as used in an embodiment. In various embodiments, additional blocks may be included, some blocks may be removed, and/or blocks may be connected or arranged differently from what is shown. The embodiment of FIG. 1 includes a service provider such as world server 10, a root server which may include database server 20, client computer 30, client phone or other portable device 40, client computer 50, network 60 (such as the Internet, wide area network, and/or LAN), software server 70, third party service provider such as worlds server 80, and/or third party database server 90. Any of the aforementioned servers may be combined into a single computing device and/or housed on separate computing devices, and additional computing devices may similarly be included. Similarly, any one or more functions may be performed by a virtual machine, or by use of distributed computing, sharing tasks between a plurality of machines. Any of the foregoing may also be implemented as a peer to peer solution, where certain tasks (for example, calculations related to rendering of objects) may be performed on other machines (such as by utilizing the new client software running on one or more machines to perform rendering calculations requested by another of the machines running the new client software or to distribute copies of the new client software).

The physical layout of the system may include several elements. In an embodiment, end user computer 30 makes a request over a wide area network 60 to a software server 70 to download the client software. The software server 70 responds to the request by transmitting an executable package to the end user computer 30 via a wide area network 60. The operator of the end user computer 30 installs the executable client on the end user computer 30.

The operator of the end user computer 30 then starts the client software. The client software accesses a worlds server 10 via a wide area network 60 and either authenticates a customer account against a database 20 or creates a customer account in a database 20. Worlds servers 10 provide 2-dimensional and/or 3-dimensional virtual worlds services, such as hosting avatars and maintaining spaces and objects with which avatars can interact. Worlds servers 10 may perform various methods described throughout this specification, and may also be referred to as service providers or other devices. Worlds servers 10 may provide additional services such as transactional services, virtual currency services, authentication services, graphic design services, and the like. As the user computer 30 interacts with the virtual environment parameters transmitted by the worlds server 10, the worlds server 10 accesses the database 20 to obtain information about the user, the virtual environment, and the virtual objects in the environment.

Avatar Boundary Crossings

The operator of the client computer 30 may encounter an area in the virtual environment where control over the virtual environment is exercised by an operator other than the operator of the worlds server 10. Such a system boundary may be analogous to a hyperlink on a web page wherein the client web browser is directed to download new content from a third party operator different than the operator of the site that served the content containing the hyperlink. Similarly, an avatar could traverse a boundary within a virtual worlds server, such as between two rooms or buildings. In such a case, the technology may include several alternative methods. In one embodiment, the worlds server 10 communicates with the third party operator's worlds server 80. The worlds server 10 gathers any necessary information from database 20, transfers control of the end user avatar and data to the third party worlds server 80, which in turn records such data to its database server 90, and confirms to worlds server 10 that the transfer has been successful. Upon such confirmation, the worlds server 10 makes an entry in the database 20 that the avatar has been "checked out" of the database 20 (or, in another embodiment, actually removes the avatar data or some portion thereof from database 20). "Checking out" the data may take the form of a cryptographically secure transfer of control, such as is used for the virtual currency known as a "bitcoin."

The transfer of control of the avatar from the original worlds server 10 to third party worlds server 80 may be termed a "Boundary Event." A boundary event need not be across a system, but could be within a system. For example, within a system operated by a single operator of a single worlds server 10, a boundary event could occur. Similarly, a boundary event could result from movement within a single area of a single virtual world. Thus, for example, a user moving from an amphitheater to a coffee shop within a Virtual Vancouver World might encounter a boundary event. Even within a single location, a user moving from one dimension to another might encounter a boundary event. A Boundary Event may also encompass temporal movement, such as when an avatar remains at a location for a period of time or when an avatar engages in a simulation of replay of past events. Thus, a "boundary event" may also encompass the movement of an avatar between areas with different rule sets, different attributes, different ownership, different operators, and/or other differences.

In various embodiments discussed in detail below, boundary events are handled in a manner that results in a positive experience for the end user, protects the value of end user possessions, protects the integrity of areas operated by the receiving worlds server, and otherwise make possible the exchange of users, data, objects, and other elements between environments that would otherwise be incompatible or otherwise difficult to make interoperable.

Boundary Events may be handled analogously to several physical world constructs, including international travel "customs" and "immigration," "life support" elements such as may be necessary in scuba diving or high altitude climbing, "legal compliance" such as is necessary to avoid arrest in an unfamiliar jurisdiction, and "behavioral compliance" such as is necessary to comply with the social norms expected of a visitor in a new place. As an avatar seeks to traverse a boundary, the client or server software may operate to enforce, advise, or facilitate compliance with any of these requirements. In one aspect, the physical world characteristics of the operator of the avatar, including without limitation age, gender, and geographical location, may be encoded within, associated with, and/or imputed to the avatar itself for purposes of boundary events or otherwise.

Transit within the VWW may be simultaneously accomplished in a variety of ways. Several different layout examples are provided below, but it should be understood that contiguous positioning in the layout represents functions that allow movement between contiguous areas, even though the areas need not be literally stored or operated on contiguous devices. Similarly, the layout functionality need not be identical for every user, so, for example, an adult user may find a gambling world contiguous to a car world, while a child may find only an empty lot contiguous to the car world. The visibility of boundaries, hyperlinks, and other mechanisms of moving between areas may be dependent on attributes of the world and/or avatar. For example, boundaries leading to adult-themed areas may be invisible to children, and boundaries to areas where an avatar is not permitted to enter may be hidden.

For example, one virtual world system may include a central transportation center, or hub, connected to multiple virtual worlds. Illustrative examples of such virtual worlds include a Virtual Vancouver World, Business District World, Swordfight World, Space War World, Kids' Playground World, Car World, and/or Red Light Center World.

The central transportation hub may serve as a place where all avatars may be moved from one virtual area to another. Validation functions may be performed at the hub, for example, to validate that the user has permission to enter a certain area. For example, a user may log into the VWW system and appear either at the hub or in any of the other areas within the VWW environment, depending on the address provided to the system upon log-in. The address may be analogous to a URL for the HTTP protocol, though it may take on a variety of forms in various embodiments.

A user who desires to move from the hub to the Virtual Vancouver World, for example, could cause the avatar to walk or run to the border between the hub and the Virtual Vancouver World, or could "warp" to the area by entering an address within the Virtual Vancouver area. From the Virtual Vancouver area, the user may be able to walk to adjacent areas without having to transition through the transportation hub. Thus, for example, the Virtual Vancouver area may have direct access to the Business District area or the Red Light Center area.

In an embodiment, areas that are compatible are treated as adjacent, so that, for example, the Kids' Playground would be adjacent to the Space War and Car areas, but not to the Red Light Center (e.g., analogous to a red light district) or Business District areas. The accessibility of particular areas with other areas may be based on a physical layout and adjacency between spaces, but this need not be necessarily so. Users and/or operators may be permitted to create alternative or customized layouts, so that, for example, a user who commonly moved between normally discontiguous Space War and Patent Law areas might make such areas contiguous.

One embodiment may include a system whereby users not meeting the criteria for entry into a world are simply denied access, even if the area for which access is being sought is presented to the user as adjacent. An area may be adjacent to another based upon various factors, including being depicted as adjacent, being immediately accessible via a non-linear transportation mechanism such as moving between dimensions or "warping," or bearing other indicia of being adjacent. Areas may be adjacent even where physical topology would ordinarily prevent adjacency, so for example five distinct areas could all be simultaneously adjacent to each other. As another example, a side of a first area might be 10 units in length, but might abut a side of a second area, third area, and fourth area that are each 8 units in length.

Figure 2:
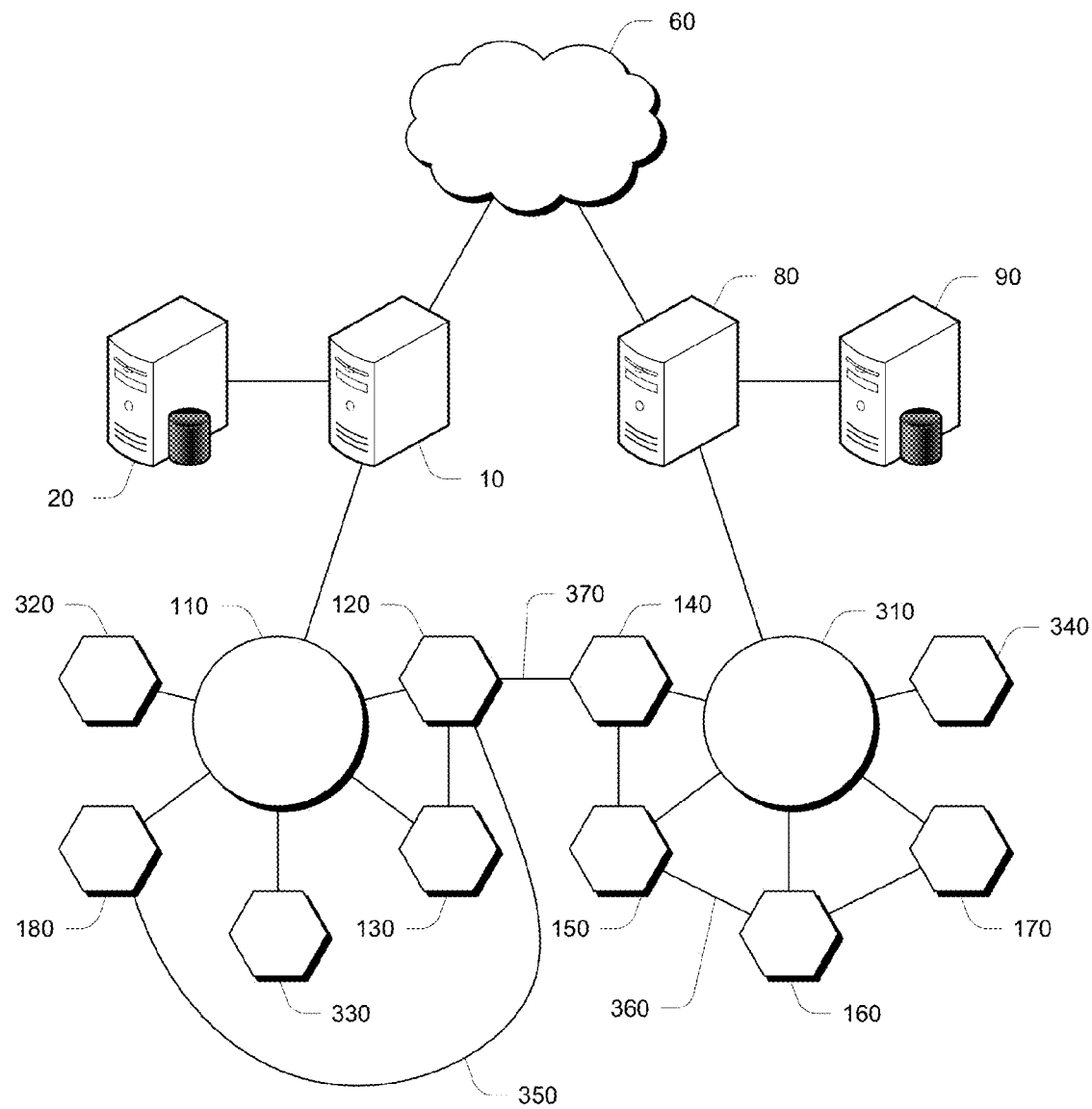
FIG. 2 is a block diagram of network components of a virtual worlds system, as used in an embodiment.

FIG. 2 is a block diagram of network components of a virtual worlds system, as used in an embodiment. The system may include worlds server 10, database server 20, network 60, third party worlds server 80, third party database server 90, transportation center/hub 110, Virtual Vancouver World 120, Business District World 130, Swordfight World 140, Space War World 150, Kids' Playground World 160, Car World 170, Red Light Center World 180, Transportation Center/Hub 310, Virtual World Region 320, Virtual World Region 330, and Virtual World Region 340.

The virtual worlds system of FIG. 2 may further include various associations (e.g., hyperlinks) between worlds, thereby making worlds "adjacent" or otherwise accessible. For example, the system may include hyperlink 350 between Virtual Vancouver World and Red Light Center World, hyperlink 360 between Space War World and Kids' Playground World, and/or hyperlink 370 between Virtual Vancouver World and Swordfight World. A hyperlink in a virtual world may be implemented like a hyperlink on a web page, but given the capabilities of 3-dimensional virtual worlds, a hyperlink may be implemented in a variety of other ways, such as a door or wall walked through by an avatar, a transportation vehicle, a warp tunnel or device, a teleportation system, a street, and so on.

Additional connections between worlds may be present in the sample system of FIG. 2. The transportation hub 110 associated with worlds server 10 may be connected to five virtual worlds 120, 130, 180, 320, and 330 in this embodiment. The transportation hub 310 associated with a third party worlds server 80 may be connected to five virtual worlds 140, 150, 160, 170, and 340 in this embodiment. The worlds server 10 may further be connected to a database 20 which may be internal or external to worlds server 10. In this embodiment, the third party worlds server 80 is connected to a database 90 which similarly may be internal or external to server 80. The two worlds servers 10 and 80 may communicate through a network link 60.

In one embodiment, the worlds servers 10 and 80 are not necessary for some or all connections between worlds. For example, the Virtual Vancouver World 120 may include a hyperlink 370 leading to the Swordfight World 140. In such a case, one embodiment employs a cryptographically secure decentralized system permitting transfer of control of an avatar directly from one world to another. A system similar to the system behind the Bitcoin technology is one example of a cryptographically secure decentralized system. In such a case, the client computer 30 may initiate a transaction with the worlds server responsible for the destination worlds server 80 and, optionally, the origination worlds server 10 so that the data associated with the avatar is transferred by the client to the destination worlds server 80 without requiring any direct communication between the two worlds servers 10 and 80.

In another embodiment, worlds commonly controlled by a single worlds server 10 may permit the linking and transfer 350 of avatars between worlds without a requirement that the avatar appear or transit through a centralized hub 110. Even when a transfer takes place through a centralized hub 110, or even between different worlds servers 10 and 80, the transfer may be made in a manner that does not make the transit mechanism apparent to the end user, so that, for example, the end user is not shown the hub 110 during the transit process. This transfer process may be used where the user actuates a link or other transportation mechanism that indicates a desire to directly transport the avatar to a target area other than the transit hub.

Whether the user is apprised of the transit through a centralized hub 110 or 310 or not, the centralized hub 110 or 310 may perform validation, legality, and/or other tests to determine whether the user is permitted to perform the desired action. Additionally, the centralized hub 110 or 310 may translate avatar properties between the departure world and world of entry, such as is discussed further below. In alternate embodiments, the world of departure and/or world of entry may perform additional or alternate tests and/or translations of avatar properties.

In an embodiment, the process of transit between worlds includes a translation or modification of the user's properties from the properties appropriate for the first world (e.g., the world of departure) to properties appropriate for the second world (e.g., the world of entry). For example, consider an avatar moving from the Space War World 150 to the Car World 170. If the Car World 170 is configured so that all avatars appear as cars, a human warrior avatar from the Space War World 150 would be either out of place in the Car World 170, or may simply fail to be able to operate or move to the Car World 170. Similarly, an avatar that possesses a laser gun in the Space War World 150 attempting to move to the Sword Fight World 140 may find itself in possession of an item that does not function, or is not permitted, within the area. Loss of possessions may result in loss of value, functionality, status, and/or other desirable attributes.

An aspect of the technology involves mapping avatars or objects in one world or theme to corresponding avatars or objects in another world or theme. For example, in a realistic world intended to track real world properties, a tall human male avatar might possess a motorcycle and a gun. When transiting to the Sword Fight World 140, the possession/ avatar mapping system may determine that a tall human male with a motorcycle is equivalent to a tall human knight with a horse (e.g., equivalent to the motorcycle owned in the realistic world) and a sword (equivalent to the gun owned in the realistic world). The mapping may be accomplished via a database (such as SQL) or other lookup table or system or by a programmatic ruleset.

The mapping may be set according to heuristic or other analysis of properties of avatars or objects. It may also be accomplished through express user preferences or preferences or rules set by one or both of the worlds involved. In one embodiment, the objects retain their characteristics throughout any transitions. Thus, for example, if the tall human male knight's horse is killed while in Sword Fight Area 140, the user would be in possession of a non-functional horse in that area, or in possession of a non-functional motorcycle when moving back into the realistic avatar world. If the user's sword is sold, it would remain property of the purchaser and thus even after moving into another area, the sword (or whatever object it turns into in the new area) would remain the property of the purchaser.

In an embodiment, a world, area, or time slice is identified as "unreal," possibly on a per-object and/or per-avatar basis (e.g., unreal as to objects X and Y and avatar Z only). This could, for example, be of great utility if there was a practice arena in the Sword Fight Area 140. A user might engage in a sword fight, have his sword destroyed, and because the sword was marked as unreal, the sword could be recovered automatically when the user leaves the area (or when the user takes some action or with the passage of time). Similar unreal behavior could apply to expenditure of funds (e.g., real money could be used in a casino or trading floor but none of the actions taken with the real money would have permanence, making the real money effectively cloned into fake money). Similar unreal behavior could apply to the health, development, or welfare of an avatar, object or entity. This might be particularly useful in modeling disease behavior for example.

Access to an unreal world, area, or time slice may be conditioned on the payment or virtual currency, real currency, or other virtual or real goods or things of value. The cost of access may additionally be contingent upon the events within the unreal area. This may have the effect of making the area partially unreal, such as where a user pays ten virtual currency units to access a virtual casino for an hour where only ten percent of gains or losses are real. In another embodiment, areas may be partially real in that certain events are persistent (such as expenditure of virtual currency) while other events are unreal (such as the death of an avatar or the loss of a sword).

Just as a sword in one world may be a gun in another, without losing its global status as an object of type "weapon-personal-powerful," for example, so too may an avatar remain the same avatar type while displaying characteristics appropriate to the world it is then inhabiting. For example, an avatar within Virtual Vancouver World 120 may move into Car World 170. If Car World 170 is defined as only having cars as avatars, the avatar may be automatically changed into a car. Alternatively, the user may be warned that the avatar is about to be rendered as a car and asked for permission before continuing the transition. Items that are inappropriate to the new avatar rendering (for example, the avatar's car from Virtual Vancouver World 120 which would make no sense as a possession of a car avatar in Car World 170) may be left on the server or otherwise not displayed in the new environment.

Similarly, objects with correspondence to the new avatar may be transformed, possibly automatically, according to rules set by the user, the operator of the system, the operator of the world, and/or operators of other worlds. In this example, a human avatar with a fancy watch and fancy shoes may see the watch turn into a fancy car-mounted clock and the shoes into fancy tires when moving into Car World 170. In some embodiments, clothing and items with aesthetic elements may retain an aesthetic theme, so a human avatar with red clothes, for example, might transform into a car avatar with red paint when moving from Virtual Vancouver World 120 to Car World 170.

Figure 3:
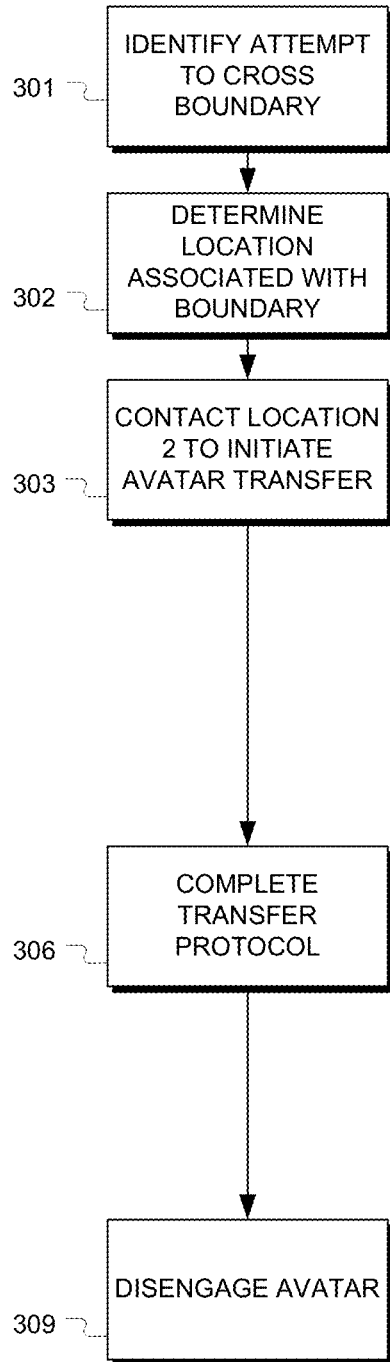
FIG. 3 is a flowchart of a process of enabling an avatar to cross between two locations (e.
Figure 3:
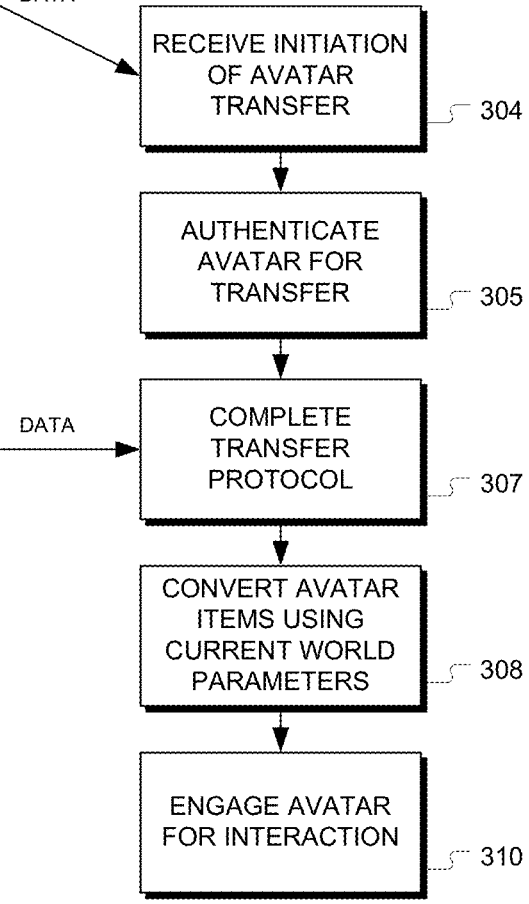

FIG. 3 is a flowchart of a process of enabling an avatar to cross between two locations (e.g., worlds, scenes, instances, areas, etc.), as used in an embodiment. The locations may be two different service providers operating on different computing hardware, two virtual worlds operated on a single server, two locations or scenes within a virtual world, and/or two instances of a scene. ("Scenes" are discussed further below, and generally refer to a portion of a virtual world, such as a building or room.) The process, at each respective location, may be performed by a computing system, such as the Worlds servers 10 and 80 of FIG. 2. In various embodiments, additional blocks may be included, some blocks may be removed, and/or blocks may be connected or arranged differently from what is shown.

At block 301, the computing system of location 1 identifies an attempt of an avatar to cross a world boundary. A world boundary may be similar to a link on a web page, insofar as it enables an avatar to access a different location. World boundaries may be represented in a virtual world as a path, door, a window, text on a wall, a touchable object, or the like. World boundaries may also be made imperceptible to the user, imperceptible to users with permission to cross them, imperceptible to users who may cross them without material alterations to their possessions, or a combination thereof. Similarly, world boundaries may be made larger, smaller, more perceptible, or less perceptible based on such foregoing factors. The system may detect the attempt to access the world boundary at block 301 based on the avatar moving on or through, touching, pushing, grasping, manipulating, or otherwise interacting with the world boundary, and/or by a user of the avatar sending an appropriate command to the virtual world indicating a request to cross the boundary.

At block 302, the system attempts to determine a second location associated with the boundary. As a hyperlink on a web page indicates a second location for a web browser to access, so may a world boundary indicate a location, denoted in FIG. 3 as location 2, to be accessed by the avatar. The location may be associated with the world boundary as represented within appropriate data structures of location 1 and/or the location may be determined by the computer system of location 1 accessing an external data source such as a location table or database.

At block 303, the computer system of location 1 communicates with a computer system of location 2, to initiate a transfer of the avatar. The transfer may be made by a proprietary or well-known network protocol, such as HTTP, FTP, SSH, SFTP, SSL, TLS, or the like, or by a combination thereof. In an embodiment, location 1 initiates transfers of avatar data at block 303. The avatar data may be represented in various formats suitable for data interchange, such as HTML, XML, CSV, RPC objects, CORBA objects, YAML data, and so on. Location 2 receives the transfer request at block 304. The transferred data may include the avatar data, or the avatar data may be transferred at a later point during the process (e.g., blocks 306-307).

At block 305, the computer system of location 2 authenticates the avatar for transfer. Authentication may be used to determine whether the avatar is permitted to access the new location. For example, if location 2 requires password authentication or other authentication, it may query the user of the avatar and/or the computer system of location 1, to provide such authentication credentials. Additionally or alternatively, location 2 may maintain a whitelist or blacklist of avatars and/or associated users, and/or avatar or user characteristics, for example to keep track of exiled, banned, or otherwise unwanted entities. Avatars may be rejected from a location based on administrator settings for the location and/or by automated processes such as behavioral analysis. For example, location 2 may not permit an avatar to enter if the location determines that the avatar poses a security risk to others, does not meet rules of the location, has a history of undesirable behavior, and so on. Authentication may be based on avatar data and/or other data transferred at blocks 303 and 304, if such data had been transferred, as well as other data available at location 2.

If the avatar is authenticated for transfer at block 305, then at blocks 306 and 307 a transfer protocol is completed between locations 1 and 2. The transfer protocol, in an embodiment, may ensure that the avatar is present only at one of the locations, thus preventing the avatar from simultaneously acting in two locations at once, if this is desirable to the systems. In alternate embodiments, avatars may be permitted to be in two places at once, in which case the transfer protocol need not ensure that the avatar is only in one location. In an embodiment, a cryptographic protocol such as the Bitcoin protocol is employed, to ensure that the avatar is only at one location. Alternately, a centralized database or record of avatar locations may be used to ensure avatar uniqueness.

The transfer protocol may also involve transfer and/or conversion of items and/or characteristics of the avatar, as shown at block 308. As explained in detail below, an avatar may be associated with characteristics, such as possessed items, appearance features, personality features, social relations, and so on. In moving between worlds or other locations, the avatar may have those characteristics automatically transferred. In some embodiments, those characteristics may furthermore be translated or converted to be appropriate to the destination location. For example, if the destination location has certain rules about required and/or permitted possessions, and the avatar has a possession that is not allowed in the new world, then the avatar's possession may be exchanged, converted, altered, replaced, removed, or otherwise affected. In various embodiments, the transfer process may be performed by a computer system at location 1, a computer system at location 2, a client computing device, a centralized server, and so on, as well as any combination of these.

In one embodiment, the transfer of an avatar may be made in a partial manner, separating the avatar from one or more elements associated with the avatar, such as possessions. In such a manner, possessions not permitted to cross a boundary may be retained on the originating system and reclaimed by the avatar upon return. In another embodiment, a duplicate or clone of the avatar may be permitted to cross the boundary, and such duplicate may optionally be prohibited from returning across the boundary. The duplicate and the original avatar may remain linked, such that they share virtual currency or items, damage to one avatar accrues to the other, etc. In one embodiment, upon return of a duplicate avatar across a boundary, the avatars are merged, with some or all changes taking place to one or both avatars in the time since the duplication took place being reflected in the merged avatar.

At block 309, the computer system of location 1 disengages the avatar. In parallel or serial, at block 310 the computer system of location 2 engages the avatar for interaction. This may be reflected by the computer system of locations 1 and/or 2 sending appropriate data to the computing device of the user of the avatar, to update the graphical display for the avatar reflecting the new location. In an embodiment, various transitions may be used during this transfer, to indicate the change in location for the avatar. In an embodiment, user interfaces may be presented during the process of blocks 301 through 310 to inform the user of the avatar of the process and/or to allow the user to affect the process. For example, user interfaces may be presented at block 308 to enable the user to control or otherwise affect the conversion of items or other characteristics. For example, in some cases the user may have more than one option for a characteristic or item that a currently held item or characteristic may be translated into in location 2. The user may further be given options to cancel the world boundary crossing, should the ramifications of transfer appear to be undesirable or for other reasons. In one implementation, for the purpose of making the user experience more seamless or other reasons, the computer system of location 2 may provisionally engage the avatar before the computer system of location 1 disengages the avatar. This may be conditioned on the reputation of each of the locations, contractual or other relationships between the locations, latency between the locations, historical data about success of movement of avatars between locations, or other factors.

Figure 4:
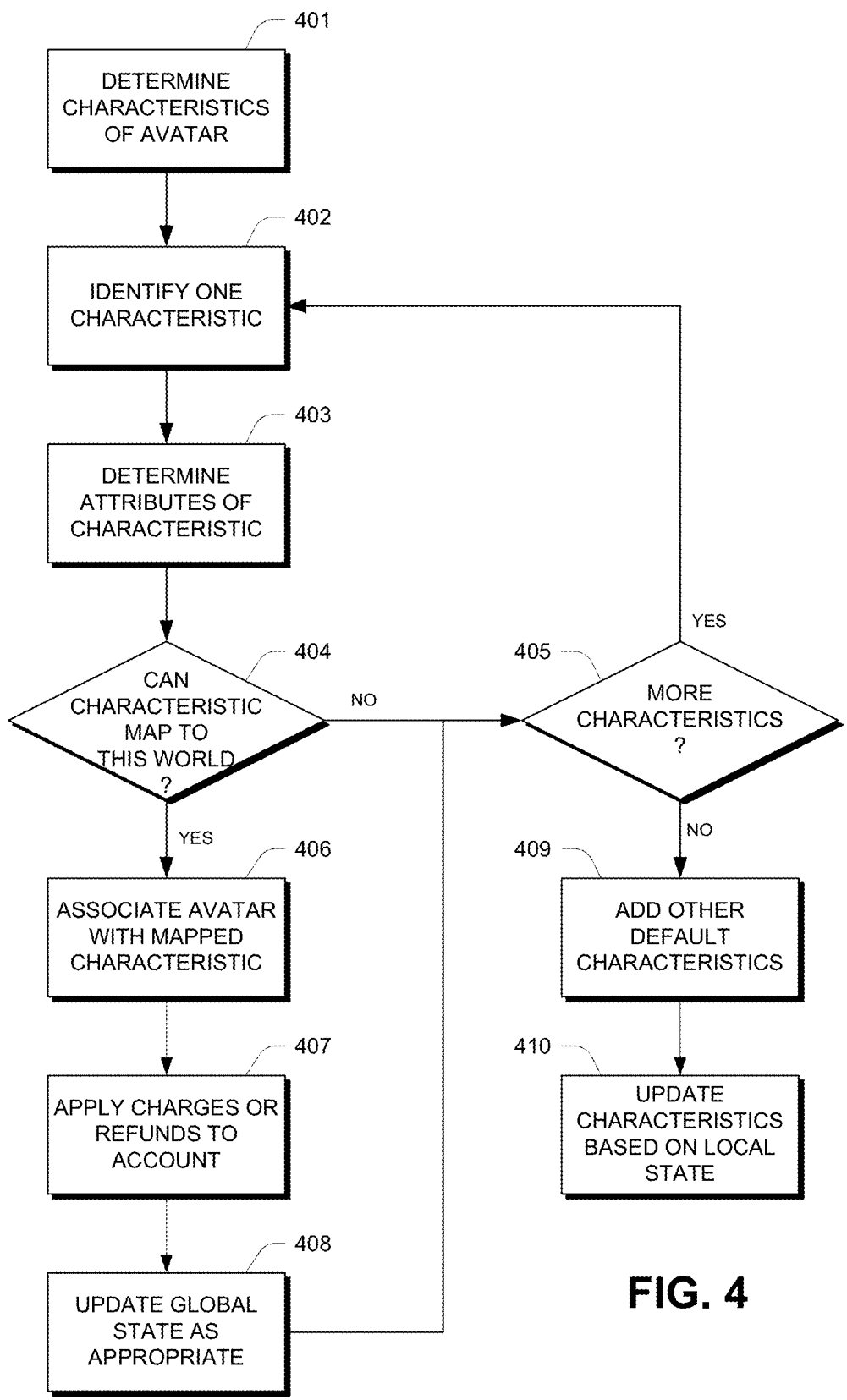
FIG. 4 is a flowchart of a process of converting items between worlds or other locations, as used in one embodiment.

FIG. 4 is a flowchart of a process of converting items between worlds or other locations, as used in one embodiment. The process may be performed, for example, by a computer system as described with respect to FIG. 3. The process may be performed at block 308 of FIG. 3. In various embodiments, additional blocks may be included, some blocks may be removed, and/or blocks may be connected or arranged differently from what is shown.

As explained previously, avatars may be associated with characteristics, such as possessions, appearance features, personality features, and so on. Some or all of those characteristics may be appropriate in one world but not another. For example, an avatar may operate in a space-themed world, in which avatars wear space suits, fly spaceships, and fight with laser guns. A second world may be a medieval world, in which avatars wear armor, ride horses, and fight with broadswords. It can readily be seen that the items appropriate for the space-themed world would be out of place—and even inoperable—in the medieval world, and vice versa. Requiring the user of the avatar to dispose of items for one world and acquire items for another world every time the avatar crosses boundaries may be time-consuming, inefficient, and undesirable to the user. Thus, the system may enable an automated conversion process, such as that shown in FIG. 4.

At block 401, the system determines the characteristics of the avatar. The characteristics may be represented in a data file such as that described with respect to blocks 303 and 304 of FIG. 3. Alternately, the characteristics may be acquired from an external and/or internal repository of characteristics.

The system then proceeds to review the characteristics and determine appropriate conversions. At block 402, the system identifies one of the avatar's characteristics, and attributes of the characteristic are determined at block 403. Attributes of a characteristic may include tags, features, descriptions, metadata, or other information associated with the characteristic. For example, a spaceship in the space-themed world may have attributes such as size, speed, power, age, and so on. Similarly, a horse in the medieval world may have attributes such as breed, stamina, age, pedigree, and so on. In an embodiment, the attributes are based on a common object attribute model, so that attributes between different objects may be readily compared. Characteristics not relevant to the new region need not be reviewed, and the characteristics to be reviewed may be identified using a whitelist or blacklist.

In an embodiment, one of the attributes is a class attribute indicating a type of object, such that objects of the same and/or similar class may be exchanged. For example, the spaceship of space-world and the horse of medieval world may be both of the class "transportation," to indicate that both items are modes of transport in the respective worlds. The class attribute need not be consistent across multiple worlds. For example, a broadsword may be classified as a "weapon" in a medieval world, but classified as a "relic" in an archaeology or exploration world. In one embodiment, a classification translation table may be maintained to track correlations between different class names used in different worlds.

In one implementation, the class system may utilize a nomenclature and/or a hierarchy system that functions to better facilitate conversions and user understanding of conversions. In one such implementation, the nomenclature may be similar to that used by the DNS system, and may optionally function as a pointer to data about the ultimate object.

As one example, consider a spaceship object, which may have attributes such as those shown in the table below.

TABLE 1

| Condition | RightThrusterBroken |
| Implementation | Rocketship |
| Class | CapableOfEightRiders |
| Type | Transportation |
| Location within region | Quadrant3.2.1 |
| Region | SpaceDock7 |
| World | SpaceWorld |
| Owner | BuckRogers |

The elements of the classification of the above spaceship may be hierarchical (in the table above, the elements generally are arranged from more specific to more general), and they may be represented in a hierarchical fashion, analogous to the arrangement of subdomains separated by periods in the DNS system, or folders separated by slashes in filesystems.

At block 404, the computer system determines whether the characteristic of block 402 can be mapped to the world being entered. The determination may be made based on the attributes assessed at block 403. In some cases, the characteristic may not be mappable. For example, a weapon such as a broadsword or laser gun may have no equivalent in a peaceful world. In this example, the determination may be based on the class of object; that is, the peaceful world may include a rule that no characteristics of class "weapon" (and/or other similar classes) are allowed. If the computer system determines that no mapping is possible at block 404, then at block 405 the computer system proceeds to review the next characteristic.

Where there is a determination that an object is not mappable, the object may optionally be checked into a storage server, allowed to stay with the avatar but in unusable form (such as in the form of a virtual photograph of the object) at least until the object enters an area where it is usable or mappable, and/or virtual or real currency, goods, or services may be offered in exchange for the object. Such an offer may be particularly suited to instances where an avatar is intended to remain in a region where the object is not mappable for more than a short period of time. Alternatively, the object may be mapped to one of a plurality of user or operator selected like or unlike objects (such as a conversion of a sword into a plowshare), or certain objects may be automatically converted into a like or unlike object. The global and/or local state may be used to maintain this storage of unusable or multiply-mapped objects.

If the characteristic is mappable to the world, then at block 406 the appropriate characteristic for mapping is determined, and the avatar is associated with the new characteristic. The determination of the new characteristic may be made based on the attributes determined at block 403, and further based on attribute data of characteristics known or available to the world. In an embodiment, the world chooses a characteristic with sufficiently similar attributes, based on a heuristic, maximization, optimization, matching, regression, and/or other algorithm for comparing characteristics. In an embodiment, the user may have input into the selection of the mapped characteristic.

In an embodiment, characteristics are associated with real money, virtual money, and/or other exchangeable currency or items of value. In some cases, the avatar's original characteristic may be worth more or less than the mapped characteristic provided. As appropriate, then, the system may charge or refund an account associated with the avatar, as shown at block 407. In an embodiment, the charge or refund is made only if the conversion of the characteristic is permanent. Thus, in some cases, an avatar's characteristics may only temporarily be converted while the avatar is present in the world, and the original characteristics may be restored when the avatar leaves the world. In such a case, accounting for value changes may be unnecessary.

Alternatively, surplus value may be held in an account on behalf of the user, and a deficit in value may be charged to the user or an amount equal to the deficit frozen in the user's account, all of which may be held for a period of time, until the object is converted back, or the earlier of the two events. In another embodiment, conversion of the object may be charged to the user (in the event of a value deficit) or credited to the user (in the event of a value surplus) together with an agreement that the object may be converted back at a fixed exchange rate during a certain period of time. Interest may accrue or be charged in any of these scenarios.

In various embodiments, the conversion of characteristics is permanent rather than temporary. In such cases, at block 408 the global state for the avatar is updated as appropriate to reflect the avatar's change of characteristics. Specifically, at this block, the avatar's old characteristics may be revoked in the global state, and the avatar's new characteristics may be added to the global state. The global state, in an embodiment, reflects the avatar's characteristics across all worlds. Thus, when the global state is updated for the avatar's characteristics, the avatar may not receive previous characteristics when departing from the world. In an embodiment, the original characteristics of the avatar may become associated with the world after the global state update. For example, if an avatar exchanges a spacesuit for a coat of armor upon entering the medieval world, the spacesuit may become the possession of the medieval world, thus enabling the medieval world to sell or otherwise extract value from it. Alternately, the characteristic may be returned to a common pool for the world or service provider. Optionally, such a conversion and change of ownership may be in exchange for something of value (virtual or real), such as entry to the world. Optionally, such a conversion may occur over time, so that the user's interest in the item declines as time passes while the user is in the world.

In an embodiment, some characteristics may be permanently converted, while other characteristics may be temporarily converted. Such procedures for conversion may be defined by the world being entered by the avatar and/or accessed from rules of the world being entered and/or the world being left. For example, a world may specify that appearance-related characteristics are temporarily converted, while possession-related characteristics are permanently converted. In one embodiment, the user is presented with a visual representation of which characteristics may be permanently converted and/or which characteristics may be temporarily converted and/or which characteristics will be unaffected. Such presentation may be made prior to the conversion, and the conversion may be conditioned on user approved of such conversion. In a simple example of an avatar with a hat, a shirt, and a sword where the hat is unaffected, the shirt may be temporarily affected, and the sword may be permanently affected, the hat may appear (or be highlighted) white, the shirt yellow, and the sword red.

When all of the attributes have been processed through block 405, then at block 406 the computer system adds other default characteristics to the avatar, as necessary. A world may define certain characteristics as being required or otherwise default for avatars. For example, the space world may require avatars to possess an oxygen tank for breathing. If an avatar enters the space world, then the system may provide an oxygen tank to the avatar upon entry. In various embodiments, the avatar receives default items upon all entries to the world, upon the avatar's first entry to the world, and/or based on whether the avatar already has the item or another item mappable to the default item. In an embodiment, the avatar may be charged for the default item. In another embodiment, the item may be provided on a "rental" or "loaner" basis.

At block 410, the avatar's characteristics are further updated based on local state stored by the world. The local state may be used by a world to maintain information pertinent to the particular world but not to the global avatar state. For example, the local state may maintain information about characteristics specific to the world. Characteristics may be updated at block 410 by being added, removed, or modified.

Local state updates may be used to prevent undesirable refreshing of items through strategic entry into and departure from the world. In the example above with regard to space world, oxygen tanks may deplete over time, and avatars may be required to periodically refill their oxygen tanks (perhaps for a fee). However, if an avatar is automatically granted an oxygen tank upon entry into the space world, then the avatar could avoid purchasing a refill by leaving space world, disposing of the oxygen tank, and returning to space world to receive a new tank. Space world may use local state to avoid this, by recording the avatar's oxygen tank level, so that when the avatar returns, the oxygen tank is set to the previous level. In another example, an avatar may lose an item in a world, but the world may not make the loss of the item permanent so that the item is restored when the avatar leaves the world. Local state may be then used to ensure that, when the avatar returns to the world, the "lost" item is not accessible to the avatar. Thus, local state may be used to ensure persistence of characteristics of an avatar as necessary through entry into and exit from a world.

In addition to, separate from, or in conjunction with local state, the system may prevent a user from causing one or more items, or any items to be mapped between areas for a period of time after the last mapping, and may optionally slowly return the ability to do a mapping using a formula, such as M=N/T where M is the percentage of items that may be mapped, N is the number of seconds that have passed since the last mapping, and T is the amount of time the system requires between full mappings. Such a formulaic approach may alternatively or additionally be used to determine the cost of mapping prior to the expiration of the set amount of time (i.e. cost would be the full cost of an early mapping or other mapping multiplied by 1 minus M).

Figure 5:
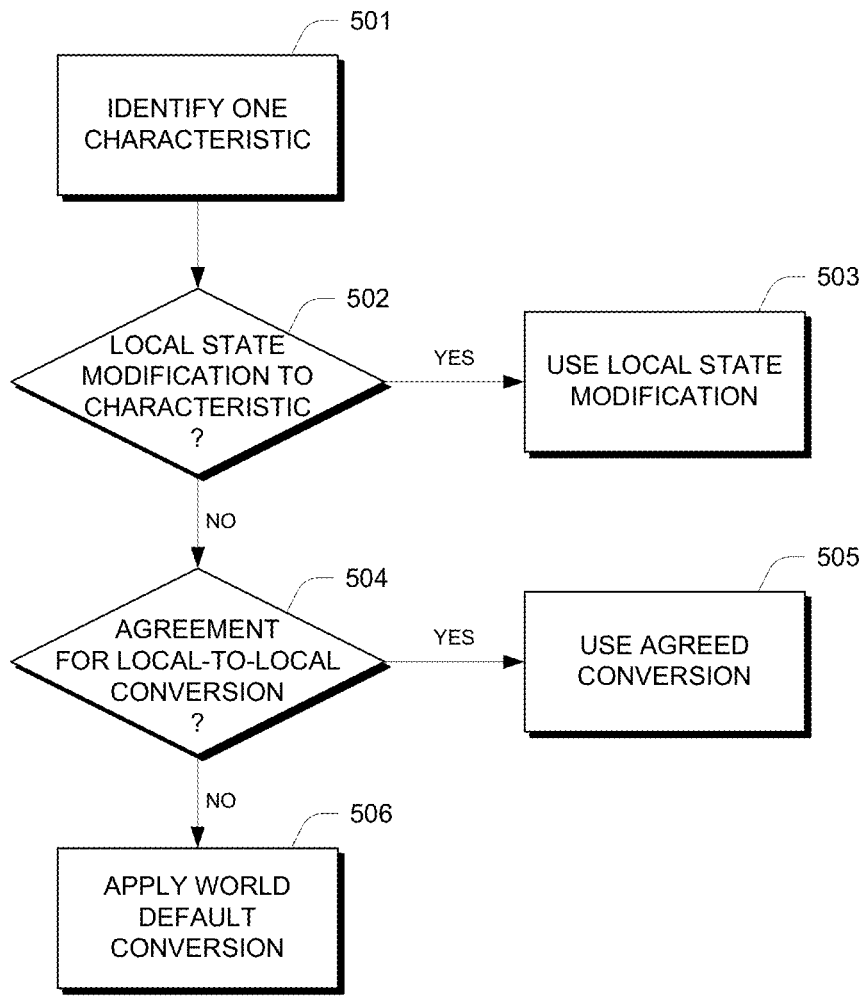
FIG. 5 is a flowchart of a process of mapping characteristics from global state to local state, as used in one embodiment.

FIG. 5 is a flowchart of a process of mapping characteristics from global state to local state, as used in one embodiment. The process may be performed by a computer system, at block 406 of FIG. 4, for example. In various embodiments, additional blocks may be included, some blocks may be removed, and/or blocks may be connected or arranged differently from what is shown.

At block 501, the computer system identifies one characteristic of an avatar being processed during a conversion procedure such as that described with respect to FIG. 4. The characteristic may be drawn from the global state identifying the avatar's characteristics. At block 502, the computer system determines whether there is a local modification to that characteristic. A local modification may be a modification applicable to the specific world and stored with that world's local state, such as with the oxygen tank and lost item examples described previously. If there is such a local state modification, then that local state modification is applied at block 503.

If there is no local state modification, then at block 504 the system determines whether there is an agreement for conversion of the item with another world or location. Two worlds may have an agreement that certain items or characteristics are convertible, so that those characteristics may be exchanged. For example, the space world and the medieval world may have an agreement that laser guns of a particular type may be exchanged with broadswords of a particular type. The agreement may be stored in scripts, code, or other local state of the agreeing worlds. If such an agreement is found, then the agreed conversion is used at block 505. Invoking the conversion may involve contacting the world in agreement, by network connection or other communication.

If no agreement is found, then at block 506 the world's default conversion procedure is followed. This conversion procedure may account for the attributes of the characteristics being converted, the attributes of various permitted characteristics, virtual currency values of the characteristics, supply and/or demand for the characteristics, and so on. Furthermore, the conversion may be made temporary or permanent, as specified by the world.

Figure 6:
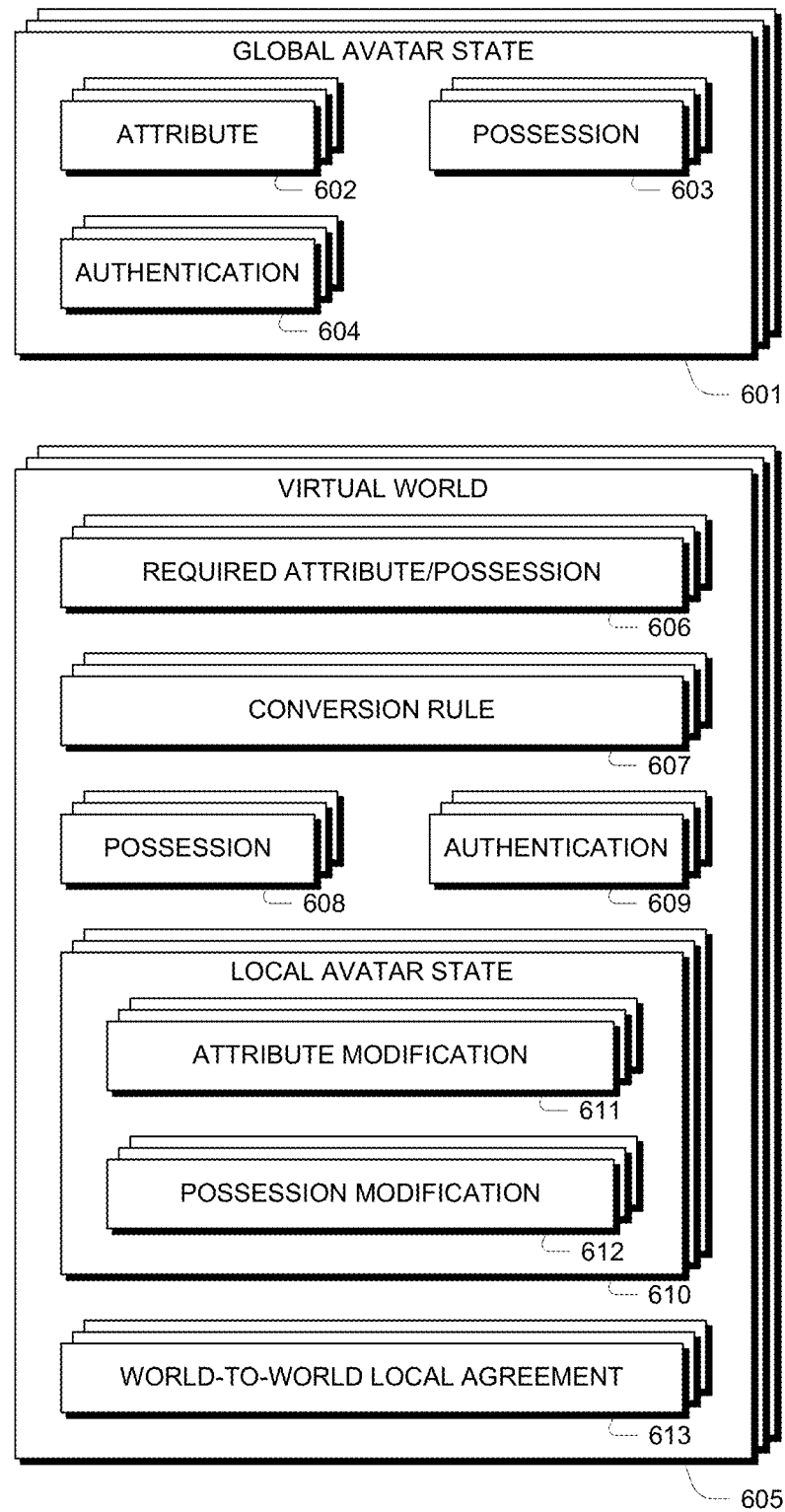
FIG. 6 is a block diagram of example data structures of global avatar states and local world data, as used in an embodiment.

FIG. 6 is a block diagram of example data structures of global avatar states and local world data, as used in an embodiment. The data structure may be stored on computer-readable media such as a hard drive, SSD, tape backup, distributed storage, cloud storage, and so on, and may be structured as relational database tables, flat files, C structures, programming language objects, database objects, and the like. In various embodiments, additional elements may be included, some elements may be removed, and/or elements may be arranged differently from what is shown.

Global avatar state 601 may be stored by a service provider or other data repository, and maintain records relating to one or more avatars. Global avatar state may maintain information such as characteristics of avatars, including attributes 602 (such as appearance, personality, social relations, etc.) and possessions 603. Additionally, global avatar state may maintain authentication data 604, which may be used, for example, at block 305 of FIG. 3.

As described previously, characteristics may be associated with attributes defining aspects of each characteristic. The attributes may be used, for example, in the mapping process of block 406 of FIG. 4. The characteristics may be stored as part of global avatar state 601. Alternately, attributes may be stored in a separate data repository of attributes of avatar characteristics. In an embodiment, each world maintains attributes for characteristics, thus enabling worlds to interpret characteristics differently (as explained with respect to the broadsword "weapon"/"relic" example).

Virtual world data 605 may include information for operating a virtual world. Rules relating to the conversion processes, such as that described with respect to FIG. 4, may be included in virtual world data 605. For example, required characteristics 606 may be used at block 409 of FIG. 4 to determine required or default characteristics and/or attributes of characteristics. Conversions rules 607 may define the processes of converting characteristics and/or attributes of characteristics.

Virtual worlds may maintain characteristics, such as those acquired during a conversion processes. These characteristics may be stored as possessions 608 in the virtual world. Virtual worlds may also maintain authentication data 609 for determining authentication and permissions of avatars upon entry, as described with respect to block 305 of FIG. 5.

As described previously, each virtual world may maintain a local avatar state, used for modifying an avatar's global state upon entry to reflect world-specific changes to characteristics. These modifications may be maintained in data structure 610, which includes information on attribute modifications 611 and possession and other characteristic modifications 612. The stored modifications may include additional characteristics to be added to avatars, characteristics to be removed from avatars, and/or modifications to attributes of characteristics of avatars. Additionally, as described with respect to block 504 of FIG. 5, a virtual world may maintain one or more world-to-world local agreements on characteristic exchanges.

Figure 7:
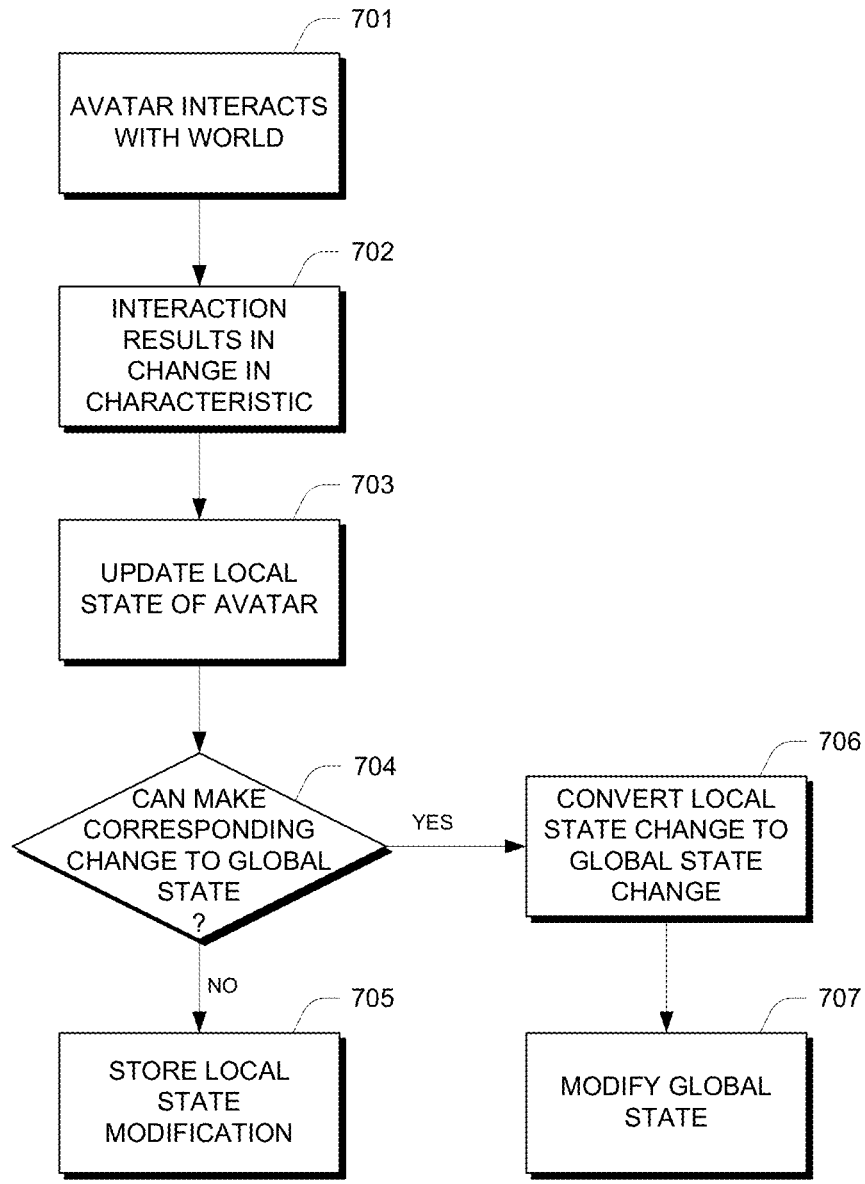
FIG. 7 is a flowchart of a process of changing an avatar's characteristics while the avatar interacts with a virtual world, as used in an embodiment.

FIG. 7 is a flowchart of a process of changing an avatar's characteristics while the avatar interacts with a virtual world, as used in an embodiment. The process may be performed by a computer system operating a virtual world, as described previously. In various embodiments, additional blocks may be included, some blocks may be removed, and/or blocks may be connected or arranged differently from what is shown.

The disclosure heretofore has considered the handling of avatar characteristics upon entry into a virtual world or transit within a virtual environment. As the avatar interacts with the virtual world, the avatar's characteristics may change: the avatar may acquire new items, sell or dispose of items, change appearances naturally or upon user direction, and so on. An avatar might gain or lose characteristics (e.g., the avatar acquires or loses items), or attributes of characteristics might change (e.g., the avatar's sword is damaged). Similarly, the avatar itself may change, such as by aging, by acquiring new skills, etc. These changes may or may not be reflected in the avatar's global state, depending on the configuration of the particular world. For example, a "testing" world may provide that an avatar's characteristics are restored upon departure, whereas a "realistic" world may effect permanent changes to an avatar. Furthermore, virtual worlds may be concerned with undesirable gaming of the conversion system, where for example, an avatar may repeatedly enter and leave a world, to try to gain illicit or undesired advantages by invoking the conversion processes.

Additionally, there may be instances where the user desires to revert back to a prior state upon occurrence of an event. For example, upon leaving space world, an avatar may wish to revert to the state the avatar was in upon entering space world. Past state information may be maintained by the system (or locally, on the client side) and utilized to determine the cost of such a reversion (or, in the case of a mix of elements that can be purchased, such as new weapons, and elements that cannot, such as an arm). In one embodiment, the user may select or be provided with multiple reversion points, similar to save states in a game. In one embodiment, the cost of reverting to a particular state may be continuously or intermittently presented to the user, and/or the user may choose one or more trigger costs at which the user will be warned and/or automatically transported back to a place where the reversion can take place and/or automatically reverted, all optionally with the automatic deduction of the cost of purchasing the items from the user's account. In one embodiment, the cost (and/or time required for reversion) is continually or periodically adjusted for fluctuations in market price and availability of items.

At block 701, an avatar interacts with a virtual world. The interaction may result in a change in the avatar's characteristics, at block 702. The change may occur in response to an action taken by the avatar and/or an automatic process such as aging.

At block 703, the local state of the avatar may be updated. The local state may be configured to affect the avatar's characteristics within the world. This may provide immediate feedback to the avatar regarding the change in characteristic.

At block 704, the system determines whether a corresponding change can be made to a global state. The determination may involve complex processes in some embodiments, depending on the configuration of the system and the virtual world. For example, the system may determine that the changed characteristic is not itself present in the global state, but the changed characteristic was exchanged with another characteristic that is present in the global state. In such a case, the change to the world-based characteristic may be correspondingly made to the global characteristic.

For example, if an avatar, originally from space world, has a laser gun and enters medieval world, then the avatar's laser gun may be converted to a broadsword. If, in medieval world, the avatar sells the broadsword to another avatar, then the system may detect that the broadsword corresponded to the laser gun, and so it may update the avatar's global state to remove possession of the laser gun.

In the case that characteristics are permanently converted, as described previously, then the aforementioned reverse-mapping procedure may not be required. Where the reverse-mapping procedure is performed, it will be understood that the virtual world may maintain appropriate data structures, such as records of conversions, to facilitate the procedure. In one implementation, including where characteristics are not permanently converted, the transfer of an item, such as a laser gun, may require (or the system may make) disclosure of the state of the item, such as "laser gun temporarily converted to broad sword."

The mapping of changes to characteristics to global state may involve similar complexity. For example, if the avatar's broadsword from above was bent or chipped during a fight, a corresponding change to the avatar's laser gun in global state may be made. An identical change may not be appropriate: in this example, a chip in a laser gun will likely not render the laser gun less functional, whereas a chip in a broadsword may decrease functionality. Accordingly, changes to global state may be made through a mapping process as well, as defined by the virtual world and/or the service provider. The changes may be based on attributes of characteristics as described previously. For example, a chip in a broadsword may be interpreted as a decrease in an "power" attribute of a "weapon"-class item, so a corresponding decrease in the "power" attribute of the laser gun may be made to global state (for example, making the laser gun fire shorter blasts).

Where a change to global state can be made at block 704, the change is made at block 706 and stored at block 707. If the system determines at block 704 that the change cannot be made, then at block 705 the system may store an appropriate local state modification. The local state modification may be used to ensure that changed characteristics are not revertible by the avatar leaving and reentering the world. For example, with respect to the broadsword example from above, the chip to the broadsword may be stored in the medieval world's local state. When the avatar with the chipped broadsword leaves medieval world, the avatar's original laser gun may be restored. The avatar may then return to the medieval world and have the laser gun converted again to a broadsword, and the local state may automatically cause that broadsword to have a chip in it.

Figure 8:
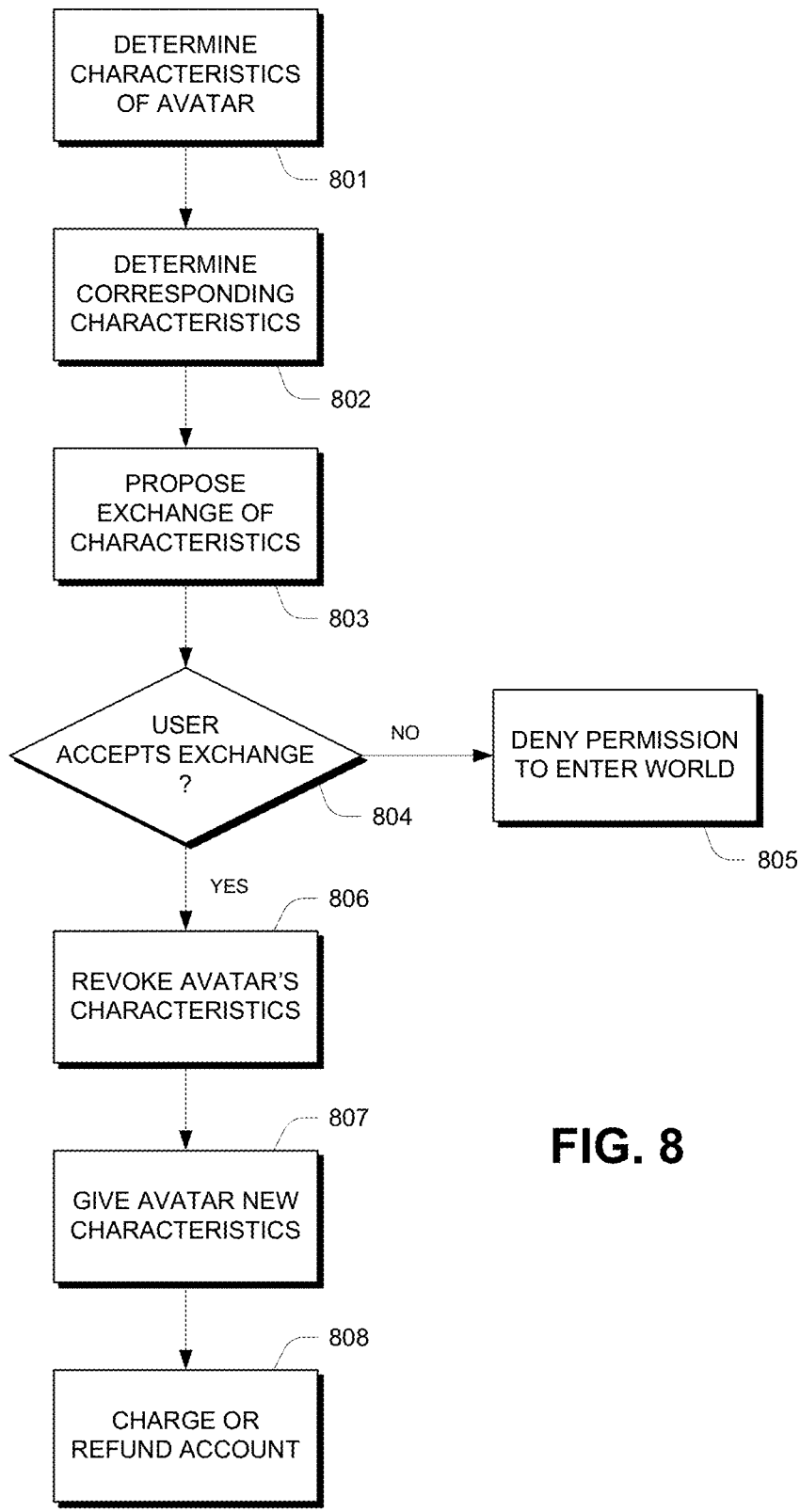
FIG. 8 is a flowchart of a process of modifying characteristics upon entering a world requiring permanent conversion of characteristics, as used in an embodiment.

FIG. 8 is a flowchart of a process of modifying characteristics upon entering a world requiring permanent conversion of characteristics, as used in an embodiment. The process may be performed by a computer system operating a virtual world. In various embodiments, additional blocks may be included, some blocks may be removed, and/or blocks may be connected or arranged differently from what is shown.

At block 801, the system determines the characteristics of the avatar. At block 802, the system identifies corresponding characteristics appropriate to the world. The corresponding characteristics may be determined by a mapping process such as that described with respect to FIG. 5.

At block 803, the system proposes an exchange of characteristics to the user of the avatar. The proposal may be displayed as a user interface showing the characteristics to be received, the value required, the characteristics to be forfeited, and so on. In an embodiment, multiple options for exchange may be presented to the avatar. In an embodiment, the avatar may be presented with a selection of items for exchanging, so that formation of a complete proposal package may not be required. The user may then be prompted to accept the exchange, at block 804. If the user rejects the exchange, then at block 805 the world may deny permission to the avatar to enter the world.

If the user accepts the exchange at block 804, then at block 806 the avatar's characteristics are revoked as appropriate. The revocation may be written to the avatar's global state to ensure permanence. At block 807, the avatar is given the new characteristics as proposed at block 803. There may be differences in the value of characteristics revoked and characteristics granted, so at block 808 the avatar's account may be charged or credited as appropriate.

Securable Objects and Permissions Resolution

It may be desired for avatars to be limited in their abilities to take certain actions within a world, scene, or instance. For example, it may be desired to prevent graffiti from being applied to walls. The owner or proprietor of a space may wish to mark objects with various permissions, allowing certain people, classes of avatars and objects, or other actors as able or unable to perform certain actions. The permissions may also include persistence rules. For example, there may be objects that can be altered or moved, but those actions expire after a period of time or certain event (such as a person leaving a room, all avatars leaving an area, all avatars other than certain staff users leaving an area, and so on). In one embodiment, history information for avatars may be utilized to rate risk and desirability of having an avatar enter an area, for example by forbidding entrance to a room to any avatar that previously applied graffiti to a wall.

Figure 9:
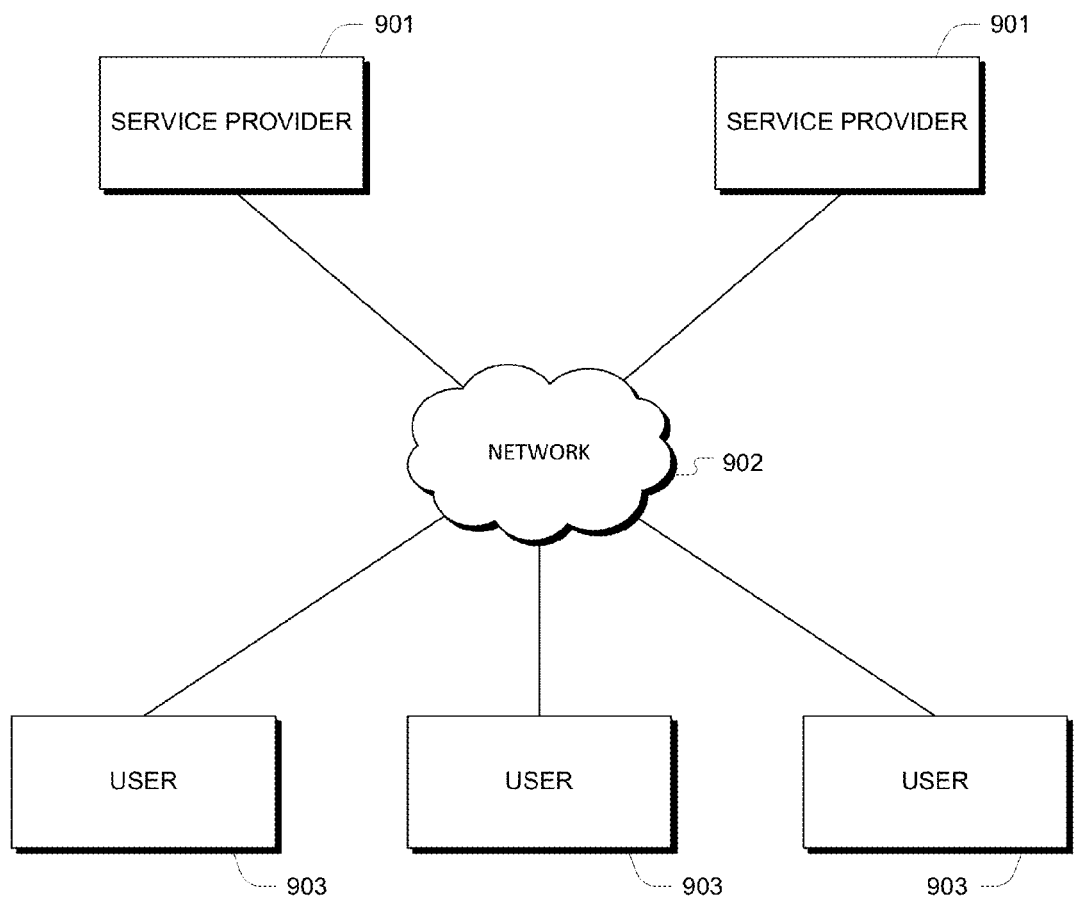
FIG. 9 is a block diagram of a computer network system connecting virtual world service providers and users, as used in an embodiment.

FIG. 9 is a block diagram of a computer network system connecting virtual world service providers and users, as used in an embodiment. In various embodiments, additional blocks may be included, some blocks may be removed, and/or blocks may be connected or arranged differently from what is shown.

Service providers 901 include computing devices and systems offering virtual worlds services. Service providers 901 may include computing hardware and/or software configured to perform one or more of the processes described throughout this specification. In an embodiment, multiple service providers 901 may be housed on a single computing device. Service providers 901 may also be distributed across multiple devices, as in cloud computing or distributed systems.

Service providers 901 communicate via one or more networks 902 with users 903. The networks may include, for example, Internet networks, cellular networks, local area networks, wide area networks, wireless networks, Ethernet networks, and so on, as well as combinations thereof. Users 903 may include user computing devices, such as desktop computers, laptop computers, mobile computing devices, mobile phones, tablets, and the like. The term "user" throughout this specification may be used to refer to a user device such as the aforementioned and/or an entity, such as an individual, operating such a device, as appropriate to the context of the term.

Additional devices and systems may be included in the system of FIG. 9. For example, service providers 901 may communicate with common data stores, such as account databases, registration servers, management servers, and so on. Such use of centralized systems may allow service providers 901 to easily synchronize and coordinate among each other (for example, to coordinate avatar location transitions, to synchronize user accounts, and so on).

Figure 10:
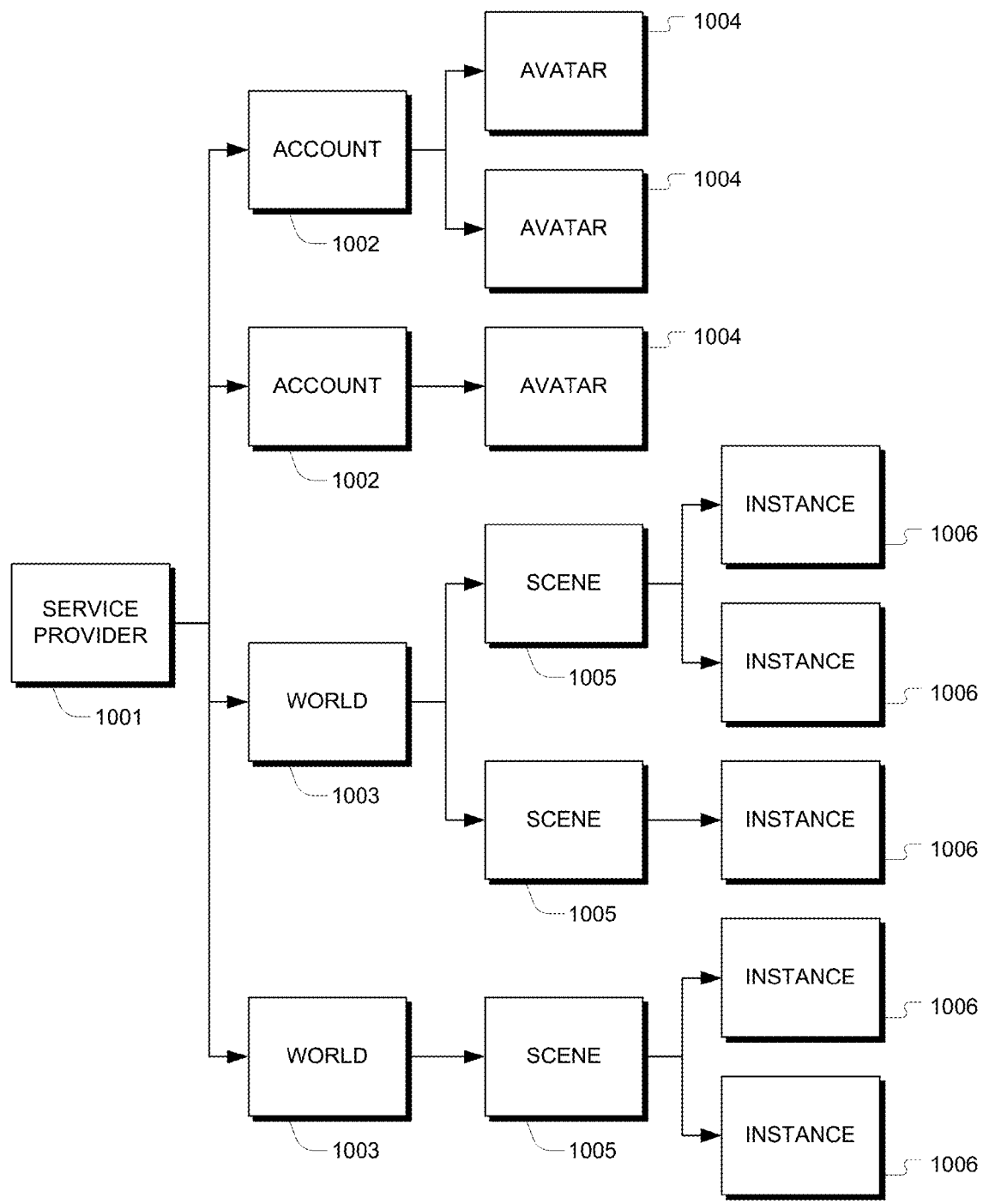
FIG. 10 is a hierarchical diagram of an example arrangement of virtual worlds data on a service provider, as used in an embodiment.

FIG. 10 is a hierarchical diagram of an example arrangement of virtual worlds data on a service provider, as used in an embodiment. The blocks represent types of data objects, and interconnections may represent relationships among the data elements, such as pointers, references, subclass relationships, or the like. The data structures may be stored on computer-readable media such as a hard drive, SSD, tape backup, distributed storage, cloud storage, and so on, and may be structured as relational database tables, flat files, C structures, programming language objects, database objects, and the like. In various embodiments, additional elements may be included, some elements may be removed, and/or elements may be arranged differently from what is shown.

Service provider 1001 may be represented as a data object with general data relating to the service provider. A service provider may maintain accounts 1002 for users of the service provider. The account objects may include relevant data relating to users, such as usernames, authentication information, attribute information, personal information, and so on. Each account may further be associated with one or more avatars 1004, which the user may select for appearing in a virtual world. The service provider may allow users to maintain multiple avatars or may restrict users to a single avatar, in various embodiments. By allowing users to maintain multiple avatars, a service provider may allow users to take on different appearances and personas in different situations, as selected by the users and/or the service provider.

Service provider 1001 may further maintain worlds 1003. Each world may represent a virtual space in which avatars may interact. Service provider may maintain multiple virtual worlds 1003, and each virtual world may be operated by different users or administrators of service provider 1001. Thus, a service provider may be analogously likened to a country, and each world may be likened to a city within that world. In one embodiment, virtual worlds may have distinctive rules, features, communities, and the like, all the while being subject to the general policies of the service provider.

Virtual worlds 1003 may in turn include scenes 1005. Following the analogy from above, each scene may be likened to a building or room within a city. Scenes represent virtual locations where avatars may visit and enter. A scene may be defined by various attributes such as appearance, size, furniture, included items, architecture, and so on.

In some situations, it may be desirable to have a single scene 1005 available but have avatars enter different copies of that scene. For example, one may create a scene arranged to appear like a virtual tennis court, and it may be desirable for pairs of tennis players to be provided distinct copies of the scene rather than making all players use the same virtual space. Such copies are implemented by instances 1006. An instance represents a running version of a scene, and avatars interact within instances of scenes.

When an avatar locates a scene and attempts to enter that scene, the service provider may determine whether to create a new instance for that avatar or to place that avatar into an existing instance. The determination may be based on rules specified for the scene. For example, some scenes may be configured to allow a maximum number of avatars per instance (for example, a tennis scene may allow up to two players per instance). New instances may also be created based on time intervals, avatar user requests, availability of objects within each instance, and so on. In one embodiment, an environment may automatically change, or the avatars may be automatically transported, when a threshold event takes place. For example, avatars waiting to play poker may be automatically transported to the poker room when eight avatars have signed up for the table. In another example, a prospective tennis player may wait in a waiting room until another tennis player arrives and the waiting room is transformed into a tennis court.

Instances may originally be configured based on the specification of the underlying scene. For example, a newly created instance may be arranged to have the same contained items, the same appearance, the same size, and so on, with respect to the scene. In alternate embodiments, the scene may include instructions that randomize or otherwise alter the nature of each new instance. As avatars interact with an instance of a scene, those avatars may cause changes to the contained items, appearance, and so on. Such changes may or may not be reflected back to the original scene, possibly depending on the configuration of the scene. Additionally, in an embodiment, new instances may be based on existing instances, rather than being based on the original scenes.

Within a service provider, worlds 1003, scenes 1005, and instances 1006 may be represented as data structure objects, such as XML documents, relational database records, programming language objects, or the like. Service providers may include software modules to convert these objects to graphical or other representations. The software may be operated on the service provider to generate those representations. Additionally or alternately, client software operating on user devices may perform the translation of data structure objects to graphical representations.

Figure 11:
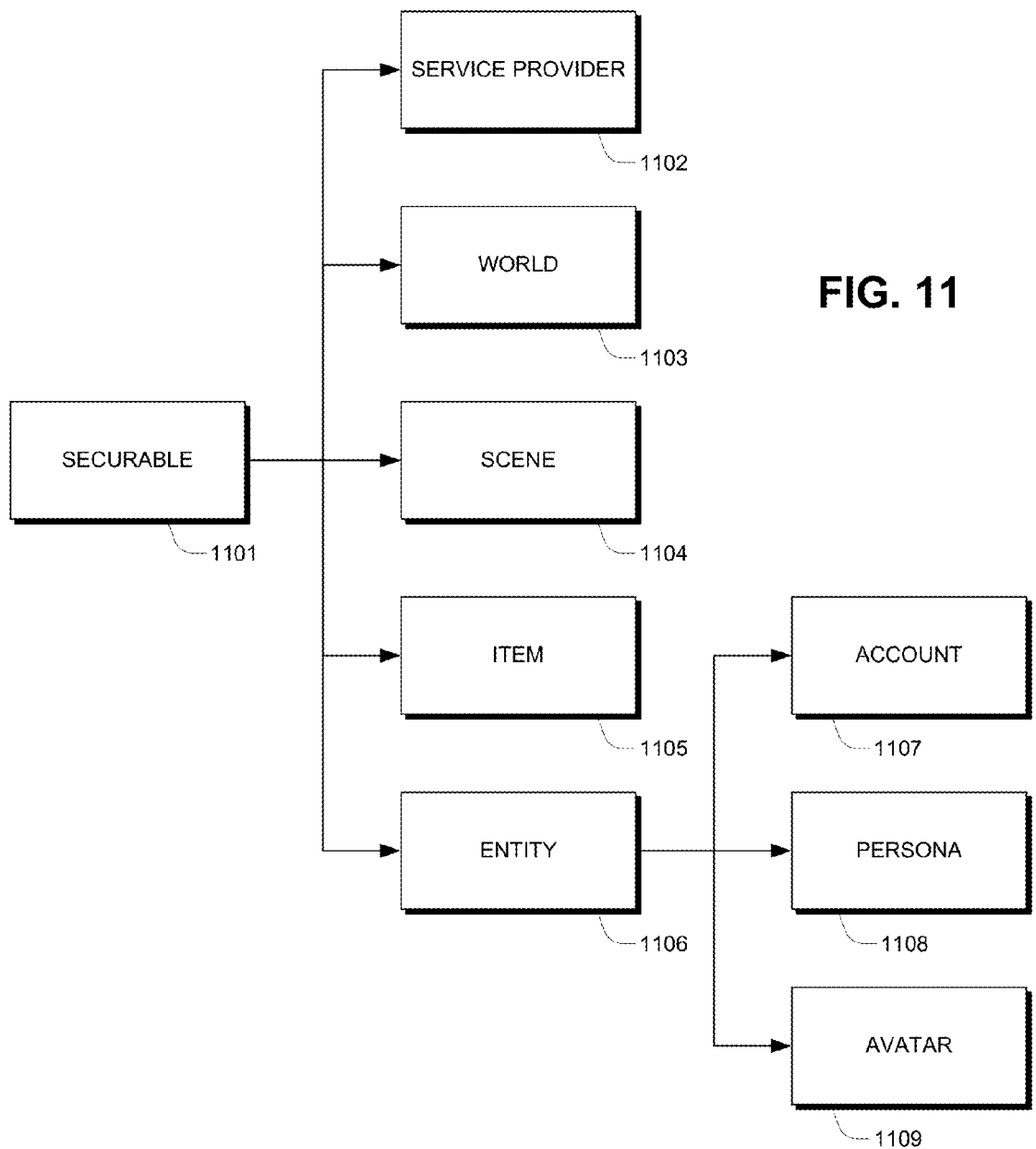
FIG. 11 is a hierarchical diagram of an example arrangement of objects within a virtual world, as used in an embodiment.

FIG. 11 is a hierarchical diagram of an example arrangement of objects within a virtual world, as used in an embodiment. The blocks represent types of data objects, and interconnections may represent relationships among the data elements, such as pointers, references, subclass relationships, or the like. The data structures may be stored on computer-readable media such as a hard drive, SSD, tape backup, distributed storage, cloud storage, and so on, and may be structured as relational database tables, flat files, C structures, programming language objects, database objects, and the like. In various embodiments, additional elements may be included, some elements may be removed, and/or elements may be arranged differently from what is shown.

A securable object 1101, as used in an embodiment, is a general class or type of object used by a service provider. Securable objects may include service provider data object 1102, virtual world data object 1103, scene data object 1104, and item 1105. The service provider, virtual world, and scene data objects may correspond to the objects described with respect to FIG. 10, and instances may also be represented as securable objects. Items 1105 may represent items within a virtual world, including items possessed by avatars, items within scenes, buildings, structures, plants, animals, and other components of a virtual world.

Securable objects may generally be considered as objects that can be acted upon within a virtual world. Various actions may be performed on securable objects, as defined by the service provider, virtual world, scene, instance, or other appropriate body. The types of actions understood within a virtual world may differ across different types of securable objects. For example, the action "take" may be available for small objects such as pencils, but not available for large objects such as trees. Similarly, the permitted actions may be relative to one or more avatars or objects or avatar or object types. For example, the action "take" may be available for a tree when an avatar driving a tractor attempts the action, but unavailable for an avatar without a helper object of some kind.

In an embodiment, one particular type of securable object is entity 1106. An entity may represent a user or other individual capable of taking actions within the virtual world. Examples of entities may include user account 1107, persona object 1108, and avatar object 1109. Because entities are types of securable objects, they may be acted upon just like any other securable object. In an alternate embodiment, entities may not be a type of securable object.

When an avatar (or other entity) interacts within a virtual world, the avatar may take actions within that world. For example, an avatar may acquire a pencil lying on the ground in a virtual world, by executing a "take" action on the pencil. Such an action may be represented as a data request presented to a service provider via a network protocol or other communication system, and the action may be translated to a graphical representation by the service provider and/or client software executing on the user's computer.

In some cases, it may be desirable to restrict the types of actions that may be taken within a virtual world. Thus, in an embodiment, the service provider implements a process of "permissions resolution" to determine which actions may be taken, by which entities, and on which securable objects. In another embodiment, certain objects may be generated and utilized entirely locally on the client and either not transmitted to other clients, or transmitted in summary form to other clients. For example, if a user has a grass lawn, other clients may simply be told to generate a "grass lawn" without regard to replicating specific condition aspects of the lawn, such as footprints or imperfections. In some instances, such "summary form" transmission may be used to permit users to specify what kinds of generic objects they prefer (e.g. what type of grass), and/or to localize such common objects, as for example by having the summary form item "night sky" reflect the appearance of the night sky as seen from each user's geographic location.

Figure 12:
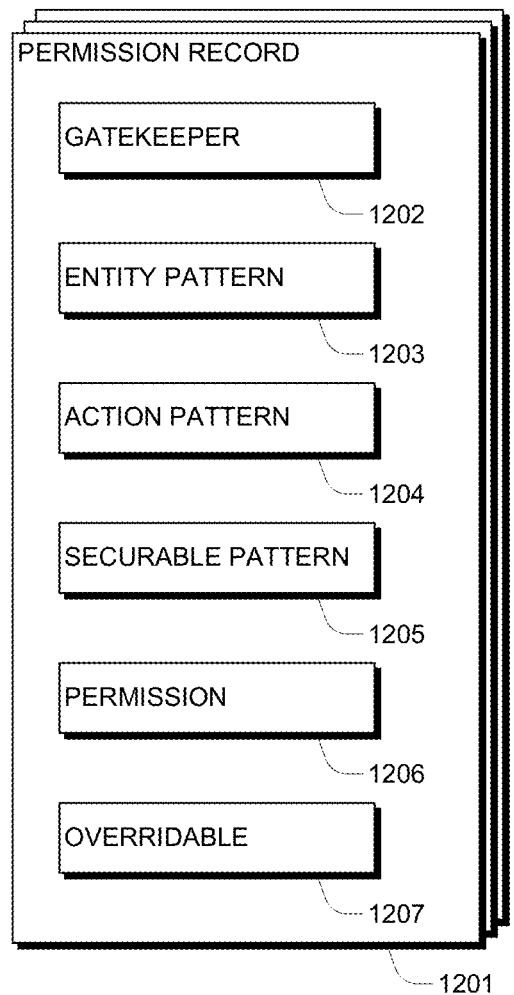
FIG. 12 is a block diagram of a data structure representing permissions, as used in an embodiment.

FIG. 12 is a block diagram of a data structure representing permissions, as used in an embodiment. The data structure may be stored by a service provider and used in the process of permissions resolution. The data structure may be stored on computer-readable media such as a hard drive, SSD, tape backup, distributed storage, cloud storage, and so on, and may be structured as relational database tables, flat files, C structures, programming language objects, database objects, and the like. In various embodiments, additional elements may be included, some elements may be removed, and/or elements may be arranged differently from what is shown.

Permission record 1201 may be associated with one or more "gatekeeper" objects 1202. A gatekeeper is an object that has authority or jurisdiction to determine whether an action will be permitted. In an embodiment, gatekeepers may include the service provider, virtual world, scene, and/or instance in which an avatar takes an action. Thus, each gatekeeper may have an influence on whether the avatar is permitted to take the desired action, as described below.

Permission record 1201 may further include entity pattern 1203, action pattern 1204, and/or securable pattern 1205. These patterns may be used to determine whether a particular permission record relates to an action being taken. In an embodiment, a permission record is applicable to an action when the entity attempting the action matches entity pattern 1203, the action being attempted matches action pattern 1204, and the securable object to be acted upon matches securable pattern 1205. The patterns may identify particular objects or rules used to match objects. The patterns may include, for example, regular expressions, categories, executable code, and the like.

Permission record 1201 may further include permission indicator 1206. The permission indicator may identify whether an action matching the patterns is to be allowed or disallowed. In an embodiment, permission indicator 1206 may have a value of "yes," "no," and "inherit." The last of these options may be used to indicate that the permissibility of the action is to be derived from another gatekeeper, as described below.

Permission record 1201 may also include an "overridable" flag 1207. This flag may be used to determine whether further gatekeepers are to be consulted in determining whether the action is to be permitted. For example, a service provider may include a permission record that permits a certain action. If the permission record is overridable, then the permission resolution process may further consult the virtual world within that service provider to determine whether the action is permitted, but if the permission record is not overridable, then the permission resolution process may conclude the resolution process.

Figure 13:
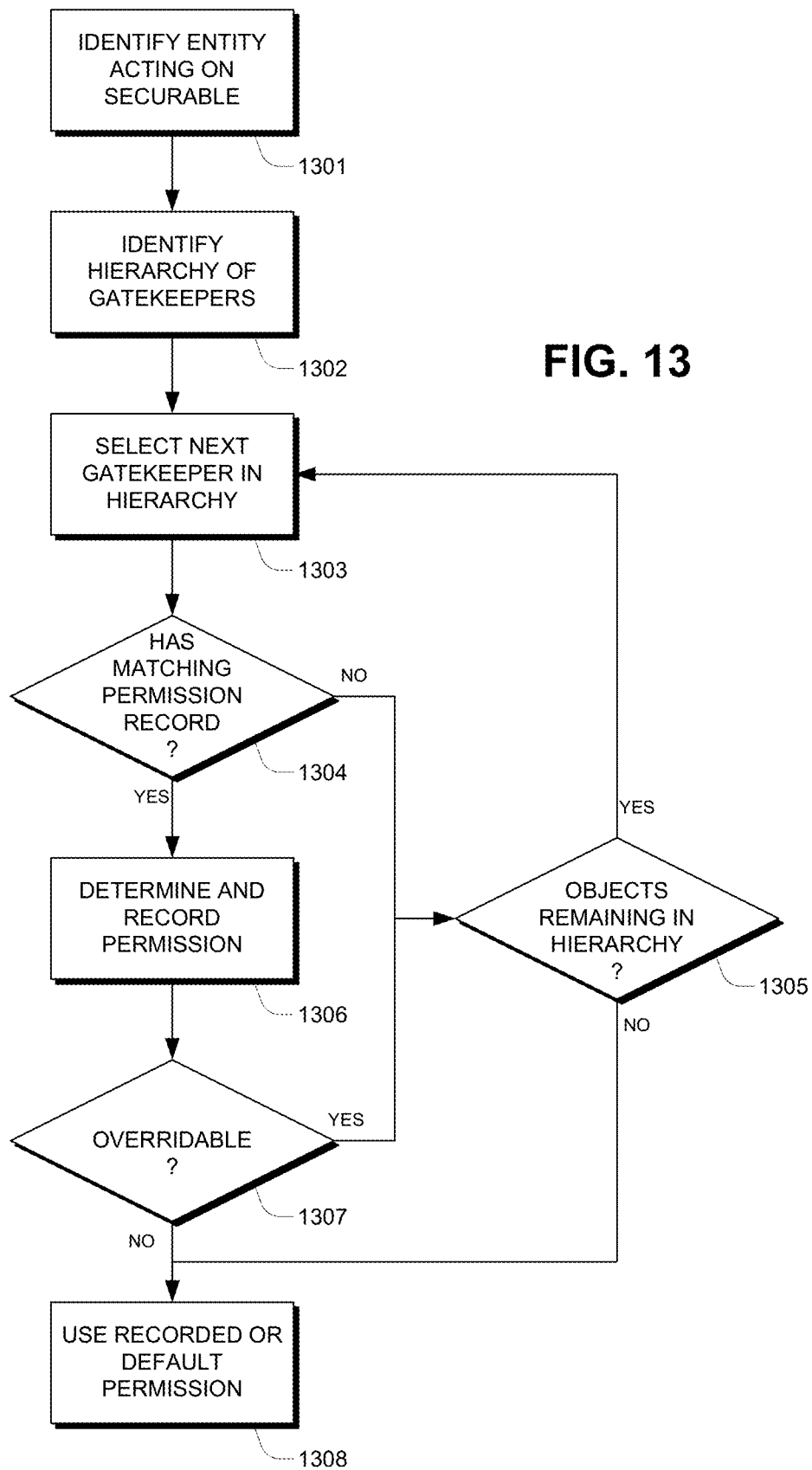
FIG. 13 is a flowchart of a process of resolving permission for an entity to take an action, as used in an embodiment.

FIG. 13 is a flowchart of a process of resolving permission for an entity to take an action, as used in an embodiment. The process may be performed, for example, on a service provider system. In various embodiments, additional blocks may be included, some blocks may be removed, and/or blocks may be connected or arranged differently from what is shown.

At block 1301, the service provider identifies an entity attempting to take an action on a securable object. The attempt may be identified in response to a request submitted by a user to have that user's avatar or other entity take the desired action.

At block 1302, a hierarchy of gatekeepers is identified. In an embodiment, the hierarchy of gatekeepers includes the service provider on which the entity is acting, the virtual world in which the entity is acting, the scene in which the entity is acting, the instance in which the entity is acting, and the securable object on which the entity is acting. In alternate embodiments, other gatekeepers may be included, a subset of the gatekeepers may be used, and/or the gatekeepers may be differently ordered.

The system then proceeds to resolve permissions for the gatekeepers. At block 1303, the highest gatekeeper in the hierarchy is selected. The permissions records associated with the gatekeeper may then be matched against the entity, action, and securable object of block 1301. If no matching permission record is found, then the system proceeds to consider further objects in the hierarchy at block 1305.

If a matching permission record is found, then the permission identifier of the matching permission record may be applied and recorded to an internal buffer, at block 1306. If the permission identifier is "inherit," then the existing value of the internal buffer may be retained, so that the previous permission setting is inherited. If the permission record is overridable at block 1307, then the system proceeds to consider the next gatekeeper in the hierarchy, at block 1305.

When no gatekeepers remain for consideration at block 1305, or when a non-overridable permission record is applied at block 1307, permission resolution may proceed to block 1308, at which the last recorded permission from block 1306 may be applied.

In some cases, no permission may have been recorded at block 1306. For example, it is possible that none of the gatekeepers had matching permissions records, or all of the matching permissions records had permissions identifiers of "inherit." In such cases, a default permission may be applied. Alternately, certain gatekeepers may include "catch-all" permissions records to ensure that at least one permissions record always matches, or a "catch-all" gatekeeper may be included at the end of the hierarchy.

Variations of the above algorithm may be applied in some embodiments. For example, a gatekeeper may include a permission record directing the gatekeeper to consult other gatekeepers and/or permissions records, so that the hierarchy of gatekeepers from block 1302 need not be strictly followed. For example, a virtual world may include a permission record indicating that the permission records of the securable object are to be consulted immediately, rather than considering those of the virtual world, scene, and instance. This could be used to implement, for example, a service provider policy that the interests of securable objects being acted upon are to be obeyed in all cases, regardless of the implementation of particular worlds and scenes.

Figure 14:
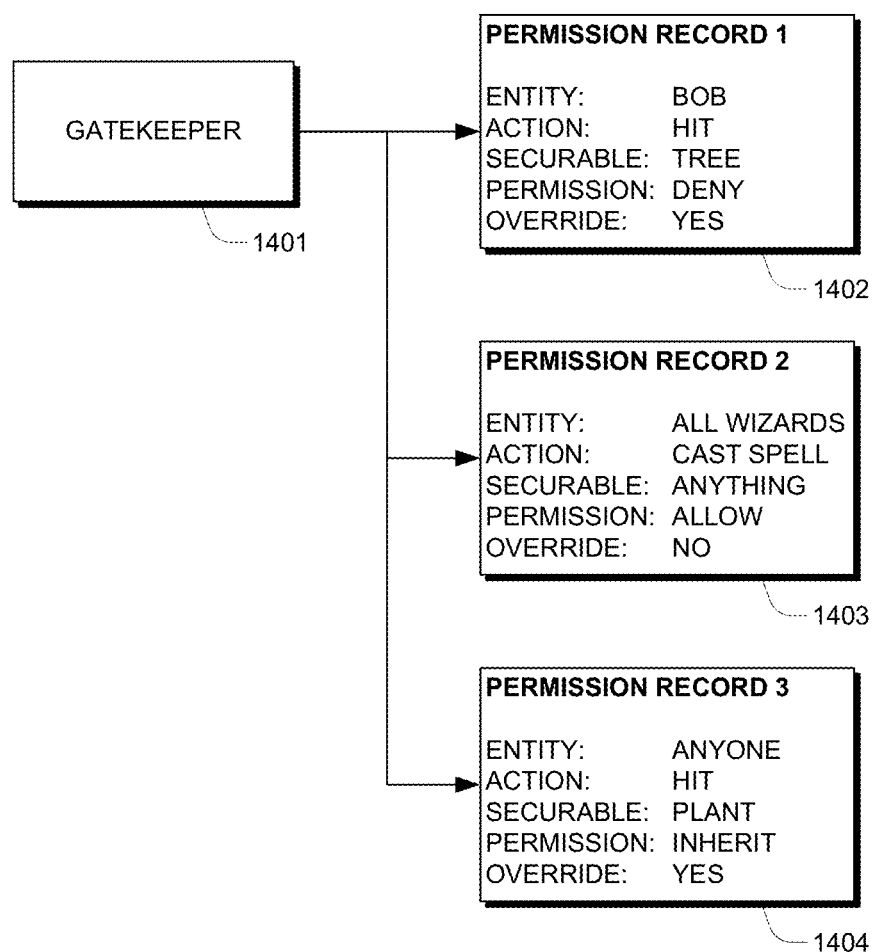
FIG. 14 is a block diagram of an example gatekeeper having associated permissions records, as used in an embodiment.

FIG. 14 is a block diagram of an example gatekeeper having associated permissions records, as used in an embodiment. The diagram is intended to be merely exemplary and not indicate a required configuration of a particular gatekeeper or type of gatekeeper.

Gatekeeper 1401 includes three permission records. The first permission record 1402 indicates that an entity named "Bob" is not permitted to take the action of hitting securable objects that are trees. Thus, if permission record 1402 is applied, then the entity named "Bob" would be automatically prevented from attempting to hit trees. Because permission record 1402 is overridable, it may be possible that another gatekeeper further down on the hierarchy does permit Bob to take that action.

The second permission record 1403 indicates that entities who are of the type "wizard" are permitted to take the action of casting spells on any securable object. This permission record is indicated as not overridable, so other gatekeepers further down on the hierarchy may be unable to prevent this permission record from taking effect. Note that the entity pattern field in record 1403 does not indicate a particular entity but rather a class of entities, thus greatly increasing the expressive power of permission records.

The third permission record 1404 indicates that where an entity attempts to take the action of hitting securable objects that are plants, the permission value is to be inherited from a previous gatekeeper.

In an embodiment, each gatekeeper may delegate some or all tasks with regard to some or all avatars or objects to other gatekeepers on a permanent, temporary, or revocable basis.

In an embodiment, permission records are considered in a particular order, which may be defined by gatekeeper 1401 or an appropriate administrator or user of the system. For example, it will be observed that if an entity named "Bob" attempts to hit a tree, then permission records 1401 and 1404 would both match. Since record 1401 occurs first, it will take precedence. Alternate embodiments may include different algorithms for determining which of several permission records will take precedence.

It may seem that an equivalent result could be obtained by omitting permission record 1404 entirely from gatekeeper 1401, since inheritance of a previous gatekeeper's permission setting may be automatic where a gatekeeper has no matching permission records. However, the ability to specify inherited permissions may be used, for example, to prevent another permission record from overwriting the previous gatekeeper's setting. For example, gatekeeper 1401 may contain a fourth permission record to deny anyone from hitting any securable object. In such a case, permission record 1404 may be used to allow plants to be hit when such an action is permitted by a previous gatekeeper.

Figure 15:
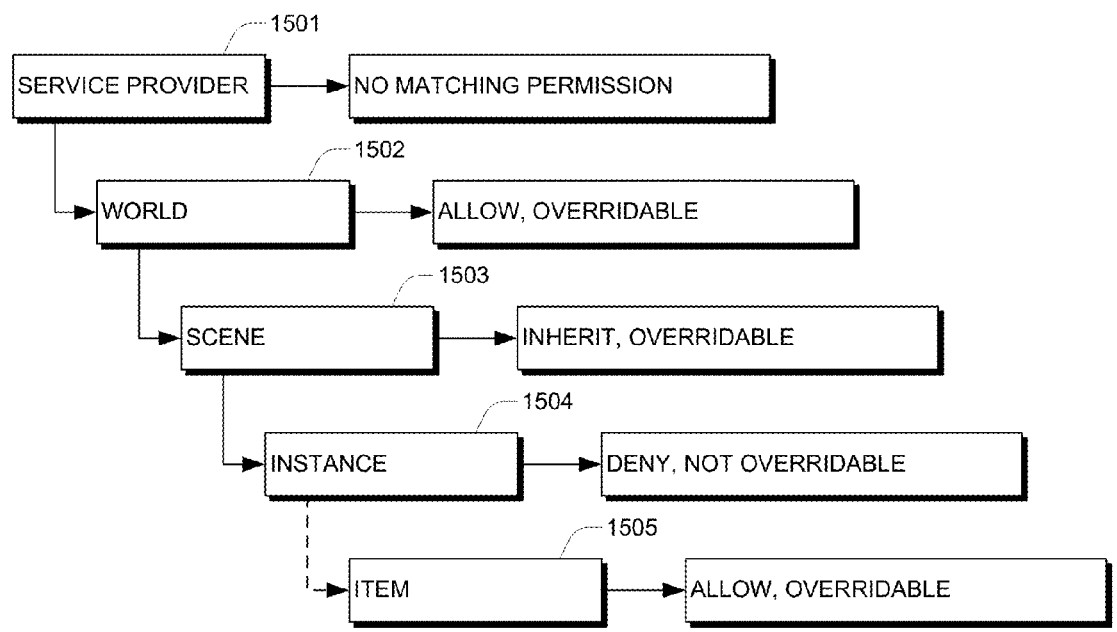
FIG. 15 is a diagram of an example of permission resolution across multiple gatekeeper objects, as used in an embodiment.

FIG. 15 is a diagram of an example of permission resolution across multiple gatekeeper objects, as used in an embodiment. The diagram is intended to be merely exemplary and not indicate a required process of permission resolution. The example of FIG. 15 relates to an attempt by an entity to take some action on some securable object.

In the example of FIG. 15, the hierarchy of gatekeepers includes the service provider, the virtual world, the scene, the instance, and the securable object. At block 1501, the service provider's permission records are consulted to determine whether an action is permitted. In the example of FIG. 15, no matching permission is found, so the system proceeds to the next gatekeeper on the hierarchy.

At block 1502, the virtual world's permission records are consulted, and it is determined that the virtual world allows the attempted action. Thus, the current permission setting of "allow" may be recorded. Since the virtual world indicates that the permission is overridable, the system proceeds to the next gatekeeper in the hierarchy.

At block 1503, the scene's permission records are consulted, and it is determined that the scene inherits the permission setting. Thus, the permission setting of "allow" from block 1502 is retained as recorded. Since the scene indicates that the permission is overridable, the system proceeds to the next gatekeeper in the hierarchy.

At block 1504, the instance's permission records are consulted, and it is determined that the instance denies the attempted action. Thus, the permission setting of "allow," retained from block 1503, is replaced with the setting "deny." Since the instance indicates that the permission is not overridable, the system concludes permission resolution. In particular, the securable object's permission records 1505 are not consulted, so the attempted action is denied despite the fact that the securable object would have allowed it.

Executable Scripts

Virtual world service providers may include features enabling executable scripts to be uploaded and run on the service providers. These scripts may be used to automatically perform various tasks such as performing actions, modifying objects, changing appearances, enabling additional functionality, and the like.

Server-side scripts, as described below, are distinguished from client-side scripts, which operate on client devices. Such client-side scripts may be used to manipulate the graphical representation of the virtual world as displayed to a user on the client device. Client-side manipulations generally do not affect state or data on the service provider. However, a client-side script may be created to send requests to the service provider in an automated fashion. Client-side scripts may further be created to execute server-side scripts and/or take other actions through an application programming interface, network protocol, or other communication method offered by the service provider, thereby affecting state or data on the service provider. The service provider may include software components to detect such client-side scripts and possibly disable them or otherwise reduce their effectiveness.

Server-side scripts on a virtual world service provider may provide a variety of functions. They may be developed by software developers and distributed to users of the virtual world service provider in order to provide those users with enhanced experiences. Scripts may be distributed in standalone form and installed by users, and/or scripts may be bundled with objects, items, and other elements on the virtual world service provider. In an embodiment, scripts may be distributed and/or sold through a virtual store, for real and/or virtual currency, goods or items.

Scripts may operate on a service provider by manipulating data structures on the service provider. Accordingly, the service provider may provide a consistent interface for representing components of digital worlds, so that the scripts may operate. In an embodiment, the components of digital worlds are represented in a tree-like structure similar to the Document Object Model used to represent HTML or XML documents. Examples below are presented in variants of XML markup to represent the document trees, but it will be understood that the components of digital worlds may be implemented in a variety of formats and data structures.

Figure 16:
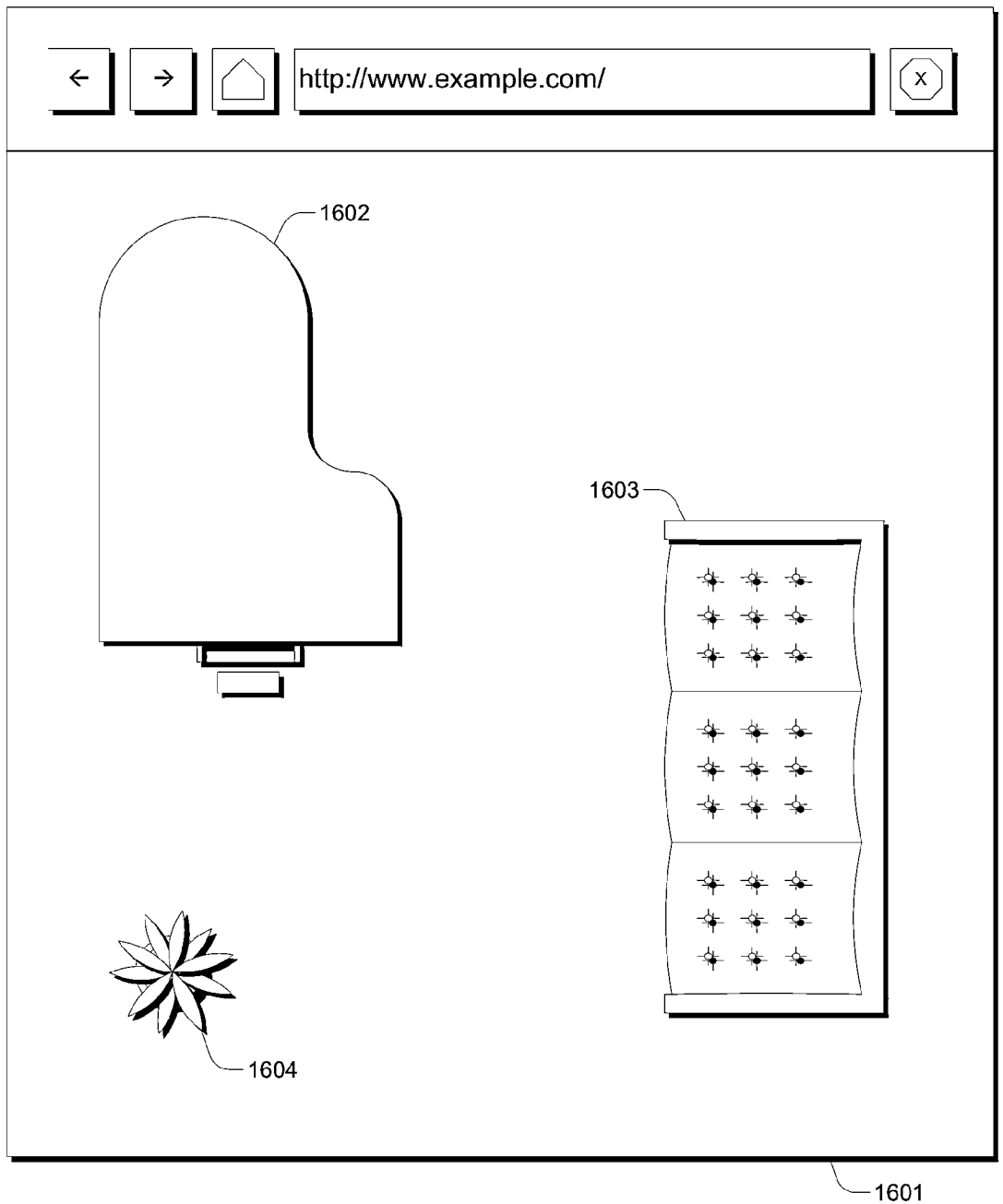
FIG. 16 is an example of a layout of an instance of a scene in a virtual world, as used in an embodiment.

FIG. 16 is an example of a layout of an instance of a scene in a virtual world, as used in an embodiment. The diagram is intended to be merely exemplary and not represent a required arrangement of items in a scene or instance.

The graphical representation of the instance 1601 includes a piano 1602, a sofa 1603, and a plant 1604. The objects are represented graphically in the user interface 1601. In an embodiment, the objects may be represented in three dimensions. Internally within a service provider, the instance may be represented as a data structure, such as the data structure of the table below.

TABLE 2

```
<scene name="room1 ">
    <item type="piano" location="5,5" />
    <instance id="1 ">
        <item type="sofa" location="30,30" size="15" />
            <item type="cushion" color="red" />
            <item type="cushion" color="brown" />
        </item>
        <item type="plant" leaves="10" location="5,40" />
    </instance>
    <instance id="2">
        ...
    </instance>
</scene>
```

The code representation indicates the objects in the scene and instance, as well as various attributes and sub-objects. For example, each of the objects in the listing includes a location attribute, which may correspond with the location of the object in the scene or instance.

Certain objects may be specifically associated with the scene or instance. For example, in the above listing, the piano object is associated with the scene, while the sofa and plant objects are associated with the instance. Thus, other instances of the same scene may or may not include the sofa or plant, but they would include the piano by default. In an alternate embodiment, default attributes of the scene may be maintained under a separate subtree within the <scene> data (such as a <default-layout> tree), and newly created instances may copy the objects from the default attributes upon creation.

Scripts may then be attached to parts of the document tree, in an embodiment. Scripts may be implemented as interpreted code, such as Javascript code, and be embedded within the document tree. The table below illustrates a sample document tree with script embedded at various levels of the tree structure.

TABLE 3

```
<scene>
    <instance>
        <object 1>
            <script name="script 1 " params="int, string">
                [script code]
            </script>
            <script 2>...</script>
        </object>
        <object 2>
            <script 3>...</script>
            <object 3>
                <script 4>...</script 4>
            </object>
        </object>
        <script on instance>...</script>
    </instance>
    <script on scene>...</script>
</scene>
```

In the example of this table, a scene includes an instance with objects 1 and 2, and object 2 includes a sub-object 3. Object 1 includes two scripts, 1 and 2; object 2 includes script 3, and object 3 includes script 4. Furthermore, the instance has an additional script, and the scene has an additional script.

Scripts may execute various functions to manipulate the document tree in which they are placed. For example, a script may add nodes, remove nodes, manipulate attributes of nodes, reorder nodes, and so on. It may be desirable to limit the extent to which a script is able to modify the document tree, for security and usability reasons. For example, the system may be configured to enable a script to be attached to an object, so that the script may manipulate the object appearances, but not manipulate the appearance of avatars or other objects in the scene.

In an embodiment, scripts are limited to modifying the document tree of the node that is the parent to the script, and associated sub-nodes. In the example above, scripts 1 and 2 would be permitted to modify object 1, but not objects 2 or 3, and not the instance or scene generally. Script 3 would be able to modify objects 2 and 3, and script 4 would be able to modify object 3 but not object 2 (as the parent of script 4 is object 3). In this embodiment, the instance script would be able to modify the instance and all objects therein, but not be able to modify the scene. This may be useful for an administrator or leader of the instance, to rearrange or clean up the instance. The scene script would be able to modify the scene, as well as all instances and objects therein. This may be useful for making global changes across all instances of a scene that are in operation.

It may nevertheless still be desirable for a script attached to one object to be able to affect another object in certain ways. For example, a dog may include a script that causes the dog to run around within a scene. This may cause the dog to eventually crash into an object such as a table. Since the script is attached to the dog and not the table, the script alone may not be able to modify the table object to reflect that the table has been knocked over.

Thus, in an embodiment, the system provides an inter-script messaging service enabling scripts to trigger execution of other scripts. In the previous example, when the dog script causes the dog to crash into the table, the dog script may invoke a script on the table, causing the table to perform a "crash receipt" function. Such a function may consequently cause changes in the table object, such as falling over or breaking into pieces.

In one embodiment, the conversion of objects from one type to another and/or conversions at boundary events, and/or entrance to an area may provoke a script compatibility check to determine whether introduction of an object may conflict with another script or scripted object. Using the above example, if an avatar attempts to enter a room with his dog, a query may be made as to whether there are objects in the room that are not capable of receiving messages from a "dog" script, such as "dog ran into you." If, in the above example, the table was not capable of receiving such messages, entry may be denied to the dog, certain functionality of the dog may be disabled or limited, and/or certain incompatible objects may be changed, such as by making the table "bolted to the ground." In another embodiment, objects may be associated with scripts intended for operation by other objects, such as a dog that is capable of delivering a "dog ran into you" script for one or more types of other objects. In such a case, entry of the dog may be conditioned upon successful transmission of such script.

Since the script on the table object is associated with the table, it may be possible for the designer of the table to implement scripts that perform unexpected actions. For example, when the dog crashes into the table, the invoked script on the table may cause the table to double in size. In an embodiment, the system may be configured to detect and prevent such unexpected actions. For example, the system may include assertions of expected behavior when scripts are executed, and prevent scripts from causing changes that violate those assertions of expected behavior. In an embodiment, the assertions may be programmed through scripts on instances, scenes, virtual worlds, and/or service providers.

Figure 17:
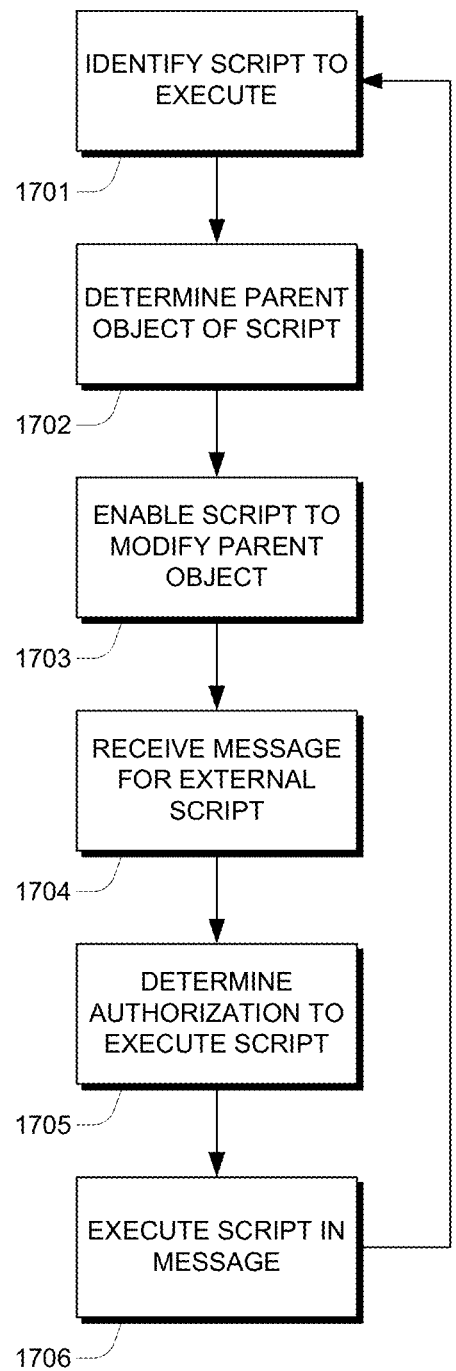
FIG. 17 is a flowchart of a process of executing scripts, as used in an embodiment.

FIG. 17 is a flowchart of a process of executing scripts, as used in an embodiment. The process may be performed by a service provider. In various embodiments, additional blocks may be included, some blocks may be removed, and/or blocks may be connected or arranged differently from what is shown.

At block 1701, the system identifies a script to be executed. The execution of the script may be invoked by another script, by a user, by an automated process, or the like. At block 1702, the system determines the parent object of the script, and enables the script to modify the parent object at block 1703. In executing the script, the system may observe the execution to prevent modifications outside the parent object and/or to prevent undesirable modifications.

At block 1704, the system receives a message directed to an external script. The message may be invoked by performing a special function call to the system, identifying the object and script to be invoked. In an embodiment, the message may further include one or more parameters for the external script. The parameters may be matched to the script being called. For example, as shown in the above code listing, script 1 takes two parameters, an integer and a string. In an embodiment, the system raises an error if the proper parameters for the external script do not match the parameters provided in the message.

At block 1705, the system determines authorization to execute the external script. Scripts may be blocked from calling external scripts for a variety of reasons. For example, a script may be prevented from calling another script located in a different instance, scene, virtual world, and/or service provider. Additionally, a script may be prevented from calling another script based on the permissions system described previously. In an embodiment, the call to the external script may be in the form of an action, so that the permissions resolution process may be performed.

If the script is authorized to call the external script at block 1705, then at block 1706 the system executes the external script, repeating the process at block 1701 on the external script. In some cases, such as where the external script is located at a different service provider, the external script may be executed by a different service provider or system.

Due to the recursive nature of execution of scripts, it is possible that an erroneously or maliciously designed script may loop indefinitely, attempt to call an unreasonable number of external scripts, or otherwise delay or prevent normal execution of the virtual worlds system on the service provider. Accordingly, in some embodiments, the service provider may implement resource limits, such as time and/or memory usage limits, to prevent scripts from unboundedly executing. The service provider may additionally implement a system that charges real or virtual currency, goods or services in exchange for execution time.

Service Provider System

Figure 18:
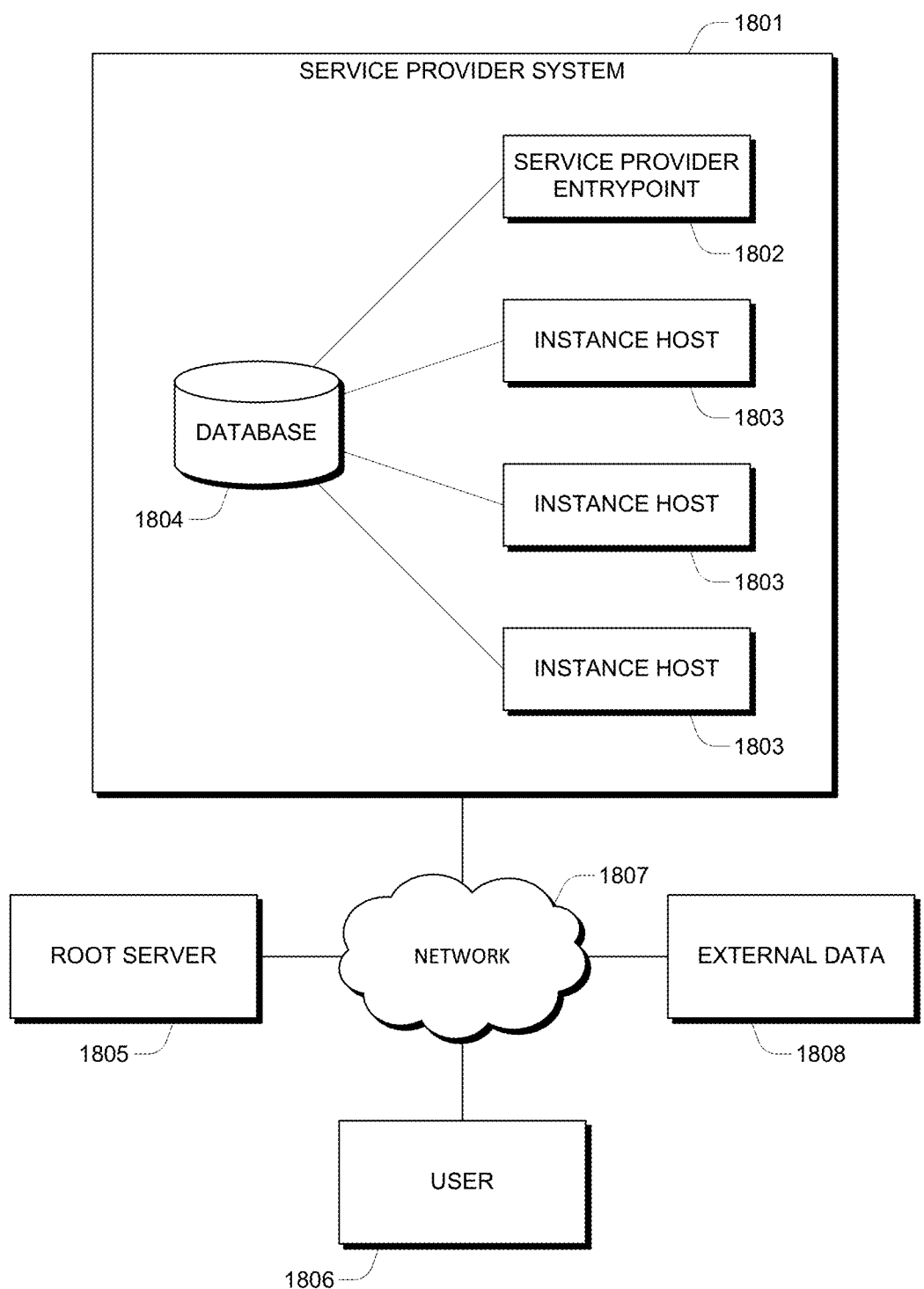
FIG. 18 is a block diagram of a service provider system and related computer systems, as used in an embodiment.

FIG. 18 is a block diagram of a service provider system and related computer systems, as used in an embodiment. The service provider system may be used as service provider 901 of FIG. 9, for example. In various embodiments, additional blocks may be included, some blocks may be removed, and/or blocks may be connected or arranged differently from what is shown.

Service provider system 1801 may include several computer systems. The included computer systems may be housed on a single device and/or separate devices, and each of the computer systems may similarly comprise multiple computing devices, as in distributed or cloud computing. The computer systems, when housed on separate devices, may be connected by a local or wide area network, and/or by other communication systems.

One component of service provider system 1801 may be service provider entrypoint 1802. The entrypoint may be a server or other device with a network connection to external networks, providing an outward-facing interface for external clients such as users. In an embodiment, external network requests directed to service provider system 1801 are initially directed to entrypoint 1802. In an embodiment, multiple entrypoints 1802 are included to facilitate distributed computing and handle high user loads.

The entrypoint system 1802 may provide various features to the service provider system 1801. For example, it may provide 2-dimensional rendering services, allowing traditional web-based browser clients to access content offered by the service provider system without requiring 3-dimensional rendering capabilities. Such requests may be detected, for example, as standard HTTP web requests, and the entrypoint system 1802 or other computing system may respond with HTML, XML, plain text, RTF, streaming audio/video, images, and/or other appropriately formatted content. By offering 2-dimensional rendering, the content, including 3-dimensional virtual worlds content, may be indexed by search engines and accessed by those with disabilities or using computing systems that impair usage of 3-dimensionally rendered worlds.

Instance hosts 1803 operate instances of virtual worlds, as described above. Each instance host 1803 may serve a single instance or multiple instances, in various embodiments. Instance hosts may be separate computing devices, virtual servers, or modules operating on a server. Some or all of the instance hosts may operate on the same computing device as entrypoint 1802.

Entrypoint system 1802 may further provide load balancing services to service provider system 1801. For example, entrypoint 1802 may direct virtual worlds users to a particular instance host 1803, depending on factors such as the configuration of the service provider, virtual world, and/or scene; the number of users in each instance; characteristics of the requesting user and/or request such as special location identifiers requesting a particular instance; the hardware capabilities and capacities of the instance hosts; and the like. Entrypoint 1802 may further start and/or shut down instance hosts 1803 based on these and other factors.

The entrypoint 1802 and/or instance hosts 1803 may further communicate with service provider database 1804. The database may maintain information such as virtual worlds data, scene data, instance data, user data, avatar data, and so on. The database may include data structures such as those shown in FIGS. 10-12, as well as other data structures as described throughout this specification, such as virtual world documents in the DOM format described previously.

Service provider system 1801 may further communicate with external entities, for example via network 1807. Root server 1805 may provide general services across multiple service providers, such as user accounting services, accounting of real and/or virtual currency, avatar transfer services as described with respect to FIG. 3, and the like. Thus, service providers 1801 may communicate with root server 1805 to use these services. The communications may be encrypted and/or authenticated to ensure that unauthorized users are not able to illicitly obtain information from root server 1805.

Service provider system 1801 may further communicate with users 1806 to provide virtual worlds services in 2 and/or 3 dimensions, based on the client software and other preferences of user 1806. Users may additionally communicate with root server 1805 for various purposes, such as viewing directories of operational service providers and managing accounts and/or finances.

Connection to Real World Data

Service provider system 1801 may also communicate with external data sources 1808. These sources may enable service provider system 1801 to link real-world data into the virtual world. Objects, graphics, avatars, and/or virtual spaces may use virtual data obtained from external data sources 1808 or other sources. For example, one scene in a virtual world may be a virtual store where avatars can browse around and shop for products. The store may include virtual representations of actual products, drawn from external data, and the prices and availability of the products may be tied to an actual store's inventory, so that avatars viewing products within the store have access to actual purchasing information. In an embodiment, the external data is used to update content on the service provider system 1801 in real time.

In an embodiment, service provider system 1801 is further able to transmit data to external systems. For example, in the virtual store described above, an avatar may acquire an item in the virtual world, such as by purchasing it with real or virtual currency. In such a situation, the service provider system 1801, through the entrypoint 1802, an instance host 1803, and/or another mechanism, may send a command or instruction to an external system, ordering a corresponding product, so that the actual product may be shipped to a person associated with the avatar. Other actions that service provider system 1801 may take on external systems may include financial transfers, property transfers, posting of content to external sites such as social networks, sending emails, and so on.

Communications between the service provider system 1801, external data sources 1808, and other external systems opens the possibility that a security compromise on one of the systems may affect the integrity of another. Accordingly, service provider system 1801 may include firewalls and/or other security measures to control security breaches from external systems. Additionally, service provider system 1801 may increase security by restricting communications to certain protocols, using authentication and encryption, and/or validating users, such as with two-factor authentication.

Namespaces and Two-Dimensional Representations

Three-dimensional representations of virtual worlds may be displayed on specialized client software configured to render the three-dimensional representation. Service providers and other systems may further serve content to traditional two-dimensional browsers and related software. Providing both representations may have several benefits, including backwards compatibility, search engine indexing capabilities, accommodations of disabilities, and the like.

In order to provide 2-dimensional or 3-dimensional services in appropriate situations, some embodiments include separate namespaces for differentiating between services. Thus, clients capable of rendering 3-dimensional virtual worlds can be served appropriate content different from that served to clients requesting 2-dimensional content.

Figure 19:
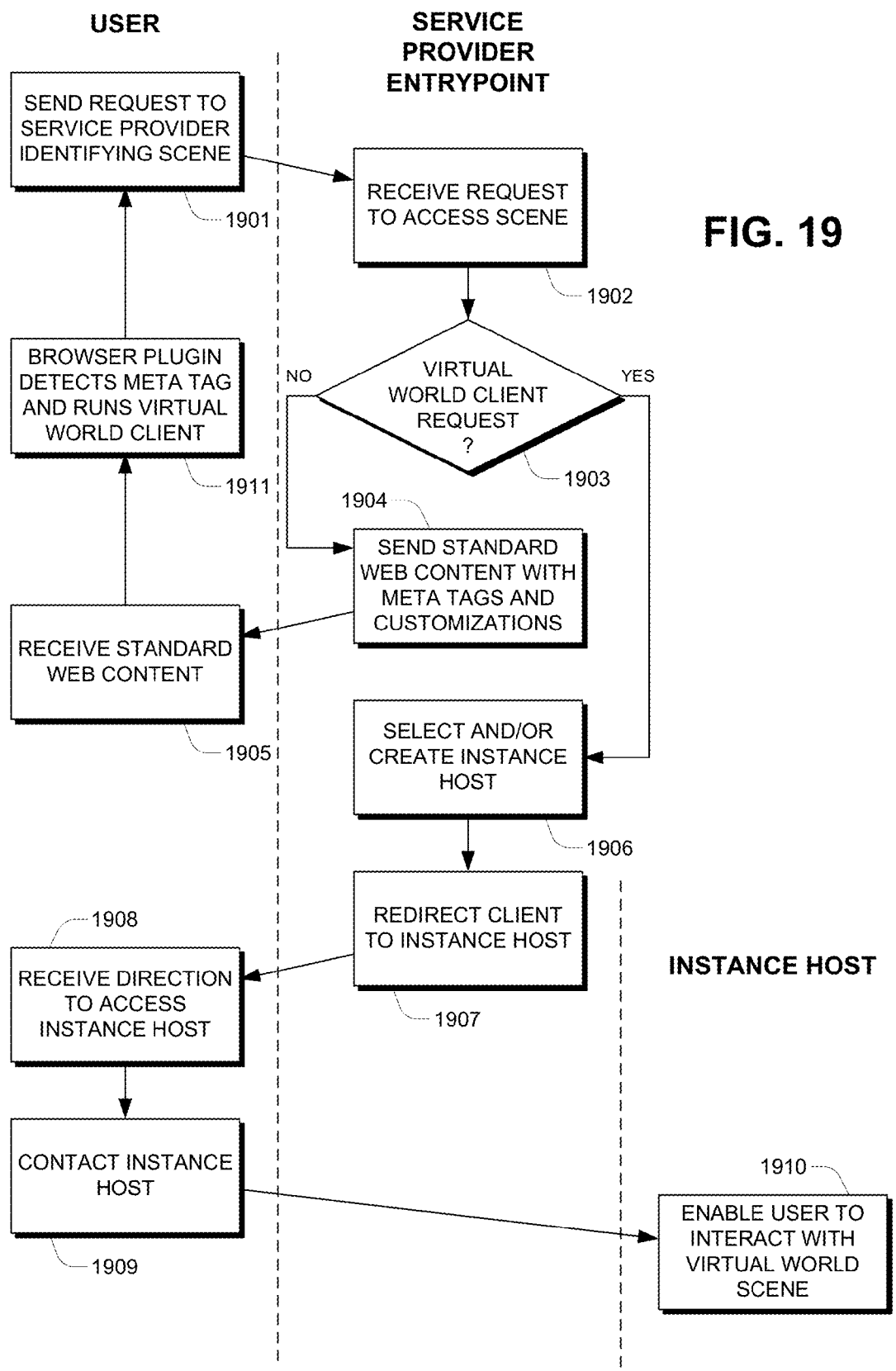
FIG. 19 is a flowchart of a process of serving content based on namespaces, as used in an embodiment.

FIG. 19 is a flowchart of a process of serving content based on namespaces, as used in an embodiment. Portions of the process may be performed by service provider systems 1801 of FIG. 18, including entrypoint 1802 and instance host 1803. In various embodiments, additional blocks may be included, some blocks may be removed, and/or blocks may be connected or arranged differently from what is shown.

At block 1901, a user sends a request to a service provider. The request is received by the service provider entrypoint at block 1902. The request may identify a particular scene that the user wishes to enter. The request may include further information such as avatar information, authentication information, and the like. The request may be sent in a single network transaction or divided among multiple network transactions.

In an embodiment, the request is formatted as a Uniform Resource Locator (URL). The request may take on the following form:

[protocol]://[service provider]/[scene]?[query]#[location]

The [protocol] element may identify the form of communication in which the request is communicated at block 1901. In an embodiment, the protocol may be "http," indicating a standard Web request, or "vww," indicating a virtual world web request. Other protocol identifiers may be used and understood by service providers. The [service provider] element may identify the network location of the service provider, for example by domain name or IP address. The [scene] identifier may identify the particular scene on the service provider to be accessed. In an embodiment, scenes may be organized in a hierarchical structure, such as by virtual worlds within a service provider as described previously, in which case the [scene] identifier may also be hierarchically structured, for example by using hierarchical elements separated by a character such as a slash.

The [query] identifier may include parameters relating to aspects of the scene to be accessed. The identifier may take the form of one or more key-value pairs, each key and value being joined by an equals sign, and the pairs being joined together with ampersands, for example. In an embodiment, one such parameter may identify a particular instance of a scene to be joined by the requesting user. This may be used, for example, to enable the user to join an instance where other users of interest, such as the users' friends, are present. The service provider may take the request for the instance into account, but it may choose to disregard the selected instance, for load balancing, capacity, and/or other reasons. By providing the ability for users to access particular instances of scenes by URL, the service provider may thus allow users to publish locations (for example, on websites, social media, email communications, and so on) so that other users can join the same instance by accessing the same URL.

The [location] identifier may identify a place in the scene to be accessed by the user. For example, the user may wish to appear on one side of a room in a scene, and may specify the location using this identifier. In an embodiment, the identifier may correspond to an anchor tag inserted into the Document Object Model. For example, the table below illustrates a sample DOM related to the scene shown in FIG. 16:

TABLE 4

```
<scene name="room1">
    <item type="piano" location="5,5" />
    <item type="sofa" location="30,30" size="15" />
        <a id="sofa" />
    </item>
    <item type="plant" leaves="10" location="5,40">
        <a id="plant-right" position="right">
    </item>
</scene>
```

By accessing a URL with a location identifier of "#sofa," the user's avatar may be placed on the sofa upon entering the scene. Similarly, by accessing a URL with a location identifier of "#plant-right," the user's avatar may be placed to the right of the plant.

In various embodiments, the URL may be structured or organized differently, as appropriate to the configuration of the service provider. Additionally, the URL may represent the location to be accessed as viewed on the client computer, while components of the URL may be transmitted in a different form, as is done in HTTP, for example.

At block 1903, the entrypoint determines whether the request is a virtual world client request. This determination may identify whether the client is requesting 2-dimensional or 3-dimensional content. The request may be made based on a number of factors. For example, the protocol identifier may distinguish such requests, where an HTTP request indicates a request for 2-dimensional content, while a VWW request indicates a request for 3-dimensional content. The distinction may additionally or alternatively be made based on an identifier of the client software making the request, such as a User-Agent header.

In one embodiment, the capabilities of the client and/or the bandwidth available to the client are utilized either on the client end, in crafting a User-Agent header or similar request modifier, or on the server end, in determining what kind of data to serve. In one implementation, content less demanding than the full 3D content, but more than the 2D content, may be transmitted in order to maximize the user experience by avoiding exceeding capabilities of the user machine or bandwidth.

If the entrypoint determines that the request is for 2-dimensional content, then at block 1904 the service provider may transmit standard web content to the requesting user. The standard content may include static content, such as general information relating to the service provider and virtual worlds therein. It may additionally or alternatively include dynamic content, such as information relating to the virtual worlds and/or 2-dimensional renderings of scenes in the worlds. In an embodiment, the 2-dimensional renderings are generated in real time. The renderings may also be videos and/or streaming content, enabling viewers of the 2-dimensional content to watch live content of activities in the virtual worlds. The renderings may be determined by the service provider in accordance with particular rules for translating 3-dimensional content into two dimensions. These determinations may be controlled by content, such as "alt" tags, within the internal representation of scenes and/or instances.

The 2-dimensional rendering may further include textual content describing the activities in the virtual worlds. The textual content may be manually generated by operators or users on the service provider. Additionally or alternatively, the textual content may be automatically generated by graphical analysis of metadata within the virtual worlds, possibly producing a live transcript or feed of activities. By providing textual content, the service provider may facilitate automatic search engine indexing processes, thereby providing a measure of search engine optimization (SEO) and encouraging outside individuals to visit the virtual world.

In one embodiment, textual content is provided in a manner suited to automated reading for the visually impaired, including transmission of the textual content in audio format. Such content may thus be formatted in specific ways, such as for screen-reader software, possibly based on user preferences.

The 2-dimensional rendering may further include information to facilitate entry into the 3-dimensional virtual worlds. For example, the content may include a link to the 3-dimensional representation (such as a "vww://" protocol link). The content may further include a link to software, such as a desktop application, mobile device application, browser plugin, and so on, enabling the client computer to view 3-dimensional content.

Information in the 2-dimensional content may further allow for automatic access to 3-dimensional content. For example, a link to the 3-dimensional representation may be included in a <META> tag, a Javascript or other refresh command, or the like. The client computer's browser may be configured to recognize such links and automatically execute an appropriate virtual worlds browser to access the linked location. In an embodiment, the browser may display the 3-dimensional content internally within its windowing system, so that a user is able to flip back and forth between the 2-dimensional and 3-dimensional content.

The 2-dimensional content may further include interactive features enabling the user to interact with the virtual worlds without having to view them directly. For example, the 2-dimensional content may include a chat function, enabling the user to communicate with others within the virtual world. In such an embodiment, communications spoken or otherwise made within the virtual world may be translated to text in the chat function so as to be viewable by the user accessing 2-dimensional content, and text entered into the chat function may be spoken or otherwise presented in the 3-dimensional representation of the world, to other avatars. In an embodiment, the 2-dimensional representation includes audio communication, such as Voice-over-IP, enabling further communication with avatars in the 3-dimensional representation.

Additionally, a user accessing the 2-dimensional representation may be represented by an avatar in the 3-dimensional representation, so that the user is visible to other avatars. Often the user accessing the 2-dimensional representation will have limited access or functionalities, such as not being able to move or communicate as easily. To indicate this, in an embodiment, the user accessing the 2-dimensional representation may be indicated as a special avatar, such as a glowing sphere, distinguishable from other avatars (who may be represented, for example, like human figures). In one embodiment, the representation of the avatar tracks the limitations of the user operating the avatar, such as by making an avatar using a 2D browser appear flat rather than rendered in 3D.

Both the 2-dimensional representation and the 3-dimensional representation may, in various embodiments, be configurable to meet user preferences. For example, a view preference may indicate a particular 2-dimensional representation desired by the user, such as an overhead representation, a representation from a particular vantage point in the scene, or the like. Other preferences may determine the language, size, appearance, verbosity, and other information presented therein. The preferences may be indicated by the user and stored in association with a user account, a cookie on the user's browser, and the like. The preferences may additionally or alternatively be determined by the service provider, for example based on default preferences and/or preferences relating to similar users such as geographically similar users, friends of the user, users with the same language, and the like.

The 2-dimensional content, as described above, may be received by the user at block 1905. As described above, the content may optionally include certain tags and/or data enabling automatic transitions to the 3-dimensional content, and the user's browser or other software may be configured to detect these tags and/or data, for example through a browser plugin. At block 1911, the browser plugin or other software detects such tags and/or data, and invokes the virtual world client, identifying the appropriate URL or other identifier to be accessed by the virtual world client. In response, the virtual world client initiates a second request to the service provider at block 1901.

If, at block 1903, the entrypoint determines that 3-dimensional content is to be served to the user, then at block 1906 the service provider creates and/or selects an instance host and/or instance of the requested scene, to service the user. The instance host and/or instance may be selected based on factors applied by the entrypoint as described above, such as load balancing, avatar capacity of instances, requests for a particular instance in the URL, and the like. The service provider may determine that a new instance is to be created, in which case it may start up a new instance host as necessary. In some embodiments, only one instance host may be used for a particular scene, in which case the instance host need not be selected.

When the appropriate instance host is identified, then at block 1907 the user is directed to access the instance host. In an embodiment, the entrypoint sends a redirection message to the user, identifying the location of the instance host to be accessed, such as through a second URL. The URL may be coded as a one-time URL or otherwise made accessible only to that user, for example through session identifiers stored in cookies, so that the user or other users are prevented from bypassing the entrypoint and directly accessing the instance host later. The entrypoint may alternately act as a proxy and direct network traffic between the user and the instance host, so that the user need not be aware of the particular instance host being accessed or even be able to access the instance host directly.

At block 1908, the user receives the direction to access the instance host, and at block 1909, the user contacts the instance host. The instance host responds, at block 1910, by enabling the user to interact with the instance of the scene. In an embodiment, for further security precautions, the instance host confers with the entrypoint or service provider database to confirm that the user is authorized to interact with the particular instance.

Object Cleanup

As described above, a virtual world may include multiple instances of a scene, with each instance including objects and other characteristics based on an initial layout of the scene. As avatars interact with the instances, those objects and characteristics may be modified, for example by being moved, taken, destroyed, altered, added, or otherwise manipulated. As a result, an avatar may enter a first instance of a scene and then enter a second instance of the same scene, leading to a potentially disconcerting appearance that the same "scene" has drastically changed. Furthermore, in some embodiments, instances of scenes may be overlaid through semitransparent displays or other mechanisms, for example so that an avatar in one instance of a scene may see all the avatars in other instances simultaneously. If there are substantial differences between the objects of the scene, then the discrepancies may be visible to avatars and may detract from their experiences.

For example, it may be desired that certain actions occur when avatars leave a region. For example, it may be desired for a coffee shop scene to be cleaned up when all the avatars have left (or all the avatars other than the shop staff have left). Then, the region may revert (in whole or in part, depending on the instructions each object has or the instructions the objects inherit from other objects or the region) to a "clean," previously held, or other state. In one application, this might be similar to having a cleaning crew instantly clean a club once the club's last patron has departed. Optionally, the reversion action may be manually triggered by the proprietor. Optionally, such a manual trigger may be operational only when certain conditions (such as the absence of any avatars other than those in certain categories, like owner of the facility) are met. Such limitations may serve to prevent the virtual space from disruptively being altered while users are still present.

Accordingly, in an embodiment, instances of scenes include functionality to automatically "clean up" objects and other characteristics to correspond with the original layout of the scene. The cleanup procedures may be configured, as described below, to appear natural or minimize the visibility of the procedures, so that the cleanup procedures do not appear abnormal within the virtual reality environment.

Figure 20:
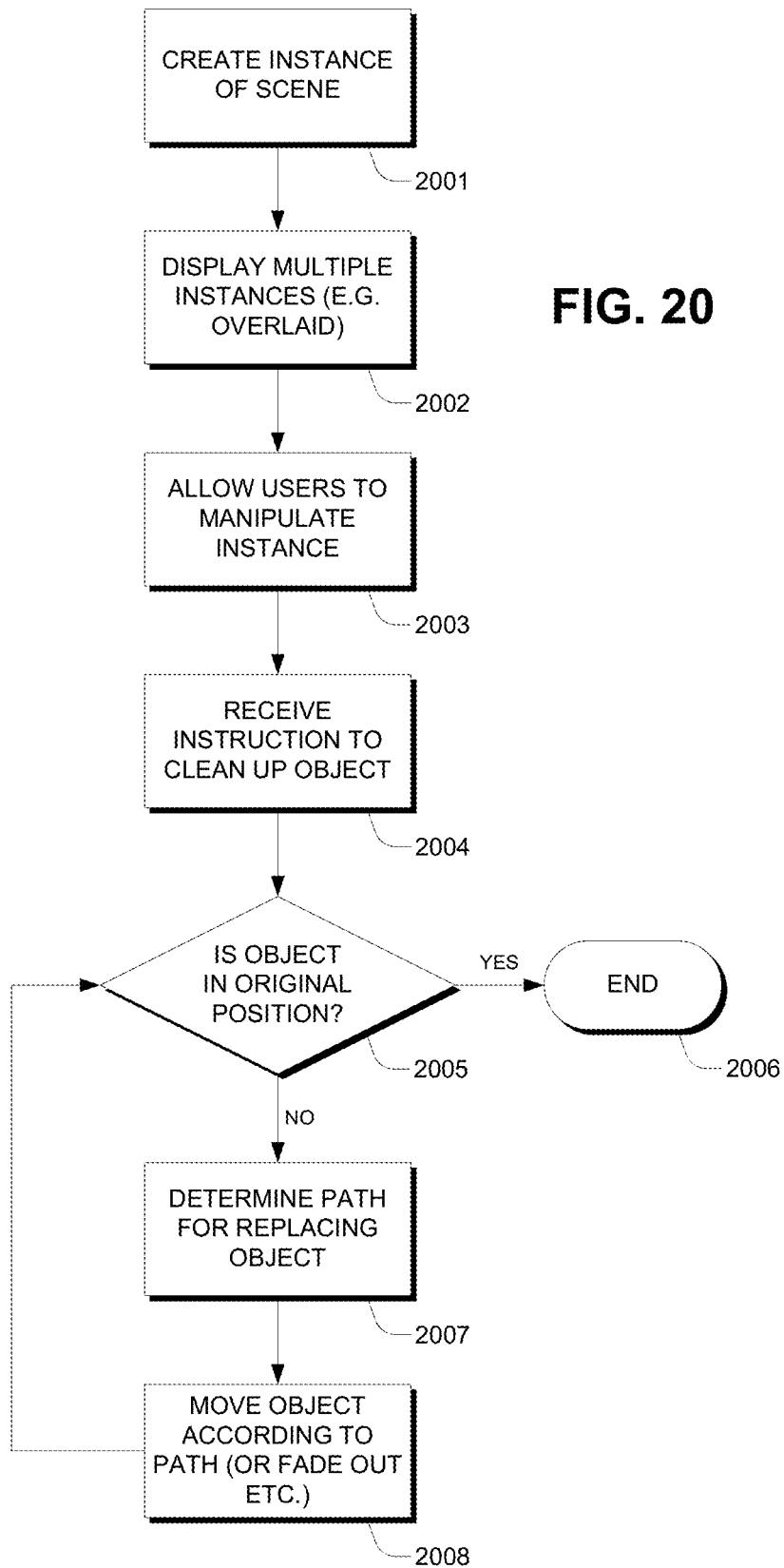
FIG. 20 is a flowchart of a process of cleaning up an instance of a scene.

FIG. 20 is a flowchart of a process of cleaning up an instance of a scene. The process may be performed, for example, by service provider 1801 of FIG. 18, such as by an instance host 1803. In various embodiments, additional blocks may be included, some blocks may be removed, and/or blocks may be connected or arranged differently from what is shown.

At block 2001, an instance of a scene is created within a service provider. Multiple instances may be created, and they may be displayed at block 2002. As explained above, the instances may be graphically overlaid in 2-dimensional and/or 3-dimensional representations, through partial transparency for example. Users may then manipulate instances at block 2003, by adding, altering, and/or removing objects or other characteristics within each instance. Accordingly, the instances may have substantial differences from the original layout of the scene.

At block 2004, an instruction to clean up one or more objects or other characteristics in an instance is received. The particular cleanup routines may be defined by the service provider, virtual world, and/or scene. Some scenes may find some or all discrepancies between instances to be acceptable, in which case no cleanup would be required. Furthermore, the timing of the instruction at block 2004 may be based on the status of the instance. In an embodiment, the instruction is sent when a defined minimum of avatars (such as zero avatars) are present in the scene, so that cleanup activities are less noticeable.

Upon receiving the instruction at block 2004, the system determines whether the object to be cleaned up is in its original position and/or other state at block 2005. If the object is in its original position and state, then the system proceeds to block 2006 and ends the cleanup procedure for that object. It may then proceed to cleanup another object or characteristic. Additionally, a degree of variation may be acceptable for an object in a scene, so that the determination at block 2005 may be whether the object is in an acceptable position and/or state.

If the system determines that the object is not in an acceptable position at block 2005, then at block 2007, the system determines a path for replacing the object and/or reinstating its original condition. The object may be placed into its original position, added, altered and/or removed. The path may include a direction to move the object, an alteration to the object's appearance, a fade-in or fade-out of the object, and the like. In one implementation, the "acceptable position" may be determined as an average position of the similar object in a plurality of other representations of the same environment.

The path may further include an actor to cause the change. The object may make the alteration automatically. For example, a plant that needs to be moved across the floor may be picked up and moved by an avatar or it may slide across the floor on its own. In the case of automatic alterations, the change may be made gradual, so that it is not easily noticeable to observers. Additionally or alternately, a non-player character, such as a bot, may be introduced to effect the desired change. For example, in a virtual restaurant scene, chairs and/or tables may be moved, and the cleanup procedure may include waiters, operated by automated scripts and/or programs, who replace the chairs and/or tables to their desired locations.

The selected path for replacing objects may be based on the conditions of the instance as well. For example, where the instance is crowded with avatars, the cleanup routine may be more gradual, whereas when the instance is empty, the cleanup may be faster. Additionally, the route along which the replacement occurs may be selected based on where avatars and/or other elements are located within the instance. To calculate this path, algorithms such as Dijkstra's algorithm may be employed.

At block 2008, the object is moved and/or altered in accordance with the path determined at block 2007. If further alterations are to be performed, then the process returns to block 2005 to continue adjustments until the desired state is reached.

Figure 21:
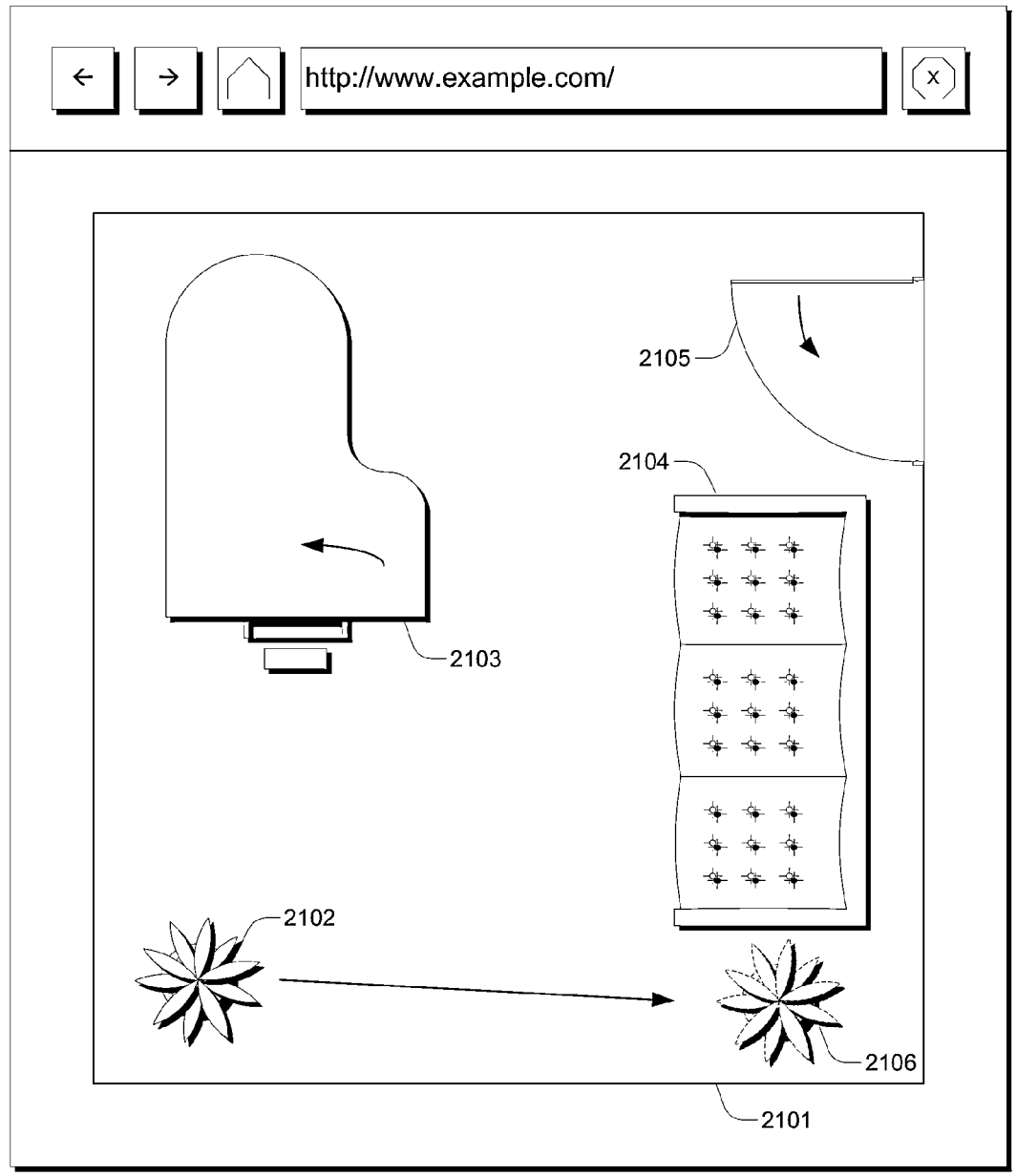
FIG. 21 is a sample user interface depicting an instance of a scene to be cleaned up, as used in an embodiment.

FIG. 21 is a sample user interface depicting an instance of a scene to be cleaned up, as used in an embodiment. The user interface may be operated in a virtual world browser, such that a 3-dimensional representation may be shown rather than the 2-dimensional overhead view of FIG. 21.

The graphical representation of the scene 2101 may include various elements such as plant 2102, piano 2103, sofa 2104, and/or door 2105. In accordance with cleanup procedures, changes may be made to these objects. For example, plant 2102 may be restored to location 2106. It may be automatically slid across the floor (e.g., slowly over a period of several minutes or even hours), faded out and faded into its original location, and/or carried to its original position by a non-player character such as a virtual butler or maid. The lid of piano 2103 may additionally be raised, and door 2105 may be closed. The timing of these changes may be based on aspects of the scene and/or instance, such as the number of avatars present, the time of day, the load on the instance host and/or service provider, and the like.

Object Clouds

A virtual world may include a vast amount of information, and avatars considering which world to visit may desire a summary of that information to make that decision and/or for other reasons. In non-virtual worlds situations such as HTML content, structures such as tag clouds may be used to summarize information.

Thus, in an embodiment, an object cloud may be presented to avatars, to summarize the information relating to a virtual world, scene, and/or instance. The object cloud may represent various characteristics of the world, scene, and/or instance, and utilize the 3-dimensional capabilities of the virtual world system to effectively present the information.

Although the embodiments described herein relate to information in a virtual world system, the object cloud embodiments described herein need not be so limited. For example, augmented reality systems may superimpose object clouds onto the real world, such as through head-mounted displays. Thus, real-world data may be used to construct object clouds, in addition or alternatively to virtual world data.

Object clouds may be displayed at various locations within the virtual world system. For example, avatars may view object clouds while in transit between virtual worlds. Object clouds for a location may be presented on virtual trains or buses headed to that location. Virtual travel agencies may display object clouds of different locations, as advertisements for those locations. Additionally, object clouds may be represented in 2-dimensional views, so that users without browsers capable of rendering 3-dimensional views are able to obtain similar information. Object clouds may also display information about individuals: an avatar may view an object cloud of all of the avatar's possessions and/or another avatar's possessions, for example. Such object clouds may be useful in playing role-playing games, so that the avatar may quickly determine what items are available to the avatar.

Indeed, object clouds may be implemented within the two dimensional web. Rather than utilizing a word cloud, stock or other photography may be substituted for the words, but the relative size and placement of a traditional word cloud may be retained, simply substituting the images for some or all of the words. In addition to traditional word cloud elements, image transparency may also be employed to represent the importance of an image to the data being summarized.

Figure 22:
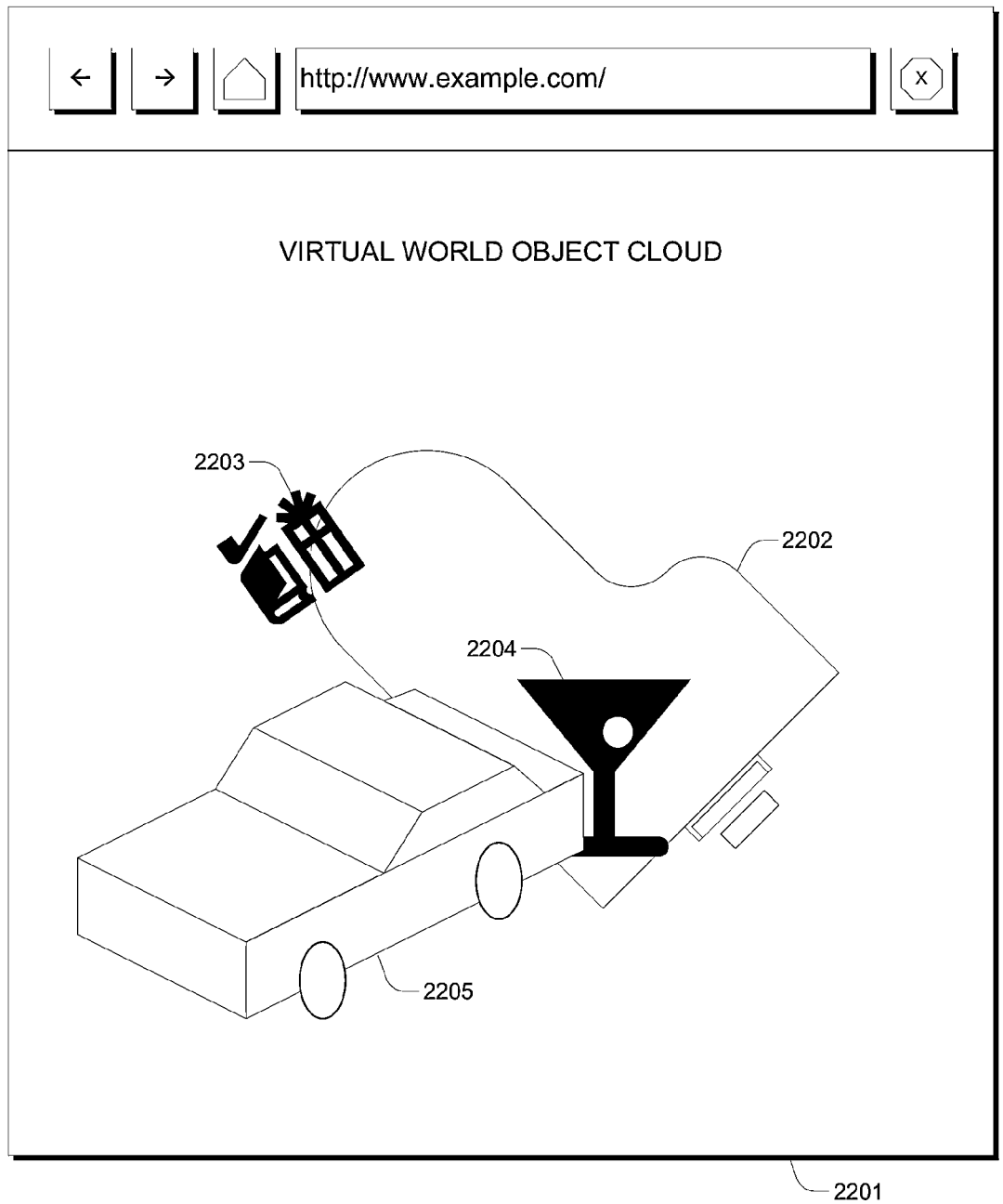
FIG. 22 is a sample user interface displaying a virtual world object cloud, as used in an embodiment.

FIG. 22 is a sample user interface displaying a virtual world object cloud, as used in an embodiment. The interface may be presented on a virtual world browser and be based on data provided by a service provider entrypoint and/or instance host, for example. Although the representation in FIG. 22 is in two dimensions, in various embodiments 3-dimensional representations may be employed, which may have particular advantages as described below.

Object cloud display 2201 includes several figures, such as piano 2202, shopping icons 2203, cocktail icon 2204, and/or car icon 2205. These icons may represent information relating to a particular virtual world, scene, and/or instance. For example, the object cloud may indicate that, at a certain virtual location, current events include piano music, shopping, drinking, and car racing. The object cloud may indicate current information, past information future information, and/or any other information, and the particular information displayed may be based on user selection.

The presentation of the object cloud may further convey information about each of the displayed items, further enhancing the information capacity of the object cloud. For example, the size of items in the object cloud may indicate the related event's popularity, attendance, size, and/or other attributes. In object cloud display 2201, the smaller shopping icon 2203 may indicate that shopping is a less popular activity at the particular location in the virtual world, while piano music is a more popular option, as indicated by the large piano icon 2202. Other aspects of the display, such as the position of objects in the cloud, may provide further information. For example, the car icon 2205 is placed closer to the viewing avatar while the piano icon 2202 is placed further from the avatar, which may indicate that car racing is nearer in distance to the avatar's current location. Size and/or location may be used to convey other information such as time of events, duration of events, cost, interest and/or popularity, for example. Other dimensions of the cloud, such as height, horizontal spread, motion, rotation, and the like may further indicate information.

Figure 23:
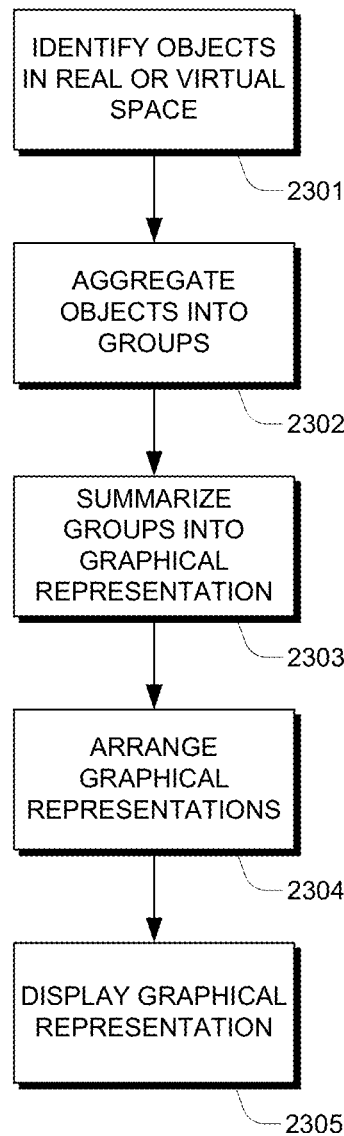
FIG. 23 is a flowchart of a process of constructing an object cloud, as used in an embodiment.

FIG. 23 is a flowchart of a process of constructing an object cloud, as used in an embodiment. The process may be performed, for example, by service provider system 1801 of FIG. 18, and it may construct an object cloud such as that shown in FIG. 22. In various embodiments, additional blocks may be included, some blocks may be removed, and/or blocks may be connected or arranged differently from what is shown.

At block 2301, the system identifies objects in, and/or other characteristics of, a real or virtual space. The rules for the determination may be based on a selection by the user requesting the object cloud, and the rules may include the location of the identified objects and characteristics, the types of objects and characteristics to be identified, the types of aggregations to perform, and the like. Other items may be identified, such as events, spaces, avatars, products, services, and the like.

At block 2302, the identified objects may be aggregated into groups. The aggregation enables the object cloud to act as a summary for a large number of objects and/or characteristics. The aggregations may be based on metadata and/or information about the relevant objects and/or characteristics, such as properties, tags, attributes, and the like. The aggregation process of block 2302 may further identify information to be used in constructing the object cloud. For example, where events are identified at block 2301, the popularity and/or attendance at the events may be identified at block 2302.

At block 2303, the groups identified at block 2302 are summarized into graphical representations. This may include mapping the groups onto icons, graphics, and the like. The mapping may be based on a stored map of groups to icons within the service provider database. The mapping may be specific to service providers, worlds, scenes, and/or instances.

At block 2304, the graphical representations are arranged into a cloud. The arrangement procedure may determine aspects such as the position, size, movement, rotation, and the like, for the various graphical representations. This determination of aspects may be based, for example, on the attributes identified at block 2302, as well as other information.

When the graphical representations have been arranged into a cloud, then at block 2305 the constructed object cloud is displayed and/or transmitted to the user for display. The displaying process may include rendering a 3-dimensional representation of the cloud into two dimensions, in the case that the user is viewing the object cloud on a 2-dimensional-capable viewer. In alternate embodiments, the object cloud may be reduced to textual, audio, video, and/or other representations, for example to enable alternate displays and/or to allow for search engine indexing of the object cloud.

Computing System

Figure 24:
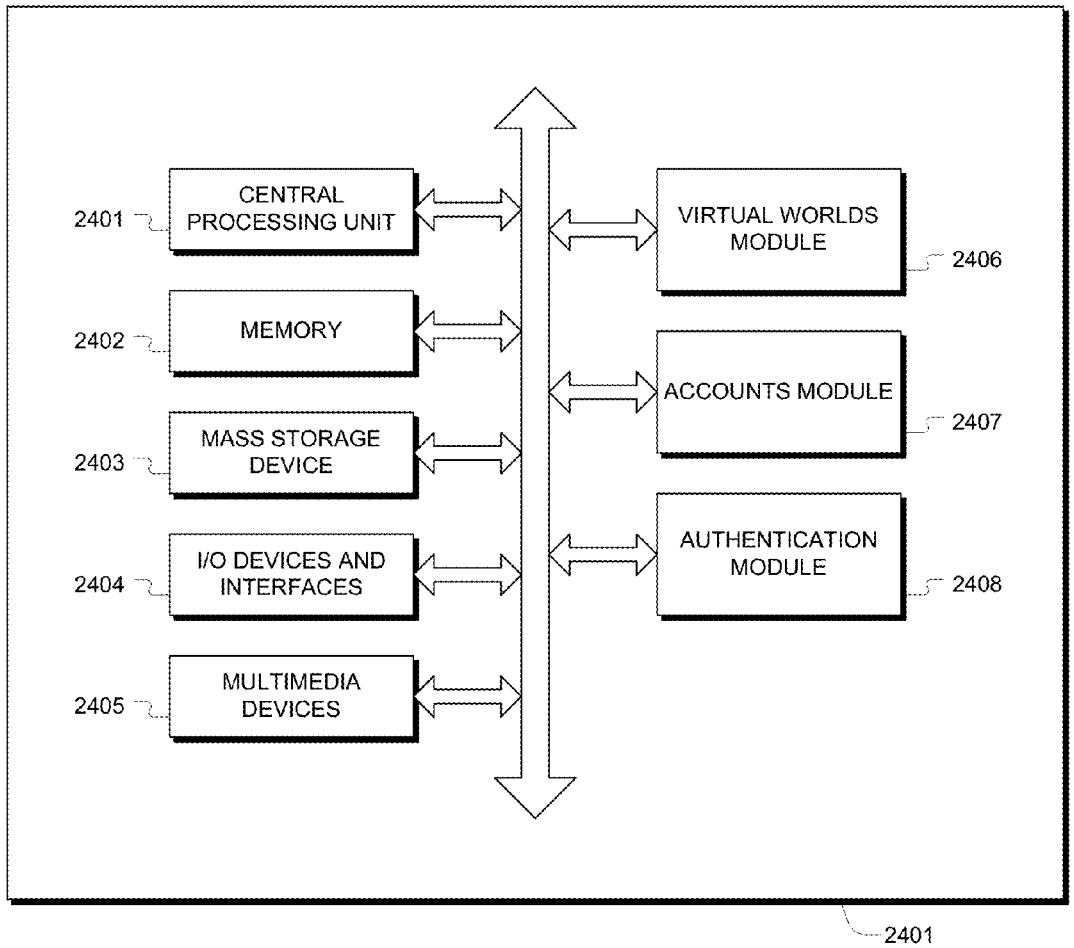
FIG. 24 is a block diagram of a computing system as used in an embodiment.

FIG. 24 is a block diagram of a computing system as used in an embodiment. In various embodiments, additional blocks may be included, some blocks may be removed, and/or blocks may be connected or arranged differently from what is shown.

The computing system of FIG. 24 may be, for example, a service provider, a root server, a virtual worlds server, an entrypoint, an instance host, and/or another computing system. Computing system 2401 may be one or more computing devices, including computer hardware. Computing system 2401 may further include one or more modules which may be implemented as executable instructions in software and/or hardware such as circuitry. Computing system 2401 may further include data storage systems such as hard disks, read only memory, random access memory, flash memory, removable storage media, and the like.

The computing system 2401 may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Windows® 7, Palm Pilot OS, Apple® MacOS®, Disk Operating System (DOS), UNIX, IRIX, Solaris, SunOS, FreeBSD, Linux®, or IBM® OS/2® operating systems. In other embodiments, the computing system 2401 may be controlled by a proprietary operating system. Conventional operating systems control and schedule computer processes for execution, perform memory management, provide file system, networking, I/O services, and provide a user interface, such as a graphical user interface ("GUI"), among other things.

The computing system 2401 may include one or more central processing units ("CPU") 2401, which may each include one or more conventional or proprietary microprocessor(s). The computing system 2401 may further include one or more memories 2402, such as random access memory ("RAM"), for temporary storage of information, read only memory ("ROM") for permanent storage of information, and/or a mass storage device 2403, such as a hard drive, diskette, or optical media storage device. The memory 2402 may store software code, or instructions, for execution by the processor 2401 in order to cause the computing device to perform certain operations, such as gathering sensor-related data, processing the data with statistical and/or predictive models, formatting data for user devices or other presentation, transmitting data, or other operations described or used herein.

The methods described and claimed herein may be performed by any suitable computing device, such as the computing system 2401. The methods may be executed on such suitable computing devices in response to execution of software instructions or other executable code read from a tangible computer readable medium or computer storage device. A computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

The computing system 2401 may include one or more input/output (I/O) devices and interfaces 2404, such as a keyboard, trackball, mouse, drawing tablet, joystick, game controller, touchscreen (e.g., capacitive or resistive touchscreen), touchpad, accelerometer, and/or printer, for example. The computing system 2401 may also include one or more multimedia devices 2405, such as a display device (also referred to herein as a display screen), which may also be one of the I/O devices 2404 in the case of a touchscreen, for example. Display devices may include LCD, OLED, or other thin screen display surfaces, a monitor, television, projector, or any other device that visually depicts user interfaces and data to viewers. The computing system 2401 may also include one or more multimedia devices, such as speakers, video cards, graphics accelerators, and microphones, for example.

In one embodiment, the I/O devices and interfaces 2404 provide a communication interface to various external devices via a network such as network 103 of FIG. 1. For example, the computing system 2401 may be electronically coupled to the network 103 via a wired, wireless, or combination of wired and wireless, communication link(s). The network 103 may allow communication with various other computing devices and/or other electronic devices via wired or wireless communication links.

Computing system 2401 may also include one or more modules which may be implemented as hardware or software including executable instructions. In an embodiment, computing system 2401 includes virtual worlds module 2406, accounts module 2407, and authentication module 2408. In various embodiments, additional modules may be included and/or any subset of these modules may be included. In various embodiments, one or more of virtual worlds module 2406, accounts module 2407, and authentication module 2408 may be housed on separate computing devices connected via a network or other communications system. In an embodiment, each of the modules is housed on a separate computing device thereby enabling different security settings to be implemented for each of the modules. The modules perform various processes and operations as described throughout the specification.

Multilayer Component and Interface System

Figure 25:
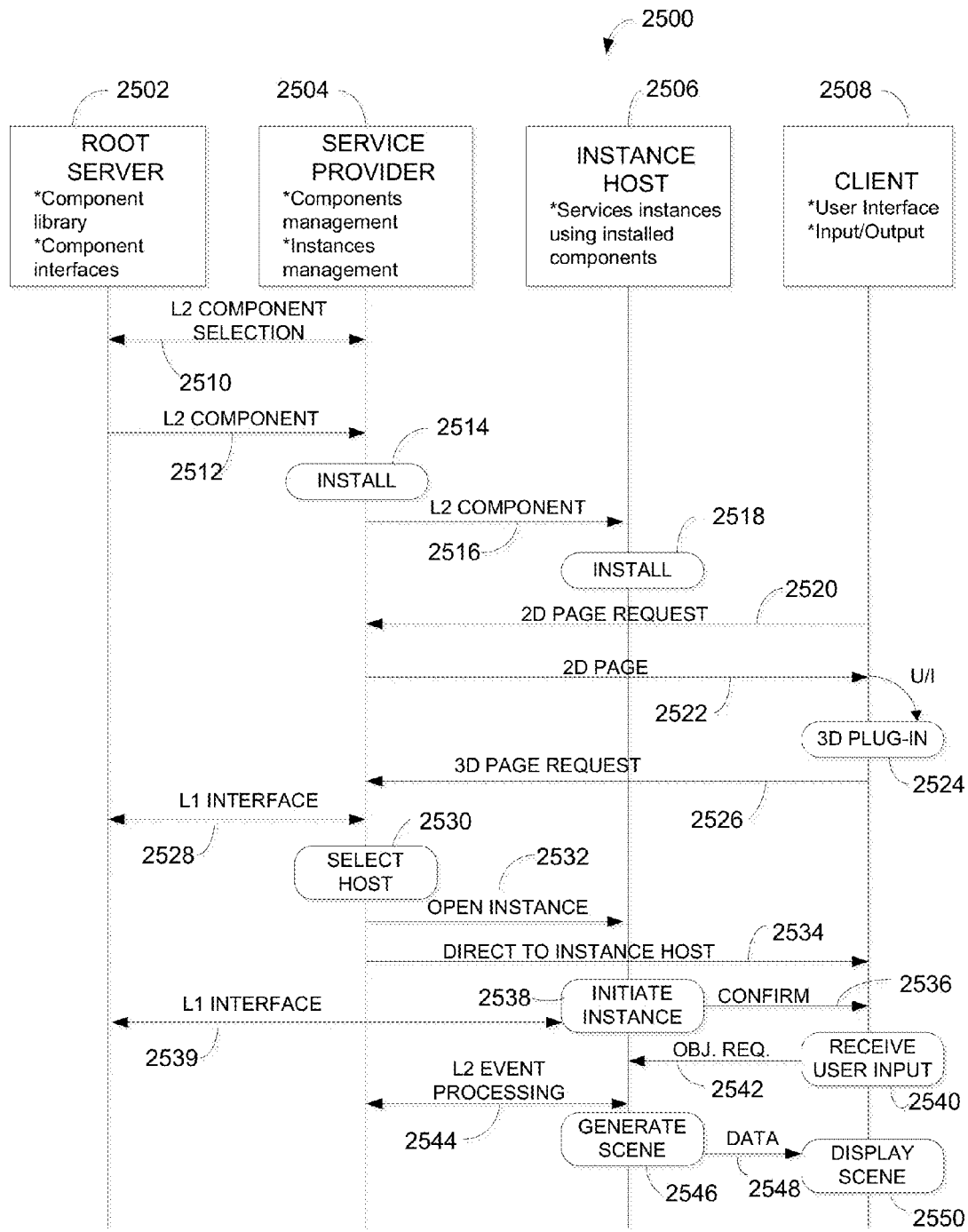
FIG. 25 illustrates an example of a call flow, implementing a multilayer component and interface system.

Aspects of the present technology may be conceptualized as arranged in a system of distinct layers of components and interfaces. Referring to FIG. 25, each layer within the system offers components and interfaces that may be imported and/or exported to a service provider 2504 and/or instance host 2506. A first layer ("Layer 1", "L1", "Layer 1 interface" or "L1 interface") refers to generic or high-level components or workflow interfaces used to service operations of the virtual world system, and may be analogized to an operating system for a computer. A second layer ("Layer 1", "L1", "Layer 2 component", or "L2 component") controls instantiation of specific components, i.e. three-dimensional scenes and objects in the virtual world system, by exporting one or more interfaces from the Layer 1 interface. The layer 2 component may be implemented as a plug-in based on a Managed Extensibility Framework (MEF), for example. A third layer ("Layer 3" or "L3") may be used to refer to specific instances of the virtual world system wherein one or more clients 2508 participate and control events and objects inside a modeled three-dimensional scene.

Layer 1 can include functions which define, create, and maintain entities, spaces, abilities, permissions, components and other objects of a virtual world system. For example, L1 may provide the following types of exported interfaces:

IComponentSystem—Allows components to obtain information about other installed components.

IPermissionSystem—Allows components to define permissions, create permissions, assign permission to entities, and determine whether permissions are available for various objects in the context of various clients IAbilitySystem—Allows components to define abilities, assign abilities to entities, and determine whether abilities are available for various objects in the context of various clients.

IEntitySystem—Allows components to create entities and interface with entities. Personas, social groups, avatars, etc. may be created in this type of interface.

IWorldspaceSystem—Allows components to create and interface with objects in world space, e.g. worlds, scenes, instances, etc.

IChatSystem—Allows components to create chat channels, add users to chat channels, send messages to chat channels, and manipulate other aspects of chat channels.

IRelationshipSystem—Allows components to define and manage social relationships among entities. For example friendships, social groups, etc., may be created.

Object Management System—Allows components to define and create object types, i.e. objects that could exist within a world or scene, and object templates, i.e. objects that have been created and objects which are stored in locations within a world or scene.

Layer 2 uses the instance host(s) and service provider to import and/or export interfaces from/to Layer 1. The instance hosts and service provider, therefore, may act as a Server Application Program Interface ("API"), which determines how Layer 2 can interact with Layer 1. L2 components may, therefore, be used export interfaces which have been imported into L1. L2 components may also be used to "fire" or initiate events during various processes within a virtual world. These events include, but are not limited to abilities, permissions, and other types of notifications within a virtual world.

Layer 1 may also be considered to be a series of workflow interfaces, wherein each workflow interface represents a task the layered system infrastructure is capable of carrying out. Workflow interfaces may include, but are not limited to: a "Login workflow", a "Navigate workflow" for browsing to a URL, a "Reconnect workflow", a "Create World" interface, and "Create Persona" interface. These types of workflows interfaces have one or more connection or hook points where L2 can fire or initiate an event and extend the behavior of the event. An L2 component may, for example, become involved with a particular L1 workflow interface by exporting the appropriate interface from L1. When L2 fires or initiates an event at a hook point in a workflow interface, L1 will enumerate interested components. Interested components are those that match the workflow interface. L1 will also call enumerated components and pass a context for the workflow interface, where the context includes information, which the L2 component may be able to utilize.

An L2 component may export the following types of interfaces:

ILoginWorkflow—an interface having methods the server can call during a user login workflow INavigateWorkflow—an interface that handles attempts to navigate to a given Virtual World Web (VWW) URL.

IAbilityWorkflow—an interface that notifies a component that an ability is in use by another user or client.

IProviderLifetimeEvents—an interface a service provider can call during installation, uninstallation, or upgrade(s) of an L2 component.

IHostLifetimeEvents—an interface an instance host can call during start up and shut down of the system, allowing a component to initialize.

The layered system components and interfaces described and listed above are not to be construed as limiting. Additional components and interfaces may be derived based upon a combination of one or more of the components and interfaces previously described.

Call Flow Illustrating Operation of Multilayer Component and Interface System

FIG. 25 illustrates an example of a call flow, implementing a multilayer component and interface system, which involves a root server 2502, a service provider 2504, an instance host 2506, and a client 2508. A root server 2502 may serve a component library and component interfaces, and may be coupled to a database server (not shown). A database server may include definitions for personas and objects, for example. A root server 2504 may also provide general services across one or more service providers 2504. These types of services may include user login/logout services, user accounting services, accounting of real and/or virtual currency, and the like. The communications transmitted and received during use of these services may be encrypted and/or authenticated to ensure that unauthorized users may not obtain information from the root server 2504.

The service provider 2504 may also include or couple to the database, which provides definitions for persons and objects. However, a service provider will also manage components and instances within a virtual world system. L2 component selection 2510, therefore, may occur at both the root server 2502 and the service provider 2504.

An L2 component may be installed 2514 at the service provider 2504 and installed 2518 at the instance host 2506. An instance host 2506 services instances, using installed components. In so doing, an instance host can represent all of the content that is serviced by the service provider, i.e. information regarding world space and objects in a three-dimensional scene.

The client 2508 may operate a user interface for instances of a three-dimensional scene hosted by the instance host 2506. The client may also include input/output devices, for example input devices such as keyboards or key pad, touchscreen, camera, and/or microphone, and output devices such as display devices and audio systems. The client 2508 may include other components, for example a browser that may be linked to the user interface so as to enable seamless transitions between two-dimensional (2D) web content and three-dimensional (3D) virtual world scenes.

As illustrated at 2510, a service provider in the process of configuring a virtual world may select a set of components as needed to support the desired functions of the virtual world. The root server 2502 may maintain a library of all components that are available for supporting virtual world operations, from which the service provider may select appropriate components. The service provider 2504 may receive each selected L2 component and install 2514 the L2 component local for servicing events occurring in virtual world instances. In addition, as shown at 2516, the service provider 2504 may provide a copy of the L2 component to the instance host 2506, which may similarly install 2518 the L2 component. The foregoing operations may be performed as part of operations for setting up a virtual world, and setting up specific instances of the virtual world on the instance hosts.

A client 2508 operating a 2D web browser may, in response to receiving user input from an input device, initiate a 2D page request to the service provider 2504, for example using an HTTP GET request. In response, the service provider 2504 may transmit the requested 2D page to the client 2508, which may output the page using a display device and browser interface. A web browser operating on the client may include a 3D plug-in component 2524 that can be selectively activated in response to user input (U/I) to the client 2508. For example, a user may select a "button" or similar interactive object to activate the 3D plug-in.

Once activated, the 3D plug-in may transmit a 3D page request 2526 to the service provider 2504. The 3D page request may contain an instruction or message signifying that the client is seeking access to a 3D virtual world scene corresponding to the 2D page. In response to receiving the 3D page request, the service provider 2504 may communicate with the root server 2502 using the L1 interface, as shown at 2528. L1 workflows at the root server may be used to handle generic operations such as authentication and user account management. For example, the L1 communications 2528 may be used to verify that a user identified with the client 2508 is authorized to access the 3D scene requested by the 3D page request, to track user requests for accounting or other purposes, and perform other general functions.

If the identified user is confirmed as authorized to access the 3D scene, the service provider may execute a process 2530 for selecting an instance host for an appropriate instance of the requested virtual world scene. If there is no currently available instance, the service provider may transmit a signal to a selected instance host 2506 to open (instantiate) an instance of the requested 3D scene, as shown at 2532. In addition, the service provider 2504 may transmit a message to the client 2508, directing the client to the instance that is (or will be) instantiated at the instance host 2506, as shown at 2534.

The instance host 2506 may, as shown at 2538, instantiate an instance of the virtual world scene, for example by executing one or more of the L2 components installed for servicing the virtual world. Such components may pull a collection of documents defining the scene from a database, and then execute one or more components that receive the document contents, and process the document contents to instantiate the scene. The instantiation may comprise a state machine generating a sequence of three-dimensional scene states, wherein objects in the scene are assigned properties and behaviors according to parameters and rules sets defined in the documents and/or negotiated between L2 components when objects interact. A process of instantiation may include communicating with the root server 2502 using the L1 interface to perform generic L1 functions as exemplified in the foregoing section. Optionally, the instance host may confirm availability of the instantiated scene to the client 2508, as indicated at 2536.

Once the instance of the 3D scene is instantiated, the client device 2508 may interact with the instance and cause events within the scene by receiving user input 2540 via an input device, and in response to the input, transmitting one or more object-related requests to the instance host, as indicated at 2542. Multiple additional clients (not shown) may similarly receive user input and interact with the scene. The instance host 2506 may receive and process messages from one or more clients using L2 components operating the instances. This may include, for example, L2 event processing 2544 in cooperation with corresponding L2 components operating on the service provider 2504. As previously noted, L2 components may also hook into and therefore trigger L1 workflows involving L1 interface communications (not shown) with the root server during instantiation of a 3D scene. In the alternative, or in addition, L2 components may handle events that do not include interfacing with any L1 workflow.

The instance host 2506 may generate data for viewing the 3D scene, as indicated at 2546. For example, the instance host 2506 may write the respective states of the scene at successive times of a time sequence to a computer memory, including at least position and orientation of three-dimensional objects modeled in the scene. The computer memory may cache a stream of time-related data from the instantiation, which the instance host may provide to the client 2508 as indicated at 2548. For example, the instance host 2506 may stream time-related data to the client 2508 using a streaming protocol. The client 2508 may receive the scene data and process the data using a user interface component to generate an animated 3D view of the scene, and output the view to the user via a display device. Accordingly, aspects of the flow 2500 comprise a state machine that receives data representing physical inputs from user input devices, maps those physical inputs to objects and events in a 3D model, and outputs the resulting 3D scene to a physical output device. Operations of the flow 2500, for example the instantiation represented at 2538, depend on physical inputs to provide physical outputs, and may not be ultimately functional or useful without such inputs and outputs.

Example Methodologies And Apparatus

Figure 26:
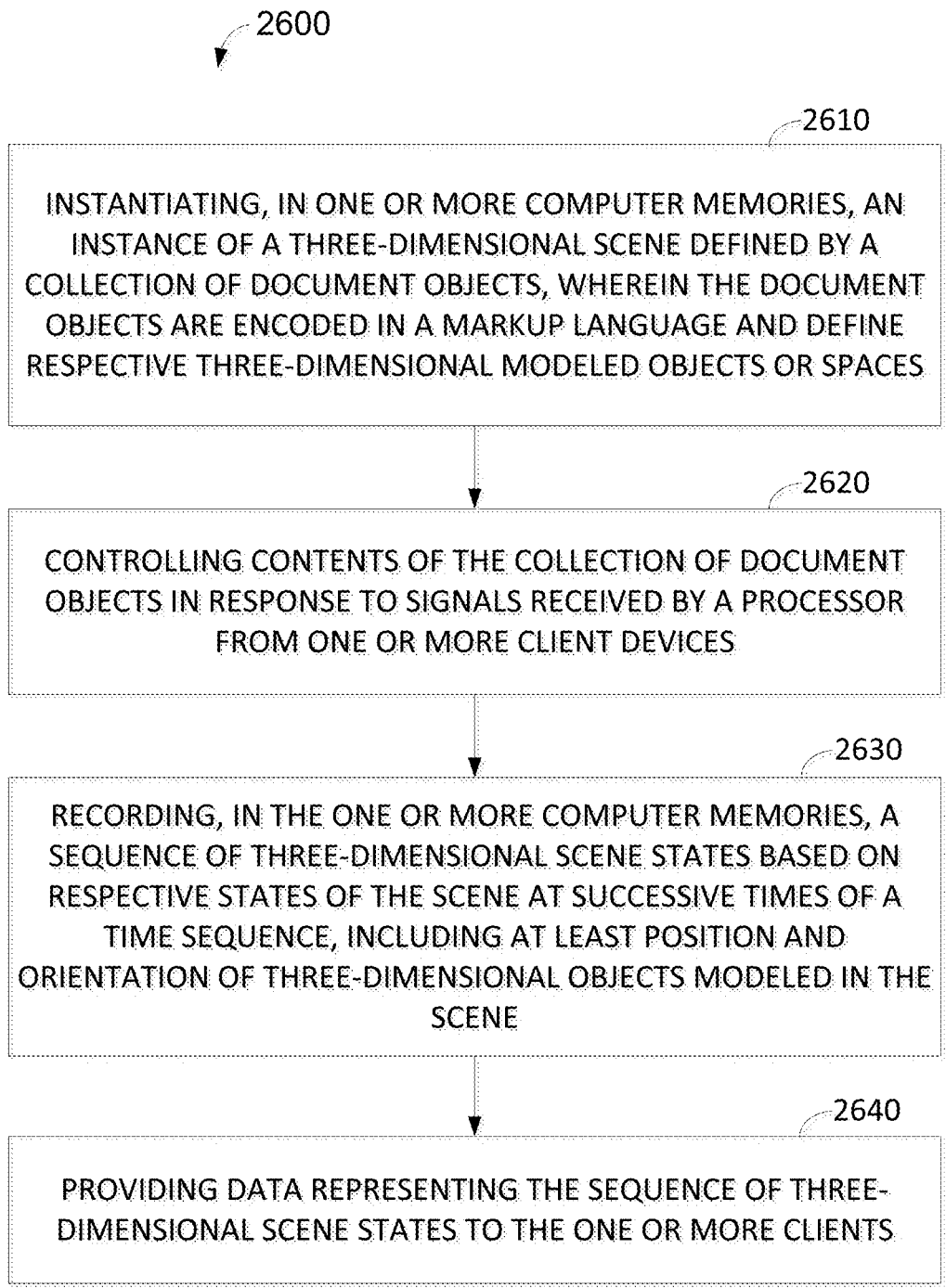
FIGS. 26-28 are flowcharts of various processes performed in an embodiment.

As shown in FIG. 26, a computer server system may perform a method 2600 for generating an instance of a three-dimensional scene, using aspects of a multilayer component and interface system, shown in FIG. 25. The method 2600 may include, at 2610, instantiating, in one or more computer memories, an instance of a three-dimensional scene defined by a collection of document objects, wherein the document objects are encoded in a markup language and defined by respective three-dimensional modeled objects or spaces. For example, an instance host may retrieve the collection of documents as identified by a service provider, and process the documents using one or more L2 components operating as a state machine.

The method 2600 may further include, at 2620, controlling contents of the collection of document objects in response to signals received by a processor from one or more client devices. For example, an instance server may add or remove documents from the collection in response to signals from client devices indicating that personas or owned objects should enter or leave the scene, or in response to events outcomes determined by L2 components in response to user input and a rule set for determining event outcomes.

The method 2600 may further include, at 2630, recording, in the one or more computer memories, a sequence of three-dimensional scene states based on respective states of the scene at successive times of a time sequence, including at least position and orientation of three-dimensional objects modeled in the scene. For example, the instance server may write a data stream to a memory cache.

The method may further include, at 2640, providing data representing the sequence of three-dimensional scene states to the one or more clients. For example, the instance server may stream the data to the one or more clients.

Figure 27:
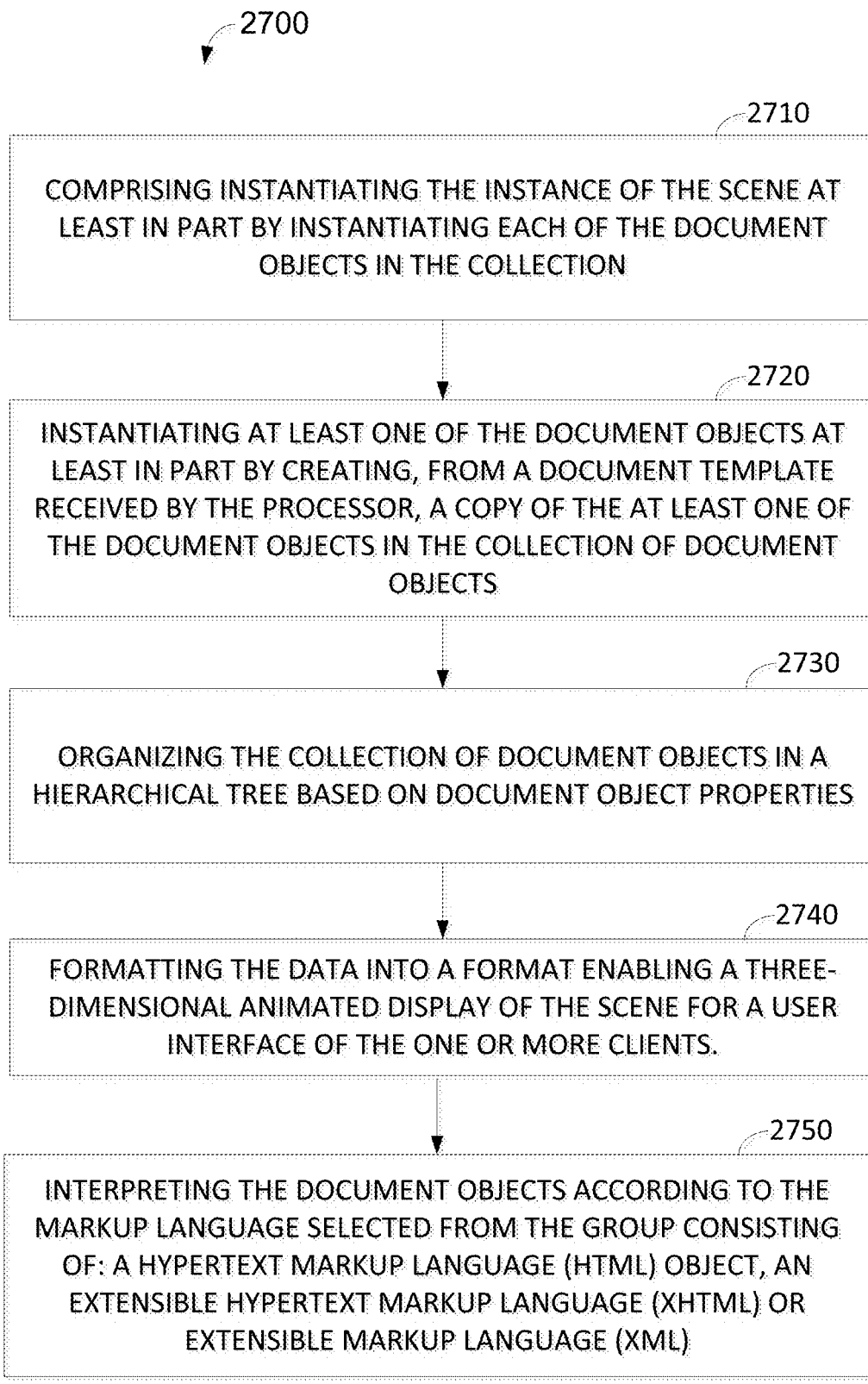
Figure 28:
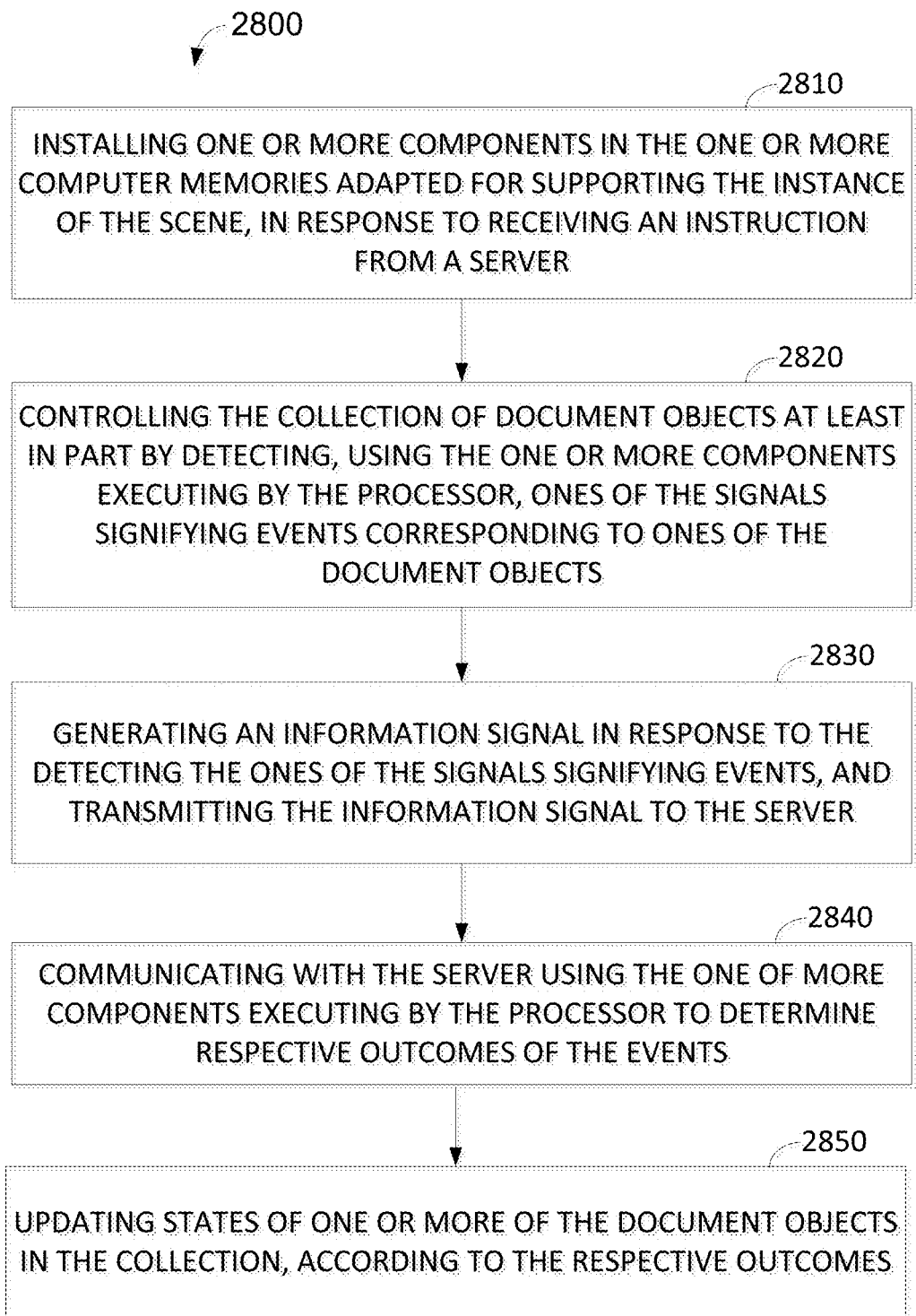

With reference to FIGS. 27-28, one or more of operations 2700 and 2800 may optionally be performed as part of method 2600. The elements 2700 and 2800 may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 2600 includes at least one of the operations 2700 and 2800, then the method 2600 may terminate after the at least one operation, without necessarily having to include any subsequent downstream operation(s) that may be illustrated.

In an aspect, with reference to FIG. 27, the method 2600 may further include additional operations 2700 for instantiating the instance of a scene. The additional operations may include, at 2710, instantiating the instance of the scene at least in part by instantiating each of the document in the collection. The method 2600 may further include, at 2720, instantiating at least one of the document objects at least in party by creating from a document template received by the processor, a copy of the at least one of the document object in the collection of document objects. The method 2600 may further include, at 2730, organizing a collection of document objects in a hierarchal tree based on document object properties. The method 2600 may further include, at 2740, formatting the data into a format enabling a three-dimensional animated display of the scene for a user interface of the one or more client.

In other aspects, with reference to FIG. 28, the method 2600 may further include additional operations 2800 relating to installation of additional components. The additional operations may include, at 2810, installing one or more components in the one or more computer memories, which are adapted for supporting the instance of the scene, in response to receiving an instruction from a server. In another aspect, the method 2600 may further include, at 2820, controlling the collection of the document objects at least in part by detecting, using the one or more components, executed by the processor, one of the signals which signify events that correspond to ones of the document objects. In addition, the method 2600 may further include, respectively at 2830, 2840 and 2850, generating an information signal in response to detecting the ones of the signal signifying events, and transmitting the information signal to the server, communicating with the server using the one or more components executed by the processor to determine respective outcomes of the events, and updating states of one or more of the document objects in the collection, according to the respective outcomes, and updating states of one or more of the document objects in the collection, according to the respective outcomes.

Figure 29:
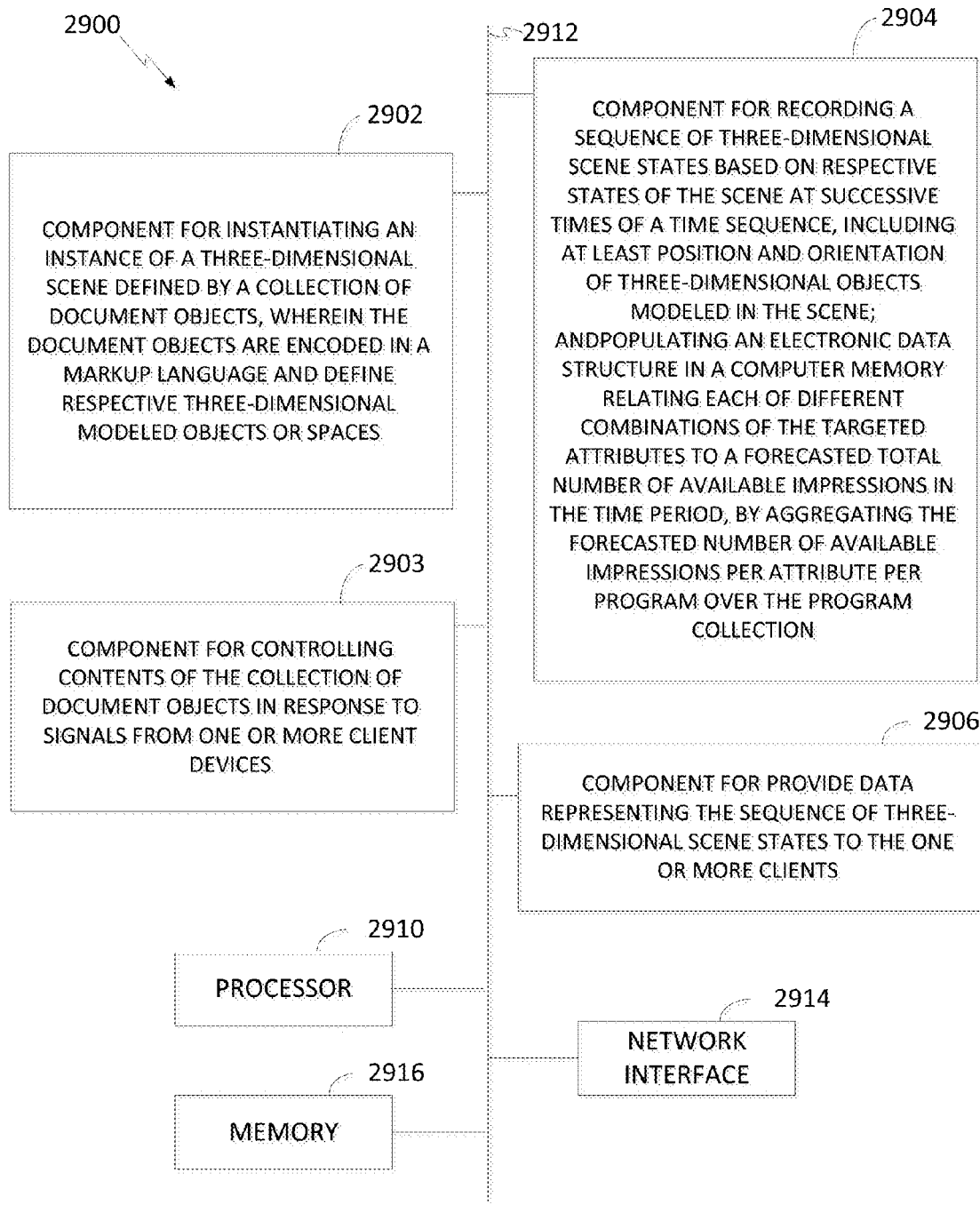
FIG. 29 provides an exemplary apparatus 2900 that may be configured as computer server, client device, or combination of client and server, for instantiating a three-dimensional scene.

With reference to FIG. 29, there is provided an exemplary apparatus 2900 that may be configured as computer server, client device, or combination of client and server, for instantiating a three-dimensional scene. The apparatus 2900 may include functional blocks that can represent functions implemented by a processor, software, or combination thereof (e.g., firmware).

As illustrated, in one embodiment, the apparatus 2900 may include an electrical component or module 2902 for instantiating an instance of a three-dimensional scene defined by a collection of document objects, wherein the document objects are encoded in a markup language and define respective three-dimensional modeled objects or spaces. For example, the electrical component or means 2902 may include at least one control processor 2910 coupled to a memory component 2916. The control processor may operate an algorithm, which may be held as program instructions in the memory component. The algorithm may include, for example, retrieving a document collection identified by a service provider, processing the collection to extract information defining a 3D scene, and maintaining a current scene state based on the information.

The apparatus 2900 may include an electrical component or module 2903 for controlling contents of the collection of document objects in response to signals from one or more client devices. For example, the electrical component or means 2903 may include at least one control processor 2910 coupled to a memory component 2916. The control processor may operate an algorithm, which may be held as program instructions in the memory component. The algorithm may include, for example, maintaining a current scene state in response to a message stream from one or more clients signifying requested operations for personas and objects included in the object collection. The algorithm may further include calculating a scene state using the inputs to detect events occurring in the scene and a rule set for determining event outcomes.

The apparatus 2900 may further include an electrical component or module 2904 for recording a sequence of three-dimensional scene states based on respective states of the scene at successive times of a time sequence, including at least position and orientation of three-dimensional objects modeled in the scene. For example, the electrical component or means 2904 may include at least one control processor 2910 coupled to a memory component 2916. The control processor may operate an algorithm, which may be held as program instructions in the memory component. The algorithm may include, for example, writing successive states to a cache memory to define a data stream.

The apparatus 2900 may further include an electrical component or module 2906 for providing data, representing the sequence of three-dimensional scene states to the one or more clients. For example, the electrical component or means 2906 may include at least one control processor 2910 coupled to a memory component 2916 to provide such data. The control processor may operate an algorithm, which may be held as program instructions in the memory component. The algorithm may include, for example, streaming a data stream to one or more clients. The apparatus 2900 may include similar electrical components for performing any or all of the additional operations 2700 and 2800 described in connection with FIGS. 27-28, which for illustrative simplicity are not shown in FIG. 29.

In related aspects, the apparatus 2900 may optionally include a processor component 2910 having at least one processor, in the case of the apparatus 2900 configured as a network entity. The processor 2910, in such case may be in operative communication with the components 2902-2906 or similar components via a bus 2912 or similar communication coupling. The processor 2910 may effect initiation and scheduling of the processes or functions performed by electrical components 2902-2906.

In further related aspects, the apparatus 2900 may include a network interface component 2914 enabling communication between a client and a server. The apparatus 2900 may optionally include a component for storing information, such as, for example, a memory device/component 2916. The computer readable medium or the memory component 2916 may be operatively coupled to the other components of the apparatus 2900 via the bus 2912 or the like. The memory component 2916 may be adapted to store computer readable instructions and data for implementing the processes and behavior of the components 2902-2906, and subcomponents thereof, or the processor 2910, or the methods disclosed herein. The memory component 2916 may retain instructions for executing functions associated with the components 2902-2906. While shown as being external to the memory 2916, it is to be understood that the components 2902-2906 can exist within the memory 2916.

Additional Embodiments

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and tasks described herein may be performed and fully automated by a computer system. The computer system may, in some cases, include multiple distinct computers or computing devices (for example, physical servers, workstations, storage arrays, and so forth) that electronically communicate and interoperate over a network to perform the described functions. Each such computing device typically includes a processor (or multiple processors) that executes program instructions or modules stored in a memory or other computer-readable storage medium. Where the system includes multiple computing devices, these devices may, but need not, be co-located. The results of the disclosed methods and tasks may be persistently stored by transforming physical storage devices, such as solid state memory chips and/or magnetic disks, into a different state.

All of the methods and processes described above may be embodied in, and fully automated via, software code modules executed by one or more general purpose computers. The code modules may be stored in any type of computer-readable medium or other computer storage device. Some or all of the methods may alternatively be embodied in specialized computer hardware. The results of the disclosed methods be stored in any type of computer data repository, such as relational databases and flat file systems that use magnetic disk storage and/or solid state RAM.

Many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method of operating executable scripts on a virtual worlds system to enable automation of actions on the virtual worlds system, the method comprising:
    maintaining, on computer-readable media, a data representation of a virtual space, the data representation including a hierarchical representation of objects within the virtual space, the hierarchical representation including an executable script associated with a first object within the hierarchical representation, the hierarchical representation including a plurality of nodes, one of the plurality of nodes including the first object, the hierarchical representation identifying a relationship between the plurality of nodes, wherein an executable script included in a first node having a higher position in the hierarchical representation is configured to alter a second node having a lower position in the hierarchical representation;
    executing the executable script on one or more computer processors in communication with the computer-readable media;
    enabling the executable script to modify a second object within the hierarchical representation, based on a determination that the second object is in a node with the first object or a descendant node of the first object with which the executable script is associated; and
    preventing the executable script from modifying a third object within the hierarchical representation, based on a determination that the third object is not in a node with the first object or a descendant node of the first object with which the executable script is associated.

2. The method of claim 1, wherein the hierarchical representation of objects is associated with a document object model.

3. The method of claim 1, wherein the script is maintained as a subelement of the first object in the hierarchical representation.

4. The method of claim 1, further comprising enabling the executable script to invoke a second executable script associated with the third object, whereby the executable script may indirectly modify the third object through invocation of the second executable script.

5. The method of claim 4, wherein the executable script invokes the second executable script by executing a function naming an action identifier associated with the second executable script.

6. The method of claim 4, wherein enabling the executable script to invoke the second executable script is conditioned on successful transmission of the second executable script to the third object.

7. A computer system configured to operate executable scripts on a virtual worlds system to enable automation of actions on the virtual worlds system, the computer system comprising:
    computer-readable storage having stored thereon a plurality of modules implemented as executable instructions;
    one or more computer processors configured to execute the plurality of modules;
    stored computer data comprising a data representation of a virtual space, the data representation including a hierarchical representation of objects within the virtual space, the hierarchical representation including an executable script associated with a first object within the hierarchical representation, the hierarchical representation including a plurality of nodes, one of the plurality of nodes including the first object, the hierarchical representation identifying a relationship between the plurality of nodes, wherein an executable script included in a first node having a higher position in the hierarchical representation is configured to alter a second node having a lower position in the hierarchical representation;

a script execution module configured to execute the executable script on one or more computer processors in communication with the computer-readable storage; and an object modification module configured to enable the executable script to modify a second object within the hierarchical representation, based on a determination that the second object is in a node with the first object or a descendant node of the first object with which the executable script is associated;

the object modification module further configured to prevent the executable script from modifying a third object within the hierarchical representation, based on a determination that the third object is not in a node with the first object or a descendant node of the first object with which the executable script is associated.

* * * * *